US011852605B2

(12) United States Patent
Mirica et al.

(10) Patent No.: US 11,852,605 B2
(45) Date of Patent: Dec. 26, 2023

(54) METAL-ORGANIC FRAMEWORKS FOR ELECTROCHEMICAL DETECTION OF ANALYTES

(71) Applicant: Trustees of Dartmouth College, Hanover, NH (US)

(72) Inventors: Katherine A. Mirica, Hanover, NH (US); Lukasz K. Mendecki, White River Junction, VT (US); Michael Ko, West Lebanon, NH (US); Zheng Meng, West Lebanon, NH (US); Robert M. Stolz, Lyme, NH (US); Aileen Eagleton, Hanover, NH (US)

(73) Assignee: Trustees of Dartmouth College, Hanover, NH (US)

( * ) Notice: Subject to any disclaimer, the term of this patent is extended or adjusted under 35 U.S.C. 154(b) by 253 days.

(21) Appl. No.: 17/252,003

(22) PCT Filed: Jun. 21, 2019

(86) PCT No.: PCT/US2019/038492
§ 371 (c)(1),
(2) Date: Dec. 14, 2020

(87) PCT Pub. No.: WO2020/055474
PCT Pub. Date: Mar. 19, 2020

(65) Prior Publication Data
US 2021/0262970 A1 Aug. 26, 2021

Related U.S. Application Data

(60) Provisional application No. 62/688,261, filed on Jun. 21, 2018.

(51) Int. Cl.
| | |
|---|---|
| *G01N 27/327* | (2006.01) |
| *C07F 1/08* | (2006.01) |
| *C07F 15/00* | (2006.01) |
| *C07F 15/04* | (2006.01) |
| *C07F 15/06* | (2006.01) |
| *B82Y 30/00* | (2011.01) |
| *B82Y 35/00* | (2011.01) |
| *B82Y 40/00* | (2011.01) |

(52) U.S. Cl.
CPC ........... *G01N 27/3278* (2013.01); *C07F 1/08* (2013.01); *C07F 15/006* (2013.01); *C07F 15/04* (2013.01); *C07F 15/06* (2013.01); *G01N 27/3277* (2013.01); *B82Y 30/00* (2013.01); *B82Y 35/00* (2013.01); *B82Y 40/00* (2013.01); *G01N 2333/575* (2013.01)

(58) Field of Classification Search
CPC ........... B01D 2253/204; B01J 31/1691; B01J 20/226; B01J 31/069; B01J 31/123; G01N 27/3277; C07F 1/08; C07F 15/0066; C07F 15/045; C07F 15/065
See application file for complete search history.

(56) References Cited

U.S. PATENT DOCUMENTS

| | | | |
|---|---|---|---|
| 6,124,138 A | 9/2000 | Woudenberg et al. | |
| 9,546,887 B1 | 1/2017 | Talin et al. | |
| 9,861,953 B2 * | 1/2018 | Long | B01J 20/3483 |
| 11,486,850 B2 * | 11/2022 | Mirica | G01N 27/308 |
| 2008/0179197 A1 * | 7/2008 | Wu | G01N 33/5438 |
| | | | 204/403.14 |
| 2008/0249391 A1 | 10/2008 | Moxon et al. | |
| 2010/0132547 A1 | 6/2010 | Masel et al. | |
| 2010/0295565 A1 | 11/2010 | Drack | |
| 2013/0304395 A1 | 11/2013 | Naidu et al. | |
| 2015/0360201 A1 * | 12/2015 | Chen | C01B 3/56 |
| | | | 556/110 |
| 2017/0073364 A1 * | 3/2017 | Dinca | C07F 15/045 |

(Continued)

FOREIGN PATENT DOCUMENTS

| | | |
|---|---|---|
| EP | 3311913 A1 | 4/2018 |
| WO | WO-2019032804 A1 | 2/2019 |

(Continued)

OTHER PUBLICATIONS

Y. Sun et al., 30 Electroanalysis, 474-478 (published Jan. 10. 2018) (Year: 2018).*
Z. Yin et al., 378 Coordination Chemistry Reviews, 500-512 (2019) (Year: 2019).*
Y. Sun et al., 30 Electroanalysis, 474-478 (2018) (Year: 2018).*
F. Wu et al., 66 Journal of the Chinese Chemical Society, 522-528 (2018) (Year: 2018).*
G. Shearer et al., 28 Chemistry of Materials, 7190-7193 (2016) (Year: 2016).*
M. Ahamad et al., 49 Dalton Transactions, 14690-14705 (2020) (Year: 2020).*
M. Ko et al., Journal of the American Chemical Society, 11717-1173 (2020) (Year: 2020).*
M. Ko et al., 54 ChemComm, 7873-7891 (2018) (Year: 2018).*
A. Kusoglu et al., Chemical Reviews, 987-1104 (2017) (Year: 2017).*

(Continued)

*Primary Examiner* — Alexander R Pagano
(74) *Attorney, Agent, or Firm* — Shackelford, Bowen, McKinley & Norton, LLP

(57) ABSTRACT

In some embodiments, the present disclosure pertains to methods of detecting an analyte in a sample by associating the sample with an electrode that includes a metal-organic framework. After association, the redox properties of the electrode are evaluated. Thereafter, the presence or absence of the analyte in the sample is detected by correlating the redox properties of the electrode to the presence or absence of the analyte. In some embodiments, the present disclosure pertains to electrodes that include a metal-organic framework and an electrode surface. In particular embodiments of the present disclosure, the metal-organic framework is associated with the electrode surface. Additional embodiments of the present disclosure pertain to methods of making the electrodes of the present disclosure by associating a metal-organic framework with an electrode surface. In some embodiments, the methods of the present disclosure also include a step of mixing the metal-organic framework with a polymer.

21 Claims, 64 Drawing Sheets

(56) References Cited

U.S. PATENT DOCUMENTS

| | | | |
|---|---|---|---|
| 2018/0306740 A1 | 10/2018 | Mirica et al. | |
| 2020/0361976 A1* | 11/2020 | Mirica | C07F 15/045 |
| 2021/0162320 A1* | 6/2021 | Mirica | C07C 7/152 |
| 2021/0164930 A1* | 6/2021 | Mirica | G01N 27/3335 |
| 2021/0230191 A1* | 7/2021 | Mirica | C07F 1/08 |
| 2021/0310971 A1* | 10/2021 | Mirica | G01N 27/126 |
| 2022/0404308 A1* | 12/2022 | Mirica | B01J 20/226 |

FOREIGN PATENT DOCUMENTS

| | | |
|---|---|---|
| WO | WO-2019033104 A1 | 2/2019 |
| WO | WO-2019236799 A1 | 12/2019 |
| WO | WO-2020037310 A1 | 2/2020 |
| WO | WO-2020055474 A2 | 3/2020 |

OTHER PUBLICATIONS

International Search Report and Written Opinion for PCT/US19/38492, dated Apr. 16, 2020.
International Preliminary Report on Patentability for PCT/US2019/038492, dated Dec. 30, 2020.
Yamada, et al., First-principles design of a half-filled flat band of the kagome lattice in two-dimensional metal-organic frameworks, American Physical Society March Meeting 2016, Baltimore (Mar. 2016).
Smith, et al., Direct Self-Assembly of Conductive Nanorods of Metal-Organic Frameworks into Chemiresistive Devices on Shrinkable Polymer Films, Chem. Mater. 2016, 28, 15, 5264-5268.
Miner, et al., Electrochemical oxygen reduction catalysed by Ni3(hexaiminotriphenylene)2, Nat Commun 7, 10942 (2016).
Kim, Y.-R.; et al. Electrochemical Detection of Dopamine in the Presence of Ascorbic Acid Using Graphene Modified Electrodes. Biosens. Bioelectron. 2010, 25, 2366-2369.
Kim, S. K.; Kim, D.; Jeon, S. Electrochemical Determination of Serotonin on Glassy Carbon Electrode Modified with Various Graphene Nanomaterials. Sens. Actuators B Chem. 2012, 174, 285-291.
Koch, D. D.; Kissinger, P. T. Determination of Serotonin in Serum and Plasma by Liquid Chromatography with Precolumn Sample Enrichment and Electrochemical Detection. Anal. Chem. 1980, 52, 27-29.
Gao, F.; Cai, X.; Wang, X.; Gao, C.; Liu, S.; Gao, F.; Wang, Q. Highly Sensitive and Selective Detection of Dopamine in the Presence of Ascorbic Acid at Graphene Oxide Modified Electrode. Sens. Actuators B Chem. 2013, 186, 380-387.
Jackowska, K.; Krysinski, P. New Trends in the Electrochemical Sensing of Dopamine. Anal. Bioanal. Chem. 2013, 405, 3753-3771.
Chumillas, S.; Figueiredo, M. C.; Climent, V.; Feliu, J. M. Study of Dopamine Reactivity on Platinum Single Crystal Electrode Surfaces. Electrochimica Acta 2013, 109, 577-586.
Barnes, E. O. et al. The Electrochemical Oxidation of Catechol and Dopamine on Platinum in 1-Ethyl-3-Methylimidazolium Bis(trifluoromethylsulfonyl)imide ([C2mim][NTf2]) and 1-Butyl-3-Methylimidazolium Tetrafluoroborate ([C4mim][BF4]): Adsorption Effects in Ionic Liquid Voltammetry. J. Electroanal. Chem. 2010, 646, 11-17.
Khudaish, E. A.; Farsi, A. A. A. Electrochemical Oxidation of Dopamine and Ascorbic Acid at a Palladium Electrode Modified with in Situ Fabricated Iodine-Adlayer in Alkaline Solution. Talanta 2010, 80, 1919-1925.
Sajid, M. et al. Chemically Modified Electrodes for Electrochemical Detection of Dopamine in the Presence of Uric Acid and Ascorbic Acid: A Review. TrAC Trends Anal. Chem. 2016, 76, 15-29.
Oztekin, Y.; Tok, M.; Bilici, E.; Mikoliunaite, L.; Yazicigil, Z.; Ramanaviciene, A.; Ramanavicius, A. Copper Nanoparticle Modified Carbon Electrode for Determination of Dopamine. Electrochimica Acta 2012, 76, 201-207.
Won, M.-S. et al. Square-Wave Voltammetric Detection of Dopamine at a Copper-(3-Mercaptopropyl) Trimethoxy Silane Complex Modified Electrode. Electroanalysis 2005, 17, 2231-2238.
Zhou, D.-M .; Ju, H.-X .; Chen, H.-Y. Catalytic Oxidation of Dopamine at a Microdisk Platinum Electrode Modified by Electrodeposition of Nickel Hexacyanoferrate and Nafion. J. Electroanal. Chem. 1996, 408, 219-223.
Sun, H. et al.; Gold Nanoparticle-Decorated MoS2 Nanosheets for Simultaneous Detection of Ascorbic Acid,Dopamine and Uric Acid. RSC Adv. 2014, 4, 27625.
Shao, Y. et al. Graphene Based Electrochemical Sensors and Biosensors: A Review. Electroanalysis 2010, 22, 1027-1036.
McCreery, R. L. Advanced Carbon Electrode Materials for Molecular Electrochemistry. Chem. Rev. 2008, 108, 2646-2687.
Chandran, G. T.; Li, X.; Ogata, A.; Penner, R. M. Electrically Transduced Sensors Based on Nanomaterials. Anal. Chem. 2017, 89, 249-275.
Yang, W et al. Carbon Nanomaterials in Biosensors: Should You Use Nanotubes or Graphene? Angew. Chem. Int. Ed. 2010, 49, 2114-2138.
Campbell, M. G. et al. Cu3(Hexaiminotriphenylene)2: An Electrically Conductive 2D Metal-Organic Framework for Chemiresistive Sensing. Angew. Chem. Int. Ed. 2015, 54, 4349-4352.
Campbell, M. G.; Liu, S. F.; Swager, T. M.; Dincă, M. Chemiresistive Sensor Arrays from Conductive 2D Metal-Organic Frameworks. J. Am. Chem. Soc. 2015, 137, 13780-13783.
Smith, M. K.; Mirica, K. A. Self-Organized Frameworks on Textiles (SOFT): Conductive Fabrics for Simultaneous Sensing, Capture, and Filtration of Gases. J. Am. Chem. Soc. 2017, 139, 16759-16767.
Smith, M. K.; Jensen, K. E.; Pivak, P. A.; Mirica, K. A. Direct Self-Assembly of Conductive Nanorods of Metal-Organic Frameworks into Chemiresistive Devices on Shrinkable Polymer Films. Chem. Mater. 2016, 28, 5264-5268.
Ko, M.; Aykanat, A.; Smith, M. K.; Mirica, K. A. Drawing Sensors with Ball-Milled Blends of Metal-Organic Frameworks and Graphite. Sensors 2017, 17, 2192.
Yao, M.-S.et al. Layer-by-Layer Assembled Conductive Metal-Organic Framework Nanofilms for Room-Temperature Chemiresistive Sensing. Angew. Chem. Int. Ed. 2017, 56, 16510-16514.
Mendecki, L.; Mirica, K. A. Conductive Metal-Organic Frameworks as Ion-to-Electron Transducers in Potentiometric Sensors. ACS Appl. Mater. Interfaces 2018.
Ekinci, E.; Erdogdu, G.; Karagozler, A. E. Preparation, Optimization, and Voltammetric Characteristics of Poly(o-Phenylenediamine) Film as a Dopamine-Selective Polymeric Membrane. J. Appl. Polym. Sci. 2001, 79, 327-332.
Gorle, D. B.; Kulandainathan, M. A. Electrochemical Sensing of Dopamine at the Surface of a Dopamine Grafted Graphene Oxide/ Poly(methylene Blue) Composite Modified Electrode. RSC Adv. 2016, 6, 19982-19991.
Fabregat, G.; Armelin, E.; Alemán, C. Selective Detection of Dopamine Combining Multilayers of Conducting Polymers with Gold Nanoparticles. J. Phys. Chem. B 2014, 118, 4669-4682.
Lakshmi, D. et al. Electrochemical Sensor for Catechol and Dopamine Based on a Catalytic Molecularly Imprinted Polymer-Conducting Polymer Hybrid Recognition Element. Anal. Chem. 2009, 81, 3576-3584.
Xue, C. et al. Amperometric Detection of Dopamine in Human Serumby Electrochemical Sensor Based on Gold Nanoparticles Doped Molecularly Imprinted Polymers. Biosens. Bioelectron. 2013, 49, 199-203.
Kumar, S. S.; Mathiyarasu, J.; Phani, K. L. Exploration of Synergism between a Polymer Matrix and Gold Nanoparticles for Selective Determination of Dopamine. J Electroanal. Chem. 2005, 578, 95-103.
Jin, G.; Zhang, Y.; Cheng, W. Poly(p-Aminobenzene Sulfonic Acid)-Modified Glassy Carbon Electrode for Simultaneous Detection of Dopamine and Ascorbic Acid. Sens. Actuators B Chem. 2005, 107, 528-534.
Zhang, R.; Jin, G.-D.; Chen, D.; Hu, X.-Y. Simultaneous Electrochemical Determination of Dopamine, Ascorbic Acid and Uric Acid Using Poly(acid Chrome Blue K) Modified Glassy Carbon Electrode. Sens. Actuators B Chem. 2009, 138, 174-181.
Njagi, J.; Chernov, M. M.; Leiter, J. C.; Andreescu, S. Amperometric Detection of Dopamine in Vivo with an Enzyme Based Carbon Fiber Microbiosensor. Anal. Chem. 2010, 82, 989-996.

(56) References Cited

OTHER PUBLICATIONS

Monica Florescu; Melinda David. Tyrosinase-Based Biosensors for Selective Dopamine Detection. *Sensors* 2017, 17, 1314.

Özel, R. E.; Hayat, A.; Andreescu, S. Recent Developments in Electrochemical Sensors for the Detection of Neurotransmitters for Applications in Biomedicine. *Anal. Lett.* 2015, 48, 1044-1069.

Wu, L.; Feng, L.; Ren, J.; Qu, X. Electrochemical Detection of Dopamine Using Porphyrin-Functionalized Graphene. *Biosens. Bioelectron.* 2012, 34, 57-62.

Liu, S.; Yan, J.; He, G.; Zhong, D.; Chen, J.; Shi, L.; Zhou, X.; Jiang, H. Layerby-Layer Assembled Multilayer Films of Reduced Graphene Oxide/Gold Nanoparticles for the Electrochemical Detection of Dopamine. *J. Electroanal. Chem.* 2012, 672, 40-44.

Wang, Y.; Li, Y.; Tang, L.; Lu, J.; Li, J. Application of Graphene-Modified Electrode for Selective Detection of Dopamine. *Electrochem. Commun.* 2009, 11, 889-892.

Sun, C.-L.; Lee, H.-H.; Yang, J.-M.; Wu, C.-C. The Simultaneous Electrochemical Detection of Ascorbic Acid, Dopamine, and Uric Acid Using Graphene/Size-Selected Pt Nanocomposites. *Biosens. Bioelectron.* 2011, 26, 3450-3455.

Zhang, M.; Gong, K.; Zhang, H.; Mao, L. Layer-by-Layer Assembled Carbon Nanotubes for Selective Determination of Dopamine in the Presence of Ascorbic Acid. *Biosens. Bioelectron.* 2005, 20, 1270-1276.

Jiang, L.; Nelson, G. W.; Abda, J.; Foord, J. S. Novel Modifications to Carbon-Based Electrodes to Improve the Electrochemical Detection of Dopamine. *ACS Appl. Mater. Interfaces* 2016, 8, 28338-28348.

Zheng, Z.; Qiu, H.; Zheng, M.; Weng, S.; Huang, Z.; Xian, R.; Lin, X. Selective Electrochemical Determination of Dopamine in Serum in the Presence of Ascorbic Acid and Uric Acid by Using a CuO Nanoleaf Electrode. *Anal Methods* 2014, 6, 7923-7927.

Muguruma, H.; Inoue, Y.; Inoue, H.; Ohsawa, T. Electrochemical Study of Dopamine at Electrode Fabricated by Cellulose-Assisted Aqueous Dispersion of Long-Length Carbon Nanotube. *J. Phys. Chem. C* 2016, 120, 12284-12292.

Hmadeh, M. et al. New Porous Crystals of Extended Metal-Catecholates. *Chem. Mater.* 2012, 24, 3511-3513.

\* cited by examiner

Dopamine

Norepinephrine

Epinephrine conjugated hexatopic ligand

H₂O, 85 °C 2D porous metal-organic framework

Yaghi, Dincă, Xu

X = O, NH divalent mental cation
M²⁺
M = Cu, Ni

METAL-ORGANIC FRAMEWORKS FOR ELECTROCHEMICAL DETECTION OF ANALYTES

CROSS-REFERENCE TO RELATED APPLICATIONS

This application claims priority to U.S. Provisional Patent Application No. 62/688,261, filed on Jun. 21, 2018. The entirety of the aforementioned application is incorporated herein by reference.

STATEMENT REGARDING FEDERALLY SPONSORED RESEARCH

This invention was made with government support under W911NF-17-1-0398 awarded by the Department of Defense. The government has certain rights in the invention.

BACKGROUND

A conceptually novel technological approach that integrates chemically precise materials with seamless device integration strategies represents an unmet need in electroanalysis of analytes, such as neurochemicals. The present disclosure addresses the aforementioned needs.

SUMMARY

In some embodiments, the present disclosure pertains to methods of detecting an analyte in a sample by associating the sample with an electrode that includes a metal-organic framework. After association, the redox properties of the electrode are evaluated. In particular embodiments of the present disclosure, the redox properties include, without limitation, oxidation, reduction, redox potential, and combinations thereof. Thereafter, the presence or absence of the analyte in the sample is detected by correlating the redox properties of the electrode to the presence or absence of the analyte.

In some embodiments, the present disclosure pertains to electrodes that include a metal-organic framework and an electrode surface. In particular embodiments of the present disclosure, the metal-organic framework is associated with the electrode surface. In some embodiments, the metal-organic framework serves as an electrode surface. In some embodiments, the electrode lacks an additional electrode surface.

In some embodiments, the electrodes of the present disclosure also include a wiring and a potentiostat, such that the wiring electrically connects the electrode surface to the potentiostat. In some embodiments, the electrodes further include an output display that is electrically connected to the potentiostat. Additionally, the electrodes of the present disclosure, in some embodiments, can be in the form of a sensing array.

Additional embodiments of the present disclosure pertain to methods of making the electrodes of the present disclosure by associating a metal-organic framework with an electrode surface. In some embodiments, the methods of the present disclosure also include a step of mixing the metal-organic framework with a polymer.

DESCRIPTION OF THE DRAWINGS

FIGS. 16A-D used the following differential pulse voltammetry parameters: scan rate: 50 mV/sec; pulse width: 50 msec; and amplitude: 50 mV The solutions were degassed with $N_2$ prior to the electrochemical measurements and the drop-casted metal-organic frameworks on the glassy carbon electrode were initialized with 25 cyclic voltammetry scans at 50 mV/sec.

FIGS. 30A-C used the following differential pulse voltammetry parameters: scan rate: 50 mV/sec; pulse width: 50 msec; and amplitude: 50 mV. All cyclic voltammetric measurements were run at 50 mV/sec in three electrode configurations— metal-organic framework films coated glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.

FIG. 36A illustrates nanorods dropcast from 5 μL of reaction mixture and rinsed with acetone and water. The structure of the nanorods on the surface of the Si wafer shows good coverage and stability to washing.

FIG. 36B illustrates an image of the same nanorods sample at higher magnification shows bundles of nanorods.

FIG. 36C shows nanosheets were scooped from the surface of the synthetic solution. A wide-angle view shows good coverage across the surface of the wafer.

FIG. 36D illustrates high magnification of nanosheets on the Si wafer show alignment with the nanosheets lying flat on the surface exposing mainly the basal plane.

DETAILED DESCRIPTION

Figure 1A:
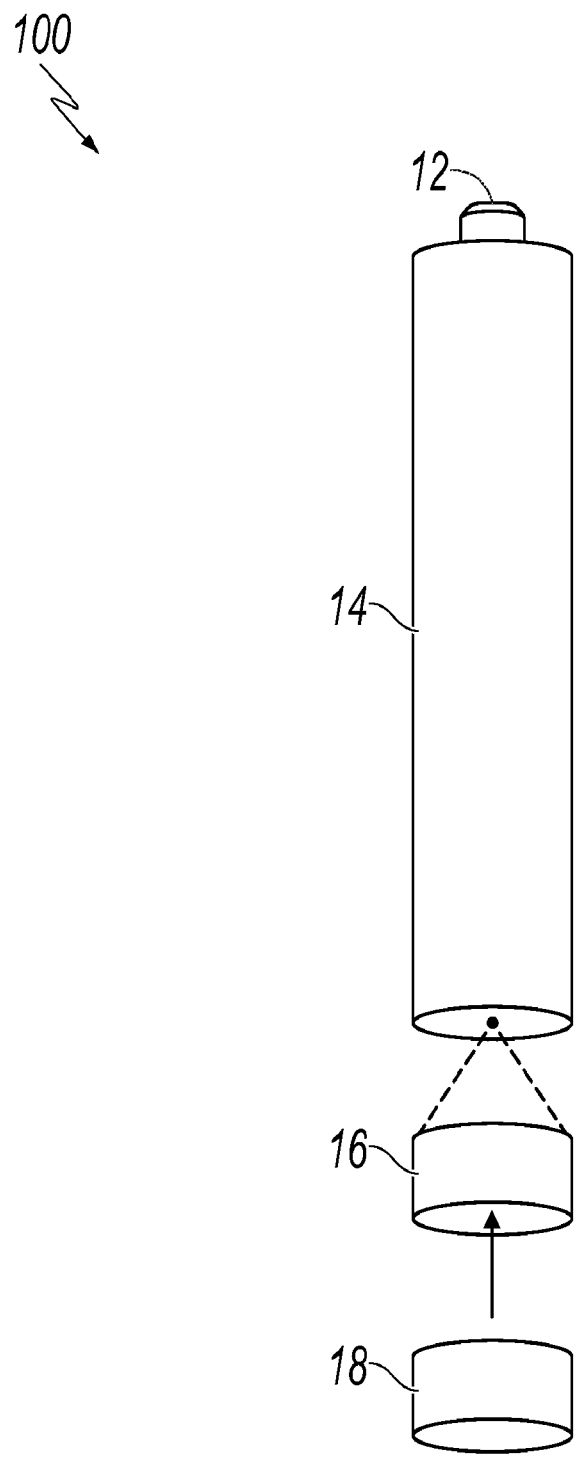
FIG. 1A depicts an electrode structure.

It is to be understood that both the foregoing general description and the following detailed description are illustrative and explanatory, and are not restrictive of the subject matter, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements or components comprising one unit and elements or components that include more than one unit unless specifically stated otherwise.

The section headings used herein are for organizational purposes and are not to be construed as limiting the subject matter described. All documents, or portions of documents, cited in this application, including, but not limited to, patents, patent applications, articles, books, and treatises, are hereby expressly incorporated herein by reference in their entirety for any purpose. In the event that one or more of the incorporated literature and similar materials defines a term in a manner that contradicts the definition of that term in this application, this application controls.

Electrochemical detection of analytes find numerous applications in various fields. For instance, electrochemical detection of neurochemicals can be an important tool for assessing stress and exertion, providing early diagnosis, treating disorders, and modifying human behavior. Breakthroughs in designs of materials and devices have led to significant advances in rapid detection and continuous monitoring of analytes in controlled environments. However, despite the sensitivity and selectivity of existing materials to a number of analytes, three major challenges currently inhibit rapid progress toward technological applications. First, access to atomically precise conductive nanomaterials with promising utility in electroanalysis (e.g., carbon nanotubes, graphene, metallic nanostructures, or B-doped diamonds) remains limited and costly. Second, achieving desired sensitivity and selectivity with these materials typically requires additional post-synthetic chemical modification of the surface, often introducing extra processing steps that may generate surface defects, or yield composite materials with limited stability. Third, integrating these nanomaterials into flexible, wearable, and/or biocompatible sensing devices often poses challenges to chemical and mechanical stability of electrochemically active interfaces within devices.

Accordingly, a need exists for more effective electrodes and methods for detection of analytes. In particular, a conceptually novel technological approach that integrates chemically precise materials with seamless device integration strategies represents an unmet need in electroanalysis. Various embodiments of the present disclosure address the aforementioned needs.

In some embodiments, the present disclosure pertains to electrodes that include metal-organic frameworks associated with an electrode surface. In some embodiments illustrated in FIG. 1A, the electrodes of the present disclosure are in the form of electrode 10. In this embodiment, electrode 10 includes an electrical contact 12 coupled to an electrode casing 14. In addition, in this embodiment, the electrode 10 has an electrode surface 16. The electrode 10 further includes a metal-organic framework 18 associated with the electrode surface 16. In some embodiments, the metal-organic framework 18 includes one or more metals and one or more ligands coordinated with the one or more metals.

Figure 1B:
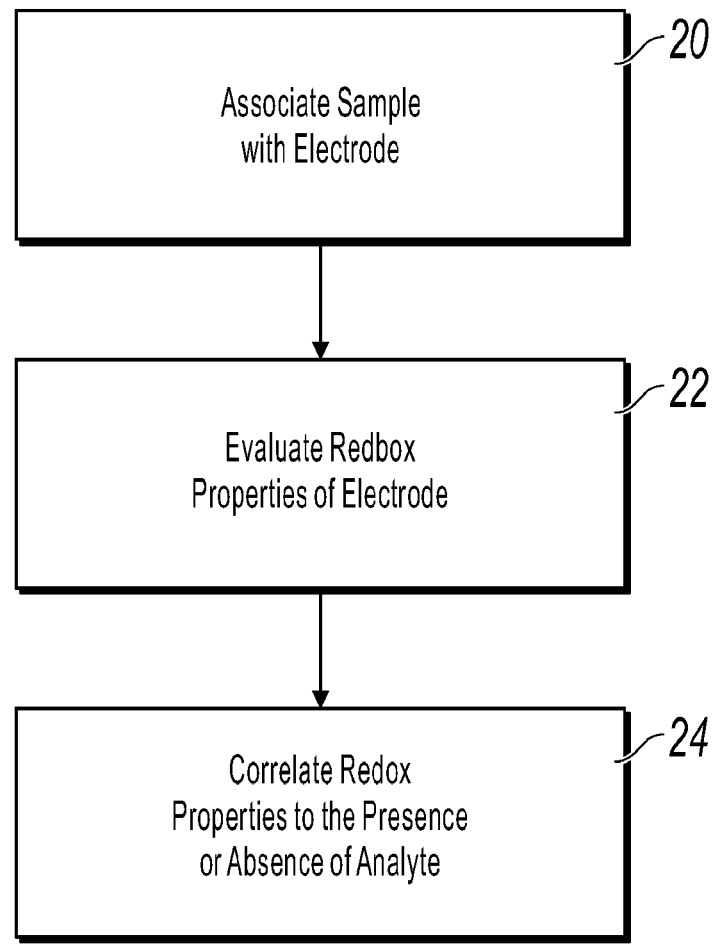
FIG. 1B illustrates a method of detecting an analyte in a sample.

Additional embodiments of the present disclosure pertain to methods of detecting an analyte in a sample. In some embodiments illustrated in FIG. 1B, the methods of the present disclosure include a step of associating the sample with an electrode (step 20) that includes a metal-organic framework. Thereafter, the methods include evaluating the redox properties of the electrode (step 22). In some embodiments, the redox properties can include, without limitation, oxidation, reduction, redox potential, and combinations thereof. Thereafter, the redox properties of the electrode are correlated to the presence or absence of the analyte in the sample (step 24).

Figure 1C:
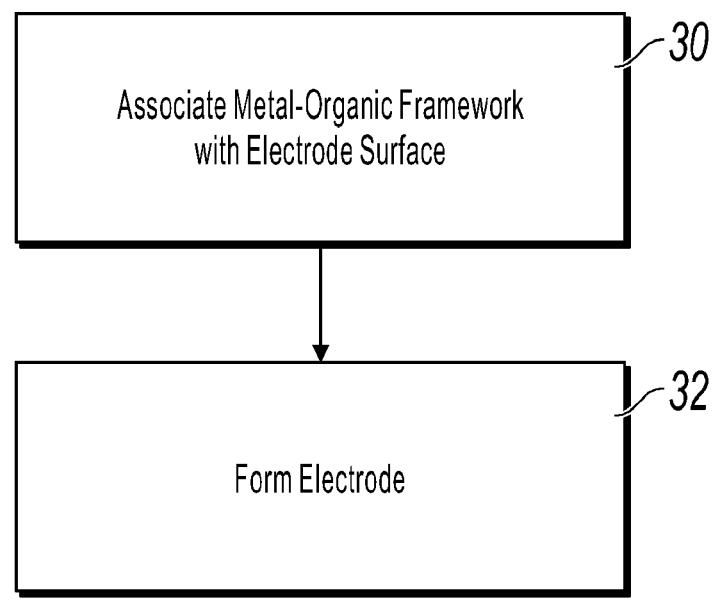
FIG. 1C illustrates a method of forming the electrode.

Further embodiments of the present disclosure pertain to methods of making the electrodes of the present disclosure. In some embodiments illustrated in FIG. 1C, the methods of the present disclosure include a step of associating a metal-organic framework with an electrode surface (step 30) to result in the formation of the electrode (step 32).

As set forth in more detail herein, the electrodes and methods of the present disclosure can have numerous embodiments. In particular, the electrodes of the present disclosure can include various types of metal-organic frameworks, electrode surfaces, configurations, and other components. Moreover, various methods may be utilized to detect various analytes in various samples through the use of the electrodes of the present disclosure. In addition, various methods may be utilized to fabricate the electrodes of the present disclosure.

Electrodes

The electrodes of the present disclosure generally include metal-organic frameworks and an electrode surface. As set forth in more detail herein, the metal-organic frameworks of the present disclosure can include various metals, ligands, formulas, compositions, and structures. Moreover, the electrodes of the present disclosure can include various surfaces and configurations. The electrodes of the present disclosure can additionally include other components.

In some embodiments, the metal-organic frameworks of the present disclosure serve as an electrode surface. In some embodiments, the electrode lacks an additional electrode surface.

Metal-Organic Frameworks

The electrodes of the present disclosure can include various types of metal-organic frameworks. In general, metal-organic frameworks include one or more metals and one or more ligands coordinated with the one or more metals.

The metal-organic frameworks of the present disclosure can include various types of metals. For instance, in some embodiments, the metals can include, without limitation, divalent metals, transition metals, iron, nickel, copper, cobalt, zinc, manganese, platinum, palladium, gold, bismuth, chromium, magnesium, tin, and combinations thereof. In some embodiments, the metals can include, without limitation, palladium, copper, cobalt, nickel, and combinations thereof.

The metal-organic frameworks of the present disclosure can include various types of ligands. For instance, in some embodiments, the ligands can include, without limitation, organic ligands, hexatopic ligands, polydentate functional groups, aromatic ligands, phthalocyanine-based ligands, metallophthalocyaline-based ligands, naphthalocyanine-based ligands, tridentate ligands, triphenylene-based ligands, triphenylene derivatives, hexahydroxytriphenylene-based organic linkers, hexaiminotriphenlyene-based organic linkers, thiol-based ligands, and combinations thereof. In some embodiments, the ligands can include, without limitation, triphenylene-based ligands. In some embodiments, the triphenylene-based ligands can include, without limitation, 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof.

The metal-organic frameworks of the present disclosure can have various formulas and compositions. For instance, in some embodiments, the metal-organic frameworks can have the formula of $M_3(HXTP)_2$. In some embodiments, M can include, without limitation, cobalt, copper, nickel, palladium, and combinations thereof. In some embodiments, X can include, without limitation, O or NH. In some embodiments, HXTP can represent triphenylene-based ligands, that can include, without limitation, 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof. In some embodiments, the metal-organic frameworks can include, without limitation, $Co_3HTTP_2$, $Ni_3HTTP_2$, $Ni_3HITP_2$, $Cu_3HTTP_2$, $Co_3HHTP_2$, $Ni_3HHTP_2$, $Cu_3HHTP_2$, $Pd_3HHTP_2$, $Pd_3HITP_2$, and combinations thereof.

The metal-organic frameworks of the present disclosure can have various structures. For instance, in some embodiments, the metal-organic frameworks serve as a membrane for capturing an analyte. In some embodiments, the metal-organic frameworks are in the form of a two-dimensional conductive network. In some embodiments, the metal-organic frameworks are in crystalline form.

In some embodiments, the metal-organic frameworks are in the form of a layer, a powder, a compressed powder, a pellet, a pencil-lead, a free-standing or substrate-supported wire, a free-standing or substrate-supported array of wires, a free-standing film, a substrate-supported film, or combinations thereof. In some embodiments, the metal-organic frameworks are in the form of a layer. In some embodiments, the metal-organic frameworks are in the form of a crystalline layer. In some embodiments, the metal-organic framework is in the form of nanosheets, nanorods, or combinations thereof.

In some embodiments, the metal-organic frameworks of the present disclosure are associated with a polymer. In some embodiments, the metal-organic frameworks are in the form of a polymer composite. In some embodiments, the polymer can include, without limitation, fluoropolymers, polytetrafluoroethylene, Nafion, and combinations thereof.

In some embodiments, the metal-organic frameworks are porous. In some embodiments, the metal-organic frameworks include a plurality of micropores, mesopores, and nanopores. In some embodiments, the metal-organic frameworks are arranged in a Kagome lattice.

Electrode Surfaces and Configurations

The electrodes of the present disclosure can have various surfaces. For instance, in some embodiments, the electrode surface can include, but is not limited to, a conductive substrate, a carbon-based substrate, glassy carbon, and combinations thereof. In some embodiments, the metal-organic frameworks are associated with the electrode surface.

The electrodes of the present disclosure can have various configurations. For instance, in some embodiments, the electrode can include, without limitation, carbon electrodes, glassy carbon electrodes, gold electrodes, solid contact electrodes, and combinations thereof. In some embodiments, the electrodes are in the form of a sensing array.

Electrode Components

The electrodes of the present disclosure can have various other components. For instance, in some embodiments, the electrodes further include, without limitation, a wiring and a potentiostat. In some embodiments, the wiring electrically connects the electrode surface to the potentiostat. In some embodiments, the electrodes further include, without limitation, an output display. In some embodiments, the output display is electrically connected to the potentiostat.

Methods for Detecting an Analyte

In additional embodiments, the present disclosure pertains to methods of detecting an analyte in a sample. In some embodiments, the methods of the present disclosure include a step of associating the sample with an electrode of the present disclosure. Subsequently, the methods include a step of evaluating the redox properties of the electrode, such as, but not limited to, oxidation, reduction, redox potential, and combinations thereof. Thereafter, the methods include a step of correlating the redox properties of the electrode to the presence or absence of the analyte in the sample.

Samples

The methods of the present disclosure may be utilized to detect analytes from various samples. The samples may be in various forms. For instance, in some embodiments, the sample is in a gaseous form, a liquid form, a solid form, or combinations of such forms. In some embodiments, the sample is in liquid form. In some embodiments, the sample is in the form of an aqueous solution. In some embodiments, the sample is in a solid form.

Associating Samples with Electrodes

Various methods may be utilized to associate samples with the electrodes of the present disclosure. For instance, in some embodiments, the association occurs by flowing the samples through the electrodes. In some embodiments, the association occurs by flowing the samples such that the samples come into contact with the electrodes. In some embodiments, the association occurs by incubating the samples with the electrodes.

In some embodiments, the association of the samples with electrodes occurs in an active manner, where an active step is taken to associate the samples with the electrodes (e.g., actively flowing the samples through the electrodes). In some embodiments, the association occurs in a passive manner, such as through the passive incubation of the electrodes with the samples.

In some embodiments, the association of the samples with electrodes includes the association of samples with various regions of metal-organic frameworks. For instance, in some embodiments, the association includes associating the sample with a basal plane of metal-organic frameworks. In some embodiments, the association includes associating the sample with an edge of metal-organic frameworks. In some embodiments, the association includes associating the sample with a Miller index [100] surface of metal-organic frameworks. In some embodiments, the association includes associating the sample with a Miller index [004] surface of metal-organic frameworks. In some embodiments, the association includes associating the sample with a crystalline surface of metal-organic frameworks.

The association of the samples with the electrodes can afford various results. For instance, in some embodiments, the association results in the reversible association of any analyte in the sample with the metal-organic framework. In some embodiments, the association results in the selective association of a specific analyte in the sample with the metal-organic framework. In some embodiments, the metal-organic framework catalyzes redox processes of the analyte.

Evaluating Redox Properties of Electrodes

The methods of the present disclosure can be utilized to evaluate various electrode redox properties. For instance, in some embodiments, the redox properties of the electrode include oxidation of chemical species. In some embodiments, the redox properties of the electrode include reduction of chemical species. In some embodiments, the redox properties of the electrode include oxidation and reduction of chemical species. In some embodiments, the redox properties of the electrode include the redox potential of the electrode. In some embodiments, the redox properties of the electrodes include the overall current.

Various methods may be utilized to evaluate the redox properties of electrodes. For instance, in some embodiments, the evaluation occurs by obtaining a voltammetric response of the electrode. In some embodiments, the voltammetric response is obtained by measuring the current of the electrode as the potential of the electrode is varied. In some embodiments, the voltammetric response is obtained by measuring a change in the current of the electrode over time.

In some embodiments, the voltammetric response is obtained by obtaining a voltammogram of the electrode. In some embodiments, the redox properties are evaluated by evaluating peaks on the voltammogram. In some embodiments, the voltammetric response is obtained through cyclic voltammetry (CV). In some embodiments, the voltammetric response is obtained through differential pulse voltammetry (DPV).

Additional methods of evaluating the redox properties of electrodes can also be envisioned. For instance, in some embodiments, the redox properties of electrodes can be evaluated by methods that include, without limitation, electrochemical impedance spectroscopy and spectroelectrochemistry.

Correlating Electrode Redox Properties to Analytes

Various methods may also be utilized to correlate the redox properties of the electrodes of the present disclosure to the presence or absence of analytes in a sample. For instance, in some embodiments, the correlation includes comparing the redox properties of the electrode to redox properties of known analytes. In some embodiments, the correlation occurs by comparing the redox properties of the electrode to a database that include redox properties of electrodes associated with known analytes.

In some embodiments, the correlation includes comparing a voltammetric response of the electrode to the voltammetric responses of electrodes associated with known analytes. In some embodiments, the voltammetric response represents a redox potential of the electrode. In some embodiments, the correlation includes comparing a redox potential of the electrode to redox potentials of electrodes with known analytes.

Additional methods of correlating the redox properties of the electrodes to the presence or absence of analytes in the sample can also be envisioned, including, but not limited to, electrochemical impedance spectroscopy and spectroelectrochemistry.

Analyte Detection

The methods of the present disclosure can be utilized to detect analytes in various manners. For instance, in some embodiments, the methods of the present disclosure can be utilized to detect a single analyte. In some embodiments, the methods of the present disclosure can be utilized to detect multiple analytes. In some embodiments, the methods of the present disclosure are utilized for the simultaneous detection of a plurality of different analytes.

Additionally, the methods of the present disclosure can be utilized for various purposes. For instance, in some embodiments, the methods of the present disclosure are utilized to quantify the concentration of the analyte. In some embodiments, the methods of the present disclosure are utilized for the selective detection of analytes in the presence of interfering agents. In some embodiments, the interfering agents include, without limitation, uric acid, ascorbic acid, proteins, ions, and combinations thereof.

The methods of the present disclosure can be utilized to detect various analytes. For instance, in some embodiments, the analytes can include, but are not limited to, neurochemicals, metabolites, drugs, vitamins, and combinations thereof. In some embodiments, the analytes include neurochemicals. In some embodiments, the neurochemicals can include, without limitation, redox active neurochemicals, dopamine, serotonin, norepinephrine, epinephrine, neurotransmitters, catecholamines, and combinations thereof.

In some embodiments, the analytes include catecholamines. In some embodiments, the catecholamines include, without limitation, dopamine, norepinephrine, epinephrine, and combinations thereof.

The methods of the present disclosure can be utilized to detect analytes at various concentrations. For instance, in some embodiments, the analyte is detectable at concentrations that range from about 10 nM to about 100 μM. In some embodiments, the analyte is detectable at concentrations that range from about 10 nM to about 1 μM. In some embodiments, the analyte is detectable at concentrations that range from about 10 nM to about 100 nM.

Methods of Making Electrodes

Additional embodiments of the present disclosure pertain to methods of making the electrodes of the present disclosure. In some embodiments, the methods of the present disclosure include a step of associating the metal-organic frameworks of the present disclosure with an electrode surface to result in the formation of the electrode.

Various methods may be utilized to associate metal-organic frameworks with an electrode surface. For instance, in some embodiments, the association occurs by applying a dispersion of metal-organic frameworks onto the electrode surface. In some embodiments, the metal-organic frameworks are in a solvent. In some embodiments, the solvent is an organic solvent, such as acetonitrile.

In some embodiments, the association occurs by drop-casting a metal-organic framework dispersion onto the electrode surface. In some embodiments, the association occurs by compressing a metal-organic framework powder onto the electrode surface. In some embodiments, the association occurs by spin-coating a metal-organic framework dispersion onto the electrode surface. In some embodiments, the association occurs by electrodeposition of a metal-organic framework from ligand and metal components in solution.

In some embodiments, the methods of the present disclosure also include a step of mixing the metal-organic framework with a polymer. In some embodiments, the mixing occurs prior to the associating step. In some embodiments, the mixing includes sonication of the metal-organic frameworks in the presence of the polymer. In some embodiments, the polymer includes, without limitation, fluoropolymers, polytetrafluoroethylene, Nafion, and combinations thereof. In some embodiments, it may or may not be beneficial to include the polymer. In some embodiments, the polymer can be excluded, for example when the presence of the polymer is not beneficial for analyte detection.

In some embodiments, the methods of the present disclosure can include a step of pre-treating the metal-organic framework prior to association. In some embodiments, the pre-treating can include sonication.

In some embodiments, the methods of the present disclosure also include a step of cleaning the electrode surface prior to association. In some embodiments, the cleaning includes polishing the electrode surface.

Applications and Advantages

The electrodes and methods of the present disclosure can have various advantages. For instance, in some embodiments, the metal-organic frameworks associated with the surface of the electrodes of the present disclosure have valuable features. For example, a large degree of structural control and compositional modularity can be achieved through bottom-up synthetic approaches, permitting the integration of known electrocatalysts into the metal-organic frameworks (e.g., metallic nodes) or allowing incorporation of organic linkers which provide strong interaction with targeted molecules.

Additionally, synthesized metal-organic frameworks can be permanently porous, with numerous potential active sites available for electrochemically driven redox processes. This characteristic can assist in obtaining large signal currents for improving limits of detection of electrochemical sensors.

Metal-organic frameworks provide at least three additional fundamental advantages in the development of robust electrodes for use as electrochemical sensors for the detection of various analytes (e.g., neurochemicals, vitamins, and metabolites). First, metal-organic frameworks minimize the number of components required to assemble functional biosensors. Second, the nature and magnitude of response to targeted analytes can be modulated by selecting different metal centers in the metal-organic framework network, therefore replacing the need for complicated optimization protocols. Third, high stability of metal-organic frameworks to continuous electrochemical cycling as a result of electrode passivation makes the electrodes of the present disclosure suitable for prolonged monitoring of analytes (e.g., neurochemicals, vitamins, and metabolites) in various settings (e.g., clinical analysis or personalized healthcare devices).

As such, the electrodes and methods of the present disclosure can have numerous applications. For instance, in some embodiments that are illustrated in more detail herein, the electrodes and methods of the present disclosure can be utilized for the voltammetric detection of dopamine, serotonin, uric acid, and ascorbic acid in aqueous solutions due to their biological importance in human physiology, including mental, metabolic, and nutritional health. In some embodiments, the electrodes and methods of the present disclosure can be utilized for the simultaneous detection of neurotransmitters (e.g., dopamine, serotonin, and catecholamines) while eliminating the interfering effects of other bio-relevant analytes (e.g., uric acid and ascorbic acid).

Additional Embodiments

Reference will now be made to more specific embodiments of the present disclosure and experimental results that provide support for such embodiments. However, Applicants note that the disclosure below is for illustrative purposes only and is not intended to limit the scope of the claimed subject matter in any way.

Example 1. Employing Conductive Metal-Organic Frameworks for Voltammetric Detection of Neurochemicals This Example describes two-dimensional (2D) conductive metal-organic frameworks (MOFs) as thin film electrodes that facilitate voltammetric detection of redox active neurochemicals in a multianalyte solution.

The device configuration composes a glassy carbon electrode modified with a thin film of conductive MOF ($M_3HXTP_2$; M=Cu, Ni; and X=NH, O). The utility of devices in voltammetric sensing is demonstrated by detecting and resolving dopamine (DA) in the presence of uric acid (UA) and ascorbic acid (AA) utilizing cyclic voltammetry and nanomolar detection limits (70.0 nM) using single analyte differential voltammetry through a wide response range spanning several orders of magnitude (70.0 nm-200 µM). Electrodes functionalized with $Ni_3HHTP_2$, $Cu_3HHTP_2$, $Ni_3HITP_2$, and $Cu_3HITP_2$ MOF were also used to resolve and differentiate between serotonin (5-HT) and dopamine with a micromolar limit of detection (0.50 µM) and broad concentration range (0.50 µM-929.1 µM) for 5-HT. As demonstrated in this Example, the implementation of conductive MOFs in voltammetric detection holds promise for further development of highly modular, sensitive, selective, and stable electroanalytical devices.

Example 1.1. Introduction

Electrochemical detection of neurochemicals is an important tool for assessing stress and exertion, providing early diagnosis, treating disorders, and modifying human behavior. Breakthroughs in designs of materials and devices have led to significant advances in rapid detection and continuous monitoring of neurochemicals in controlled environments. Despite the sensitivity and selectivity of existing materials to a number of neurochemicals, three major challenges currently inhibit rapid progress toward technological applications. First, access to atomically-precise conductive nanomaterials with promising utility in electroanalysis (e.g., carbon nanotubes, graphene, metallic nanostructures, B-doped diamond) remains limited and costly. Second, achieving desired sensitivity and selectivity with established materials typically requires additional post-synthetic chemical modification of the surface, often introducing extra processing steps that may generate surface defects, or yield composite materials with limited stability. Third, integrating these nanomaterials into flexible, wearable, and biocompatible sensing devices poses challenges to chemical and mechanical stability of electrochemically-active interfaces within devices. A conceptually novel technological approach that merges a unique class of chemically precise materials—with three attributes: 1) strong interfacial contact onto flexible substrates for enhanced mechanical stability to fit curvilinear surfaces, 2) calibration-free devices which do not require pretreatment, and 3) high sensitivity and selectivity in multianalyte sensing—for seamless device integration strategies represents an unmet need in electroanalysis.

Figure 2:
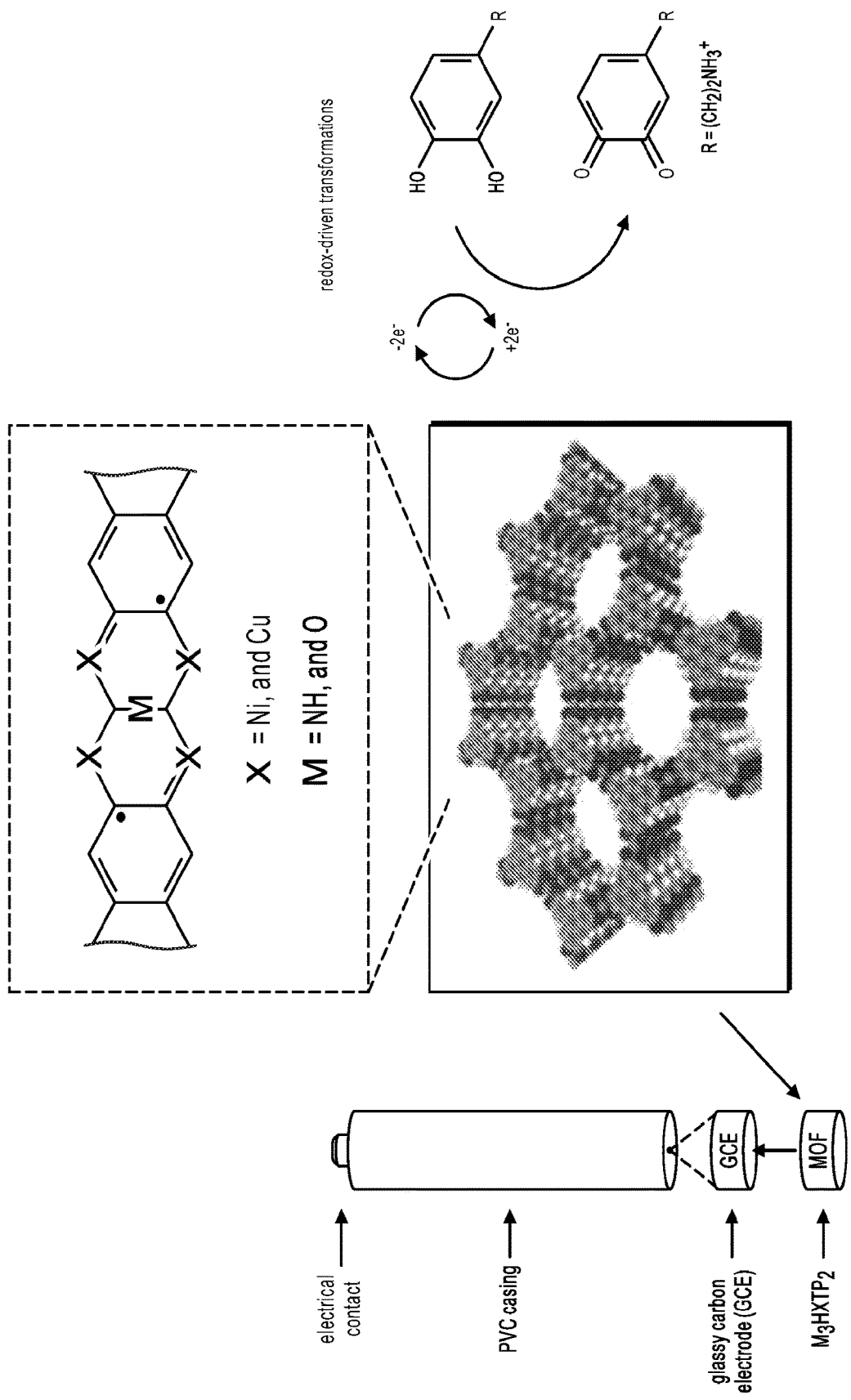
FIG. 2 illustrates a schematic representation of the layered device architecture according to an aspect of the present disclosure. A thin film of metal-organic framework dispersed in $H_2O$ for 72 hours is drop-casted directly on the top of a glassy carbon electrode to enable voltammetric sensing of neurochemicals.

This Example describes the first implementation of two-dimensional (2D) conductive metal-organic frameworks (MOFs) as mediators in voltammetric detection of biological analytes (dopamine (DA), serotonin (5-HT), ascorbic acid (AA), and uric acid (UA)) in multianalyte aqueous solutions. Applicants focused on the use of layered 2D conductive MOF having metallic nodes (Cu and Ni) interconnected with hexatopic triphenylene-based organic linkers (2,3,6,7,10,11-hexahydroxytriphenylene and 2,3,6,7,10,11-hexaaminotriphenylene) that are arranged in the Kagome lattice (FIG. 2). Despite the wide range of applications of this class of materials in chemiresistive sensing of gases, ion-to-electron transduction in potentiometry, energy storage, catalysis, and electrochemically driven reversible gas capture, the use of conductive MOFs as active components in voltammetric detection has not yet been reported.

To this day, MOFs have been primarily used as colorimetric sensors, scaffolds, and carriers in biosensors rather than the electroactive materials due to the limited conductivity and stability in aqueous solutions. Recently, the ability to achieve conductivity in 3D MOFs, through doping or mixing with conductive materials such as carbon or metal nanoparticles, has enabled the implementation of these composite materials in the detection of glucose, L-cysteine, and dopamine in the presence of uric acid. The drawbacks of doping and composite material use may result in the reduction of surface area, porosity, pore volume, and also alter possible redox-active components embedded within the MOF leading to changes in the detection process. Applicants' approach distinguishes itself by using intrinsically conductive and water-stable 2D MOFs to achieve direct electro-detection of biologically relevant redox active molecules.

Applicants chose to demonstrate the general utility of MOF-based voltammetric sensors in the context of electrochemical detection of DA, 5-HT, UA, and AA due to the biological importance of these molecules in human physiology, including mental, metabolic, and nutritional health. Parallel determination of these analytes through voltammetric measurements remains a challenge that has been addressed through extensive surface functionalization of established electrode materials.

While chemically modified polymers, enzymes, ionic liquid, or carbon-coated electrodes have enabled detection of neurochemicals with nM-μM detection limits, the reliance on experimental design where analytical performance is manipulated through successive incorporation of multi-component electrocatalysts has several disadvantages. First, despite the advances in the fabrication, and purification of nanomaterials, commercial access to structurally well-defined materials remains limited and costly. Second, achieving optimal sensitivity and selectivity often requires additional post-synthetic surface modifications. These extra processing steps may introduce surface defects or yield composite materials with limited mechanical and chemical stability. Third, partial dissolution/diffusion of the catalytic active sites from the electrode surface may not only lead to the diminishment in the device performance, but may also induce, toxicity if such systems were employed in clinical analysis. Fourth, lack of precise control over the surface chemistry of incorporated electrocatalysts limits the reproducibility of the sensing architectures.

Applicants' strategy focuses on the design of modular MOF-based thin film electrodes that can allow simultaneous detection of neurochemicals, while eliminating the interfering effects of other biologically relevant analytes. Through a series of electrochemical measurements, Applicants demonstrate that 2D conductive MOFs can be utilized as electrocatalysts for the detection of DA and 5-HT in the presence of important interferents, such as AA and UA in solutions. The MOFs in this Example simultaneously detect and resolve both DA and 5-HT with single analyte limits of detection of 70.0 nM and 20.0 nM, respectively, while exhibiting excellent electrochemical stability upon continuous cycling (100 cycles). These performance characteristics rival the best-known electrochemical sensors for DA detection based on aptamers, conductive polymer/carbon materials or β-Cyclodextrin/Graphene, thus illustrating that this new generation of functional materials holds great potential for the development of selective and sensitive sensors.

Example 1.2. Experimental Design

Applicants' experimental design employs 2D porous conductive MOFs as modular thin film working electrodes (FIG. 2). This class of materials possesses at least three advantageous characteristics for broad implementation in electrochemical sensing. First, a large degree of structural control and compositional modularity can be achieved through bottom-up synthetic approaches, permitting the integration of known electrocatalytic components into the MOF framework (e.g., metallic nodes). Second, synthesized MOFs are permanently porous, with numerous potential active sites available for electrochemically driven redox transformations. This characteristic is assists in obtaining large intensity of currents for improving limits of detection of electrochemical sensors. Third, the class of MOFs based on the hexa-substituted triphenylene structures exhibits good electrical conductivity, thus potentially allowing for their direct implementation as working electrodes in analytical devices. Applicants believe that, taken together, these characteristics offer the possibility to develop conductive MOFs into versatile and integral components of electroanalytical devices with broad potential in chemical sensing.

The molecular design in this Example (FIG. 2) relies on the use of thin film MOF-based electrodes comprising several conductive $M_3HXTP_2$ MOF analogs (M=Ni, Cu; X=NH, O). This molecular design features metallic nodes (Ni, or Cu) with proven catalytic activity for redox-driven transformations of 5-HT, DA, AA, and UA and organic linkers that can engage in favorable intermolecular interactions with targeted molecules (e.g., electrostatic interactions or H-bonding). Interconnecting these molecular building blocks into extended frameworks using solvothermal conditions produce conductive MOFs that can be deposited as thin films onto GCE to create a voltammetric sensors. Applicants reasoned that modulating the structural composition of $M_3HXTP_2$ MOFs can enable different degree of sensitivity and resolution in the detection of biologically important redox molecules.

Example 1.3. Synthesis and Structural Characterization of $M_3HXTP_2$ MOFs

Figure 3:
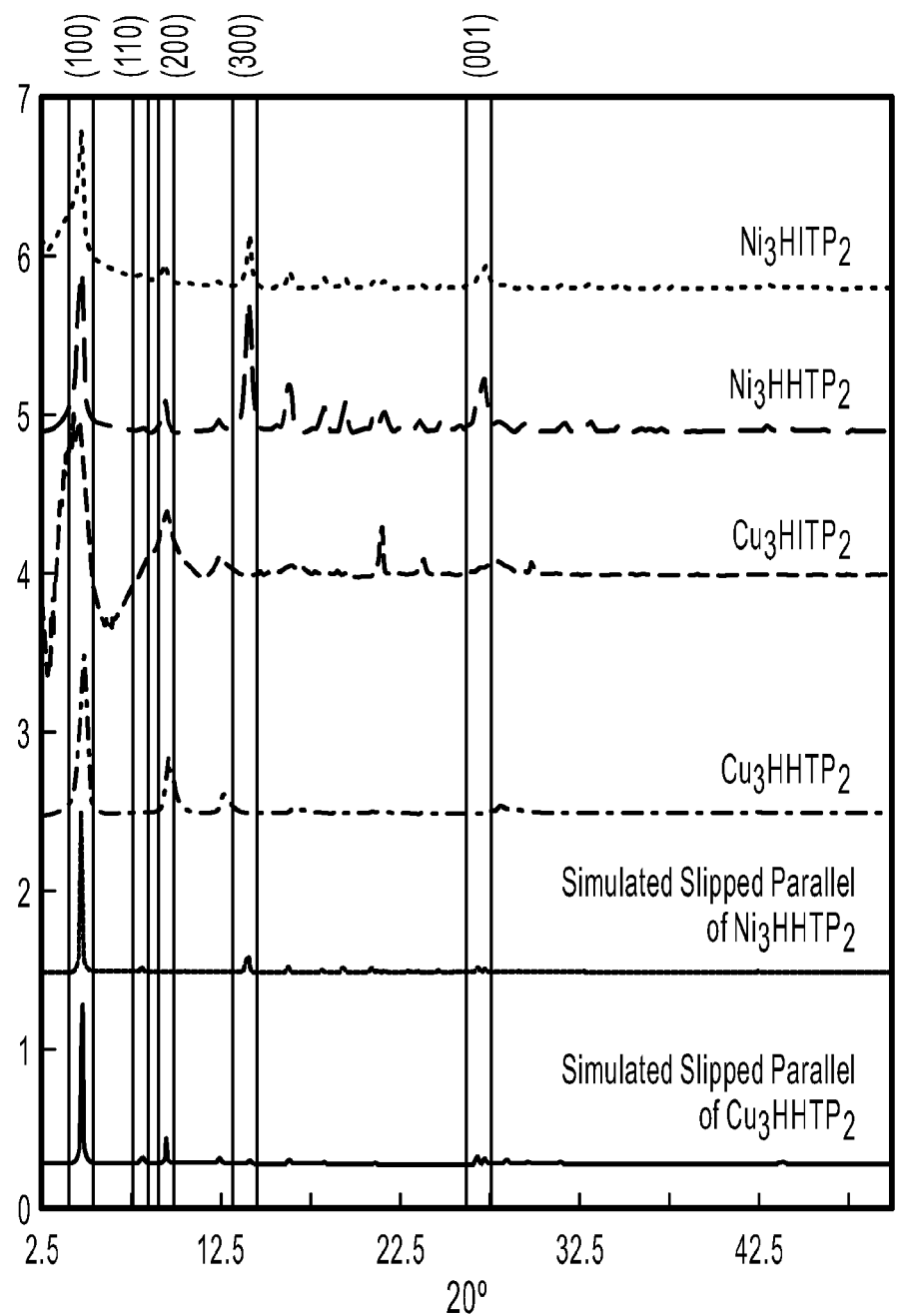
FIG. 3 illustrates experimental (colored) and simulated slipped parallel X-Ray diffraction patterns obtained for $Ni_3HITP_2$, $Ni_3HHTP_2$, $Cu_3HITP_2$, and $Cu_3HHTP_2$ bulk metal-organic framework powder loaded directly onto the low background Si zero-diffraction plates. The simulated patterns were calculated using materials studio for the $Cu_3HHTP_2$ metal-organic framework. The structure of the simulated metal-organic framework structure has been optimized for the geometry and lowest energy state.

Applicants employed reticular synthesis through the reaction of 2,3,6,7,10,11-hexahydroxytriphenylene (HHTP) or 2,3,6,7,10,11-hexaaminotriphenylene (HATP) linkers with divalent metal ions ($M^{2+}$) supplied in the form nickel (II) acetate, copper (II) sulfate, or copper (II) trifluoroacetylacetonate, to generate the corresponding $M_3HXTP_2$ MOFs: $M_3(2,3,6,7,10,11$-hexahydroxytriphenylene$)_2$ and $M_3(2,3,6,7,10,11$-hexaiminotriphenylene$)_2$ ($M_3HHTP_2$ and $M_3HITP_2$, respectively) where M=Ni or Cu and X=NH, or O. Powder X-ray diffraction patterns (pXRD) of $M_3HXTP_2$ (M=Ni, Cu; X=NH, O) matched reported characterization (FIG. 3). The pXRD traces obtained for $M_3HXTP_2$ indicated crystalline character with distinct diffraction peaks present at 2θ=4.7°, 9.4, and 12.6° corresponding to the (100), (110) and (200) planes, respectively (FIG. 3).

Figure 4:
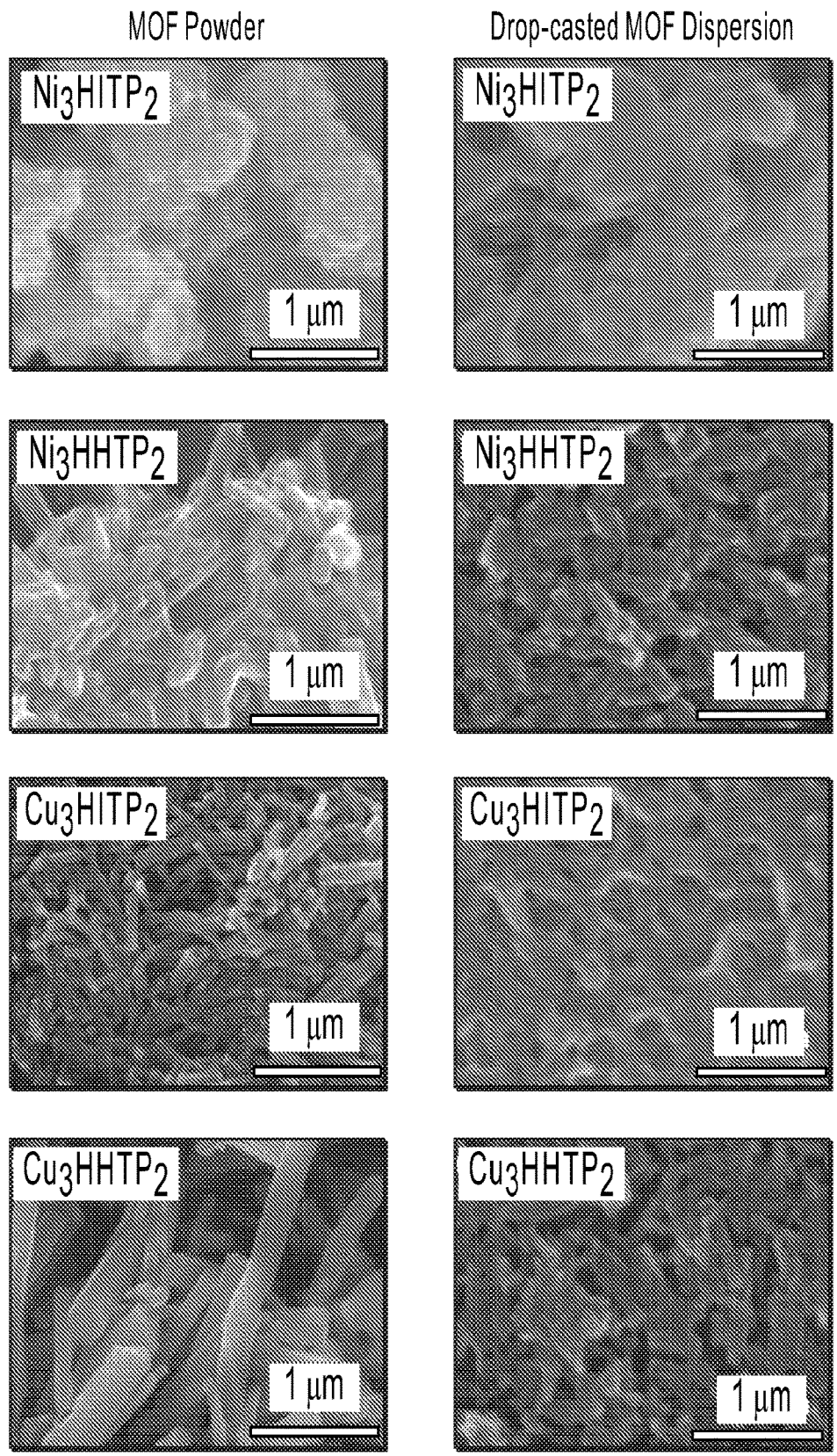
FIG. 4 illustrates scanning electron micrographs showing nanoscale morphology of $M_3HXTP_2$ metal-organic frameworks (M=Ni, and Cu; X=NH, O) in bulk powder and dispersed in $H_2O$ for 72 hours. All micrographs were taken at 50,000× magnification and 7 mm working distance.
Figure 5:
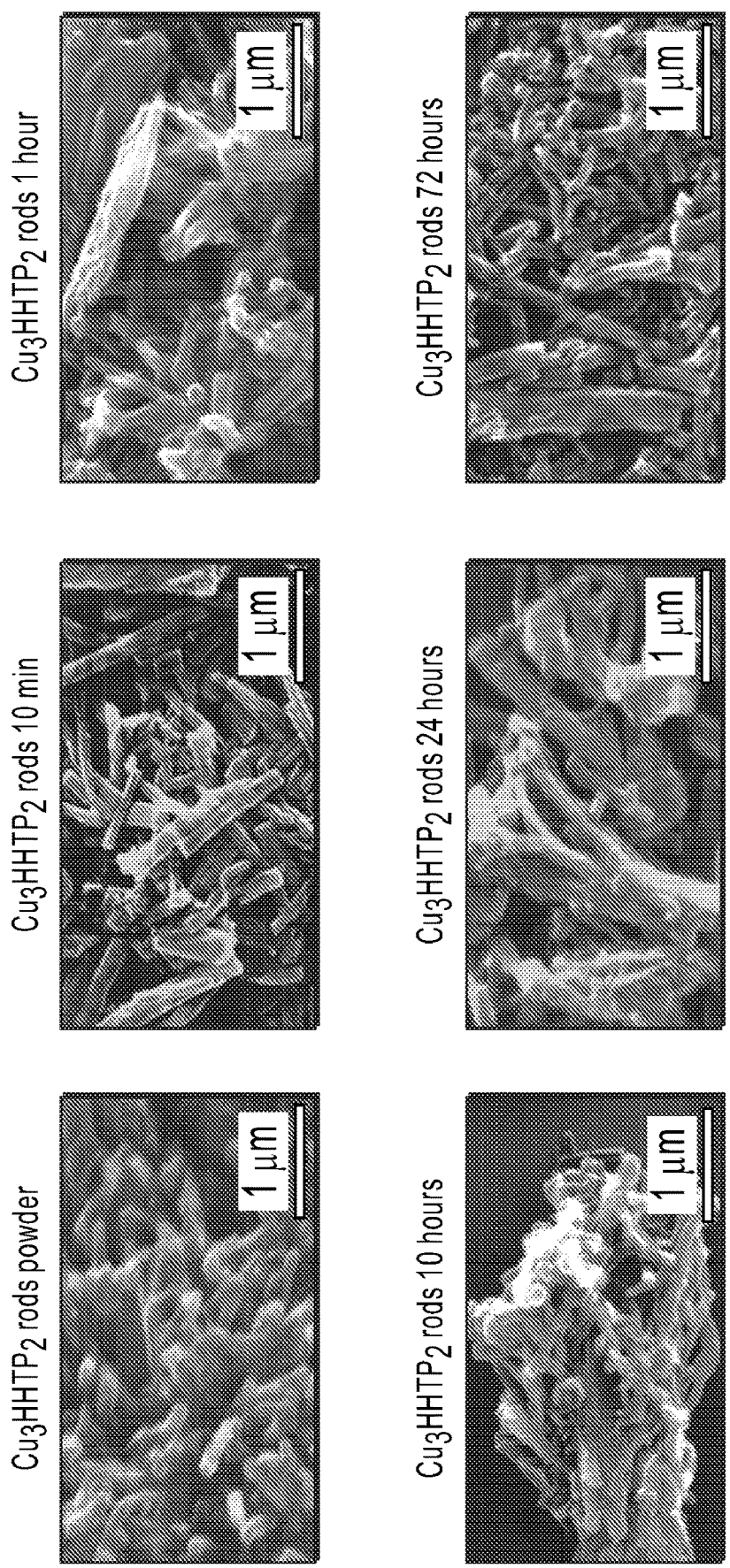
FIG. 5 illustrates representative scanning electron micrographs showing nanoscale morphology of $Cu_3HHTP_2$ metal-organic frameworks after sonication in $H_2O$ for 10 min, 1 hour, 10 hours, 24 hours, and 72 hours to assess the stability of the metal-organic framework dispersions. Conditions for collecting images were accelerating voltage of 2 keV, working distance of 2 mm, vacuum level of $10^{-6}$ torr, and a magnification of 40,000-60,000X. The samples were mounted onto conductive carbon tape.

Identity and morphology of the bulk MOFs were analyzed with scanning electron microscopy (SEM, FIG. 4). Electron micrographs revealed the formation of randomly oriented MOF nanorods in $M_3HXTP_2$ (M=Cu, Ni; and X=NH, O) (FIG. 4). The bulk MOFs were further processed through sonication in $H_2O$ to create a homogenous dispersion of $M_3HXTP_2$ that aids in creating a thin film when drop casted onto glassy carbon electrodes (GCE). SEM analysis of the drop-cast films confirmed that the sonication did not substantially alter the morphology of $Cu_3HHTP_2$ MOFs, as evident by the presence of distinct rod-like crystals (FIG. 4 and FIG. 5).

Figure 6:
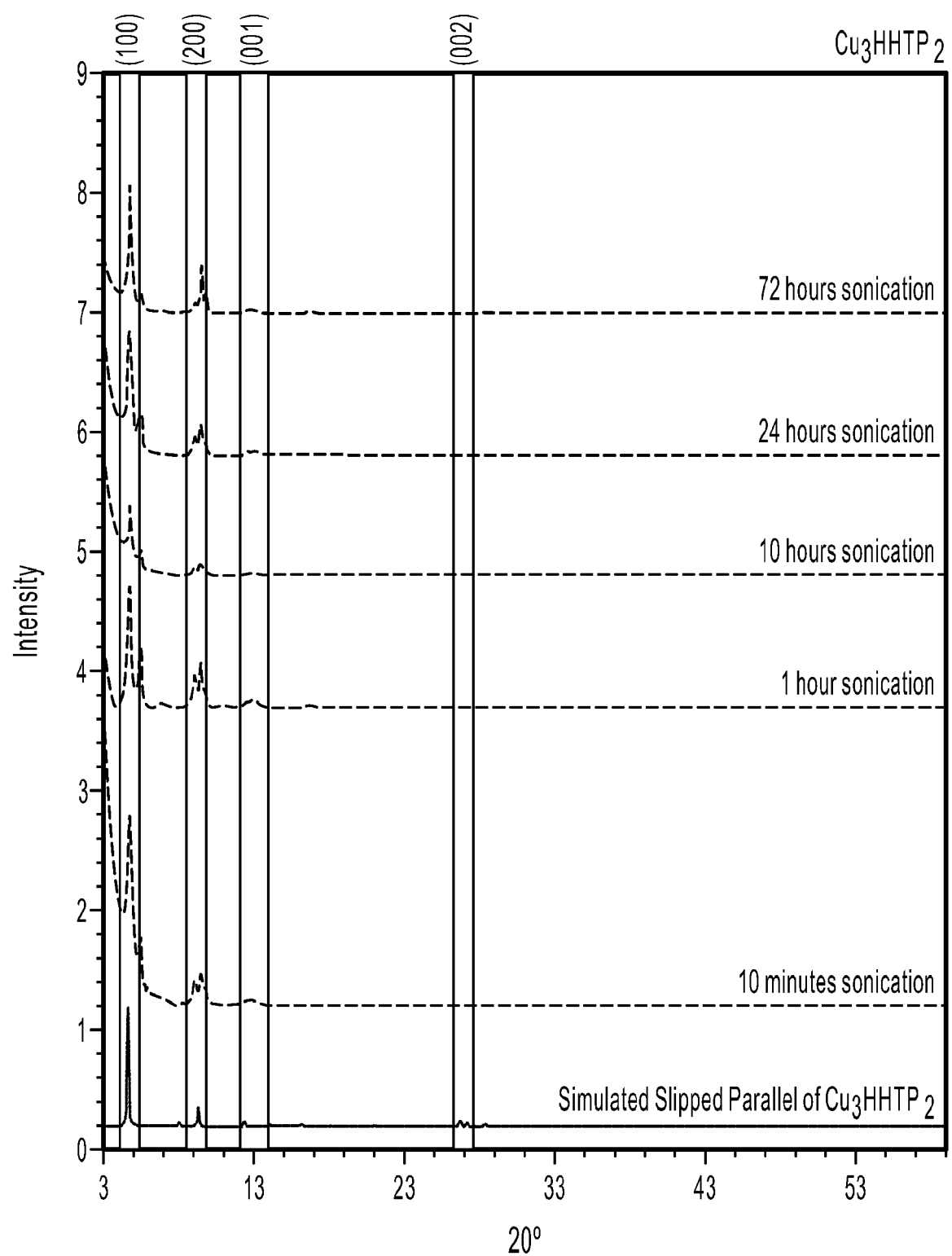
FIG. 6 illustrates experimental (colored) and simulated slipped parallel and eclipsed powder X-Ray diffraction patterns obtained for $Cu_3HHTP_2$ dispersed in $H_2O$ for 10 min, 1 hour, 10 hours, 24 hours, and 72 hours drop-casted directly onto the low background Si zero-diffraction plates.

PXRD patterns of the $Cu_3HHTP_2$ MOFs revealed that the prolonged exposure to mechanical treatment (sonication for 72 h) had a minimal effect on the overall crystallinity, as diffraction peaks were retained (FIG. 6).

Figure 7A:
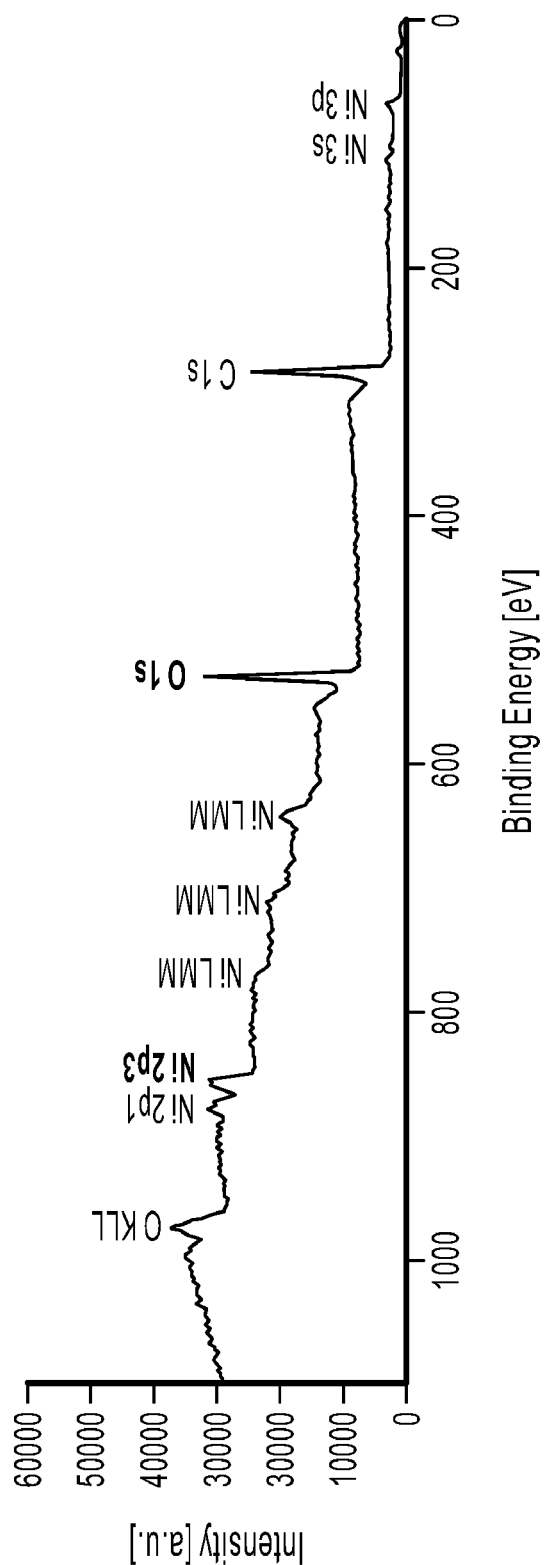
FIG. 7A illustrates X-ray photoelectron spectroscopy spectra obtained for the $Ni_3HHTP_2$ metal-organic frameworks.
Figure 7C:
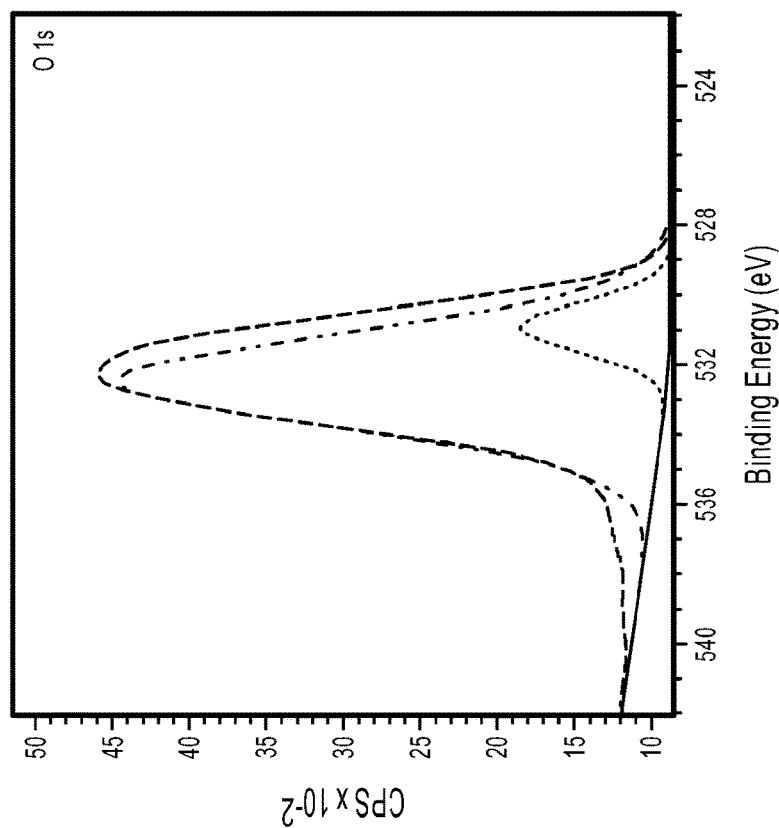
FIG. 7C illustrates a high-resolution spectrum in the O 1s region.
Figure 7B:
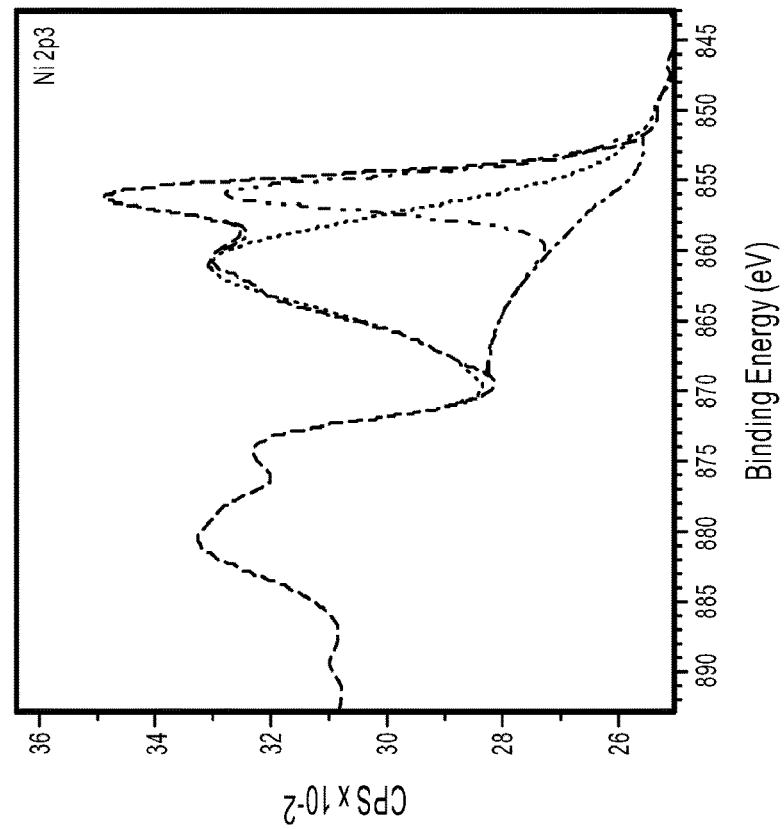
FIG. 7B illustrates a high-resolution spectrum in the Ni 2p3 region.
Figure 8A:
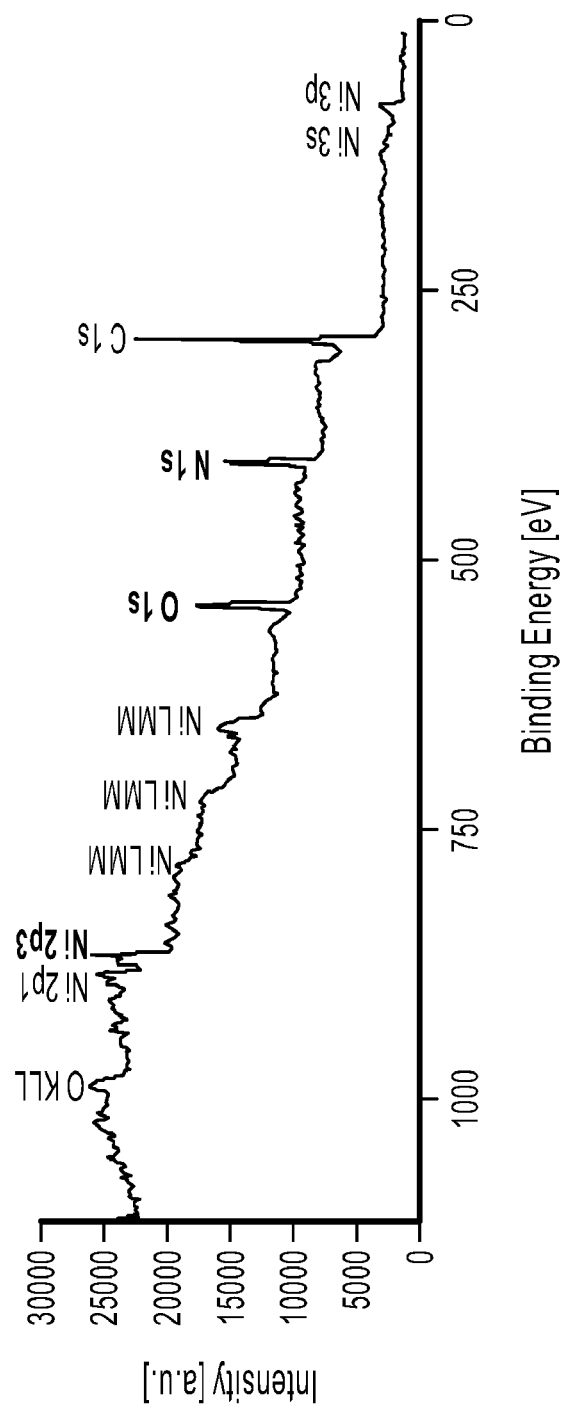
FIG. 8A illustrates X-ray photoelectron spectroscopy spectra obtained for the $Ni_3HITP_2$ metal-organic frameworks.
Figure 8C:
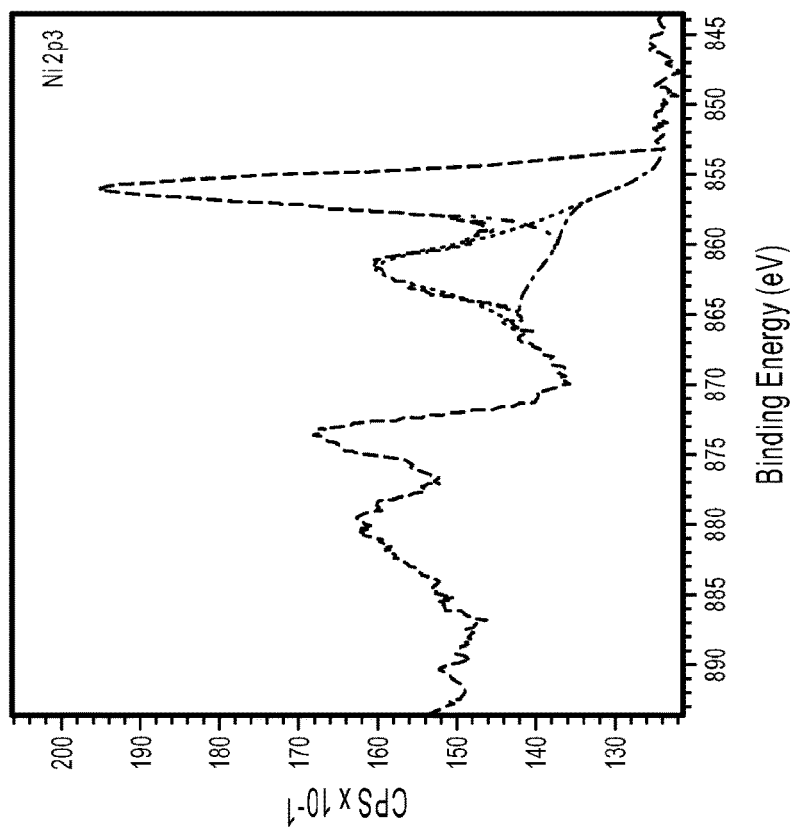
FIG. 8C illustrates a high-resolution spectrum in the Ni 2p3 region.
Figure 8B:
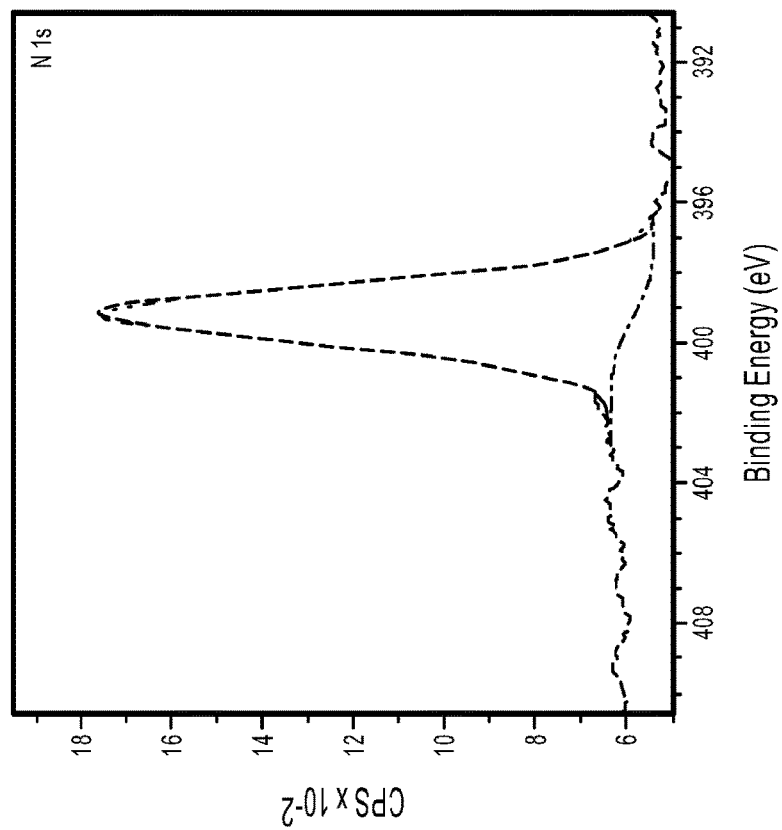
FIG. 8B illustrates a high-resolution spectrum in the N 1s region.
Figure 9A:
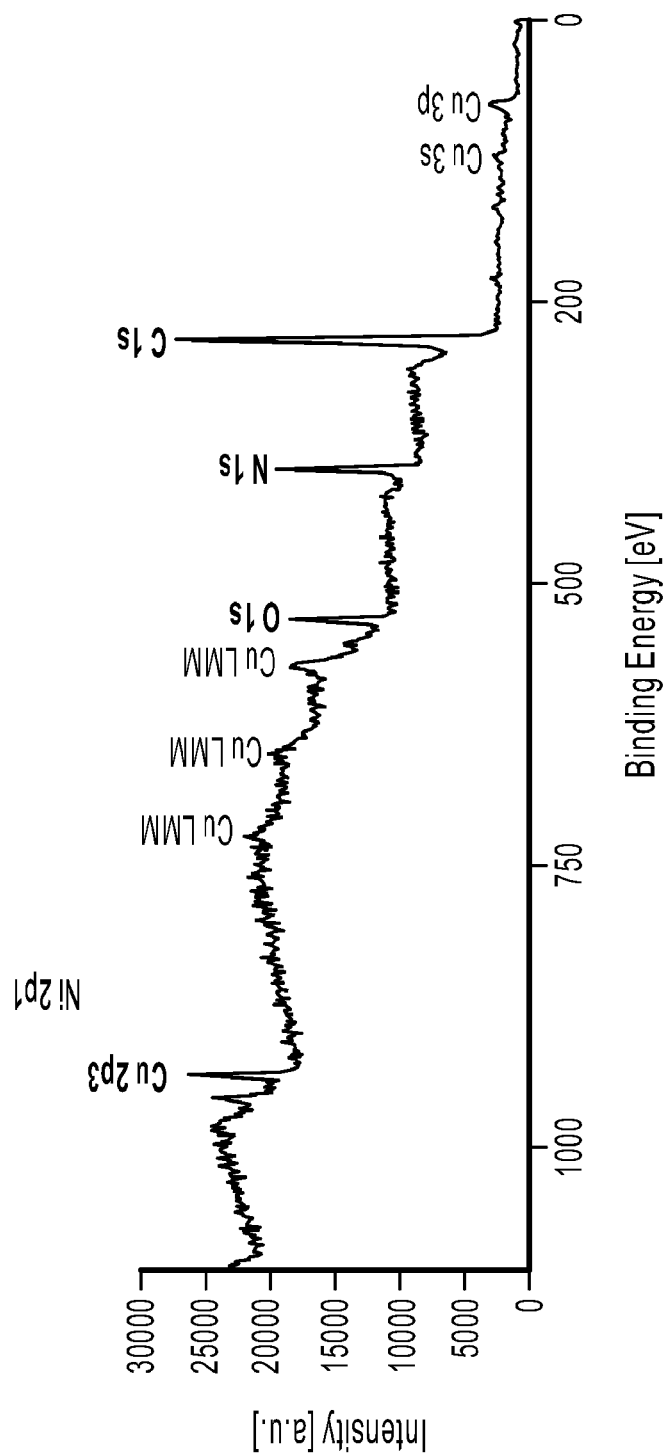
FIG. 9A illustrates X-ray photoelectron spectroscopy spectra obtained for the $Cu_3HITP_2$ metal-organic frameworks.
Figure 9C:
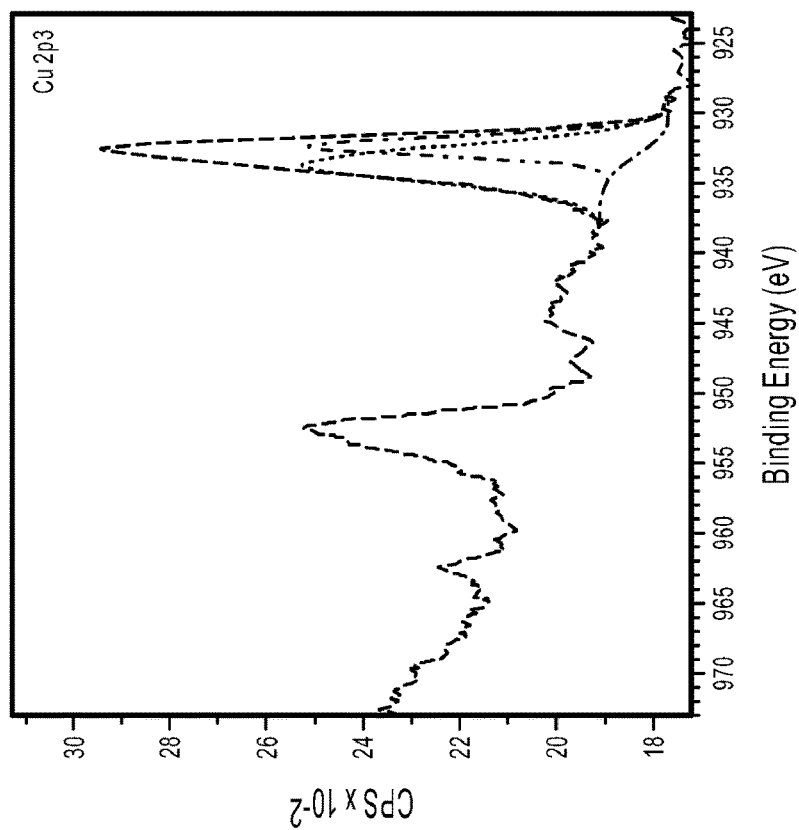
FIG. 9C illustrates a high-resolution spectrum in the Cu 2p3 region.
Figure 9B:
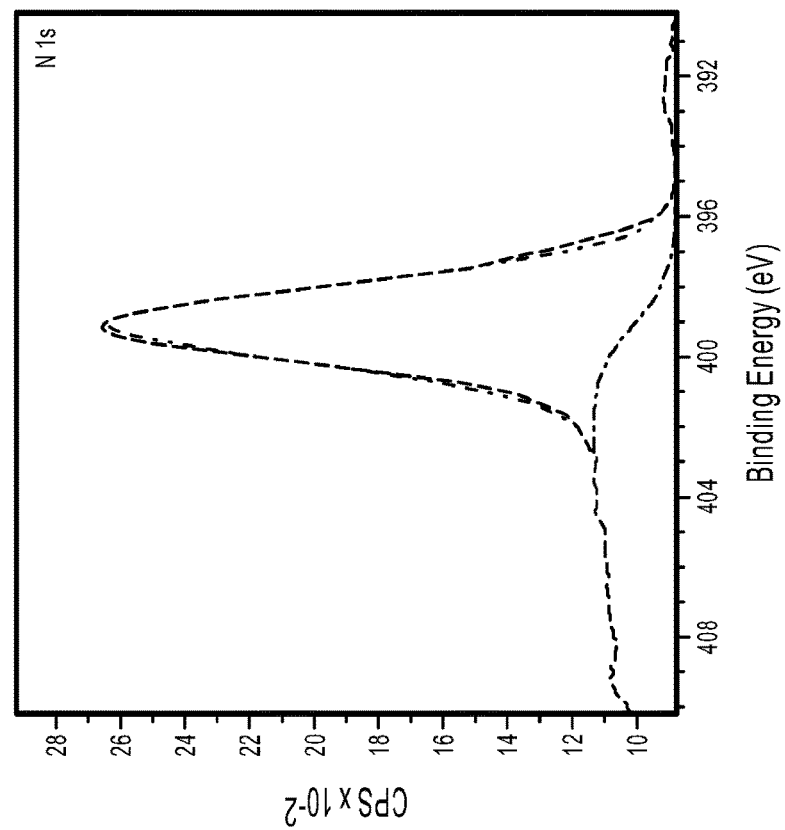
FIG. 9B illustrates a high-resolution spectrum in the N 1s region.
Figure 10A:
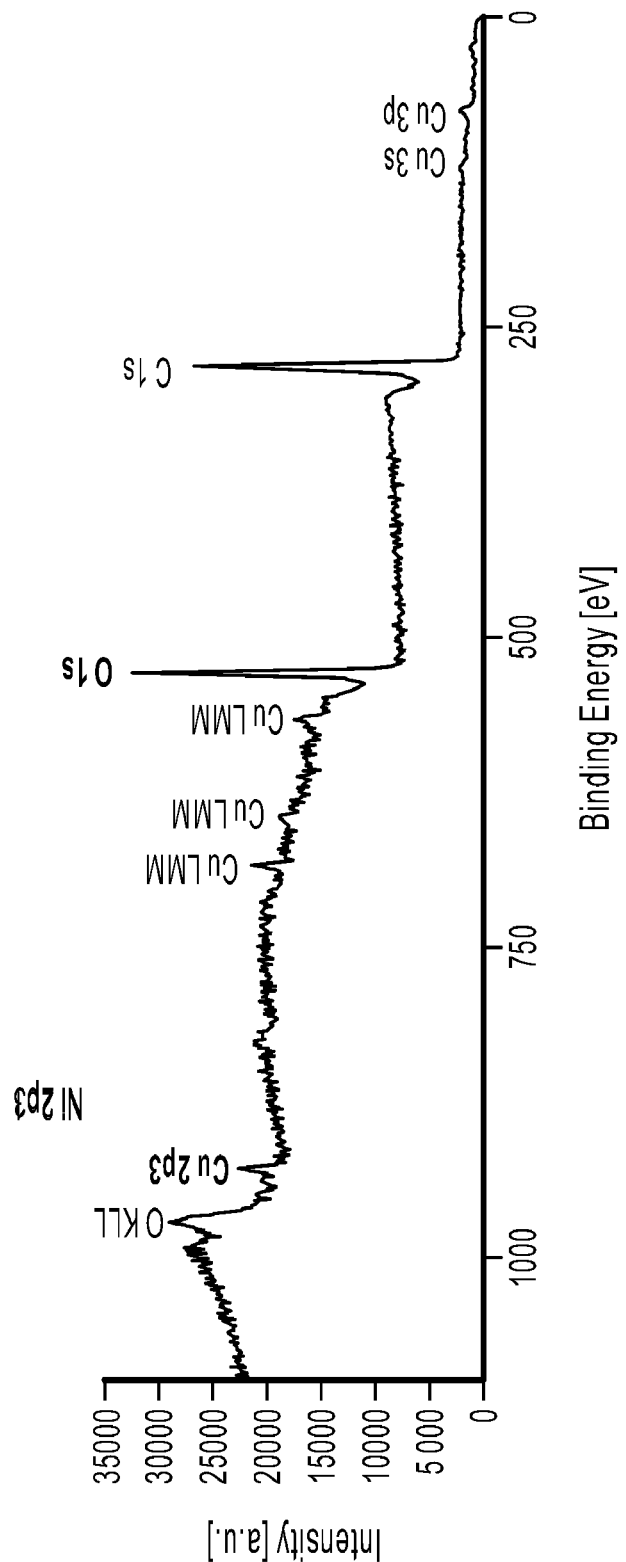
FIG. 10A illustrates X-ray photoelectron spectroscopy spectra obtained for the $Cu_3HHTP_2$ metal-organic frameworks.
Figure 10B:
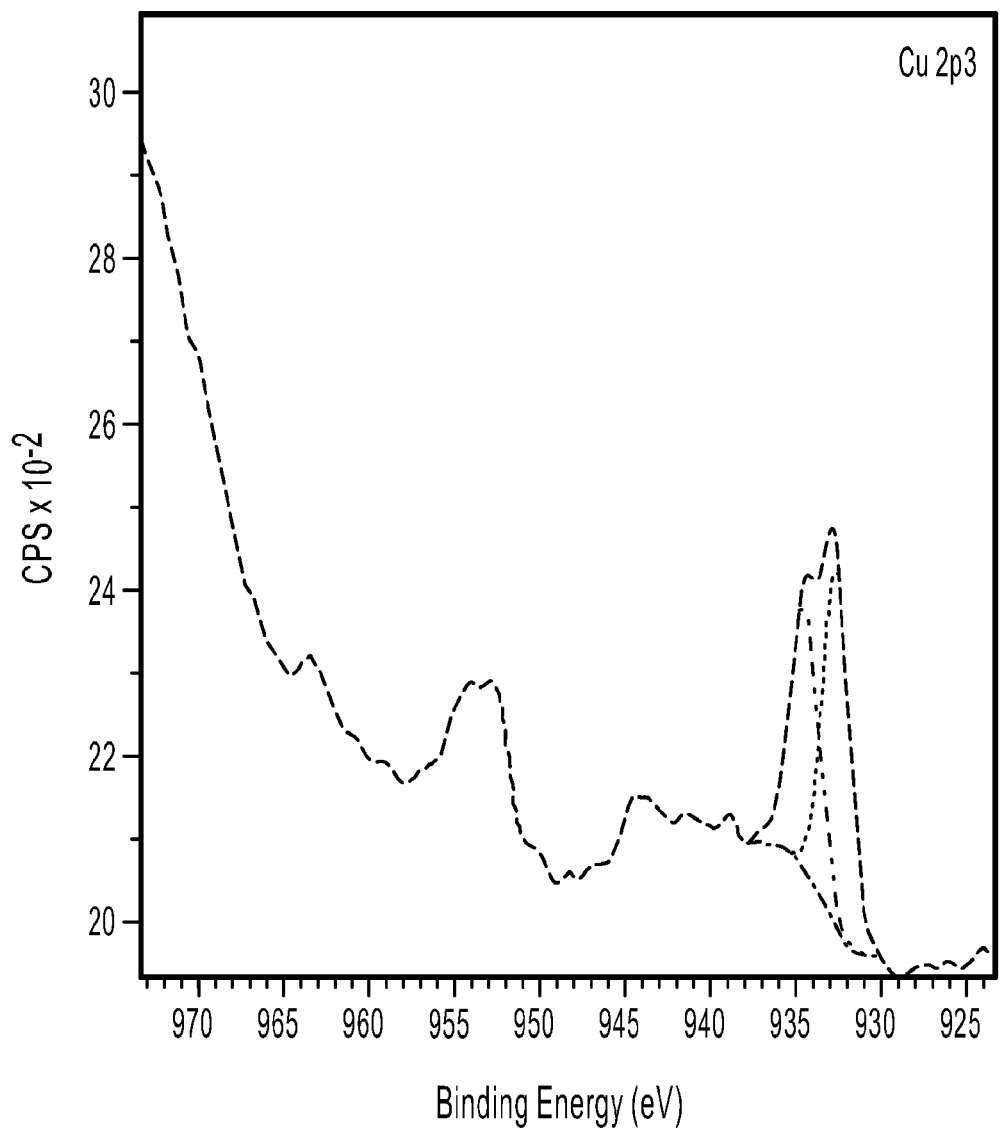
FIG. 10B illustrates a high-resolution spectrum in the Cu 2p3 region.
Figure 10C:
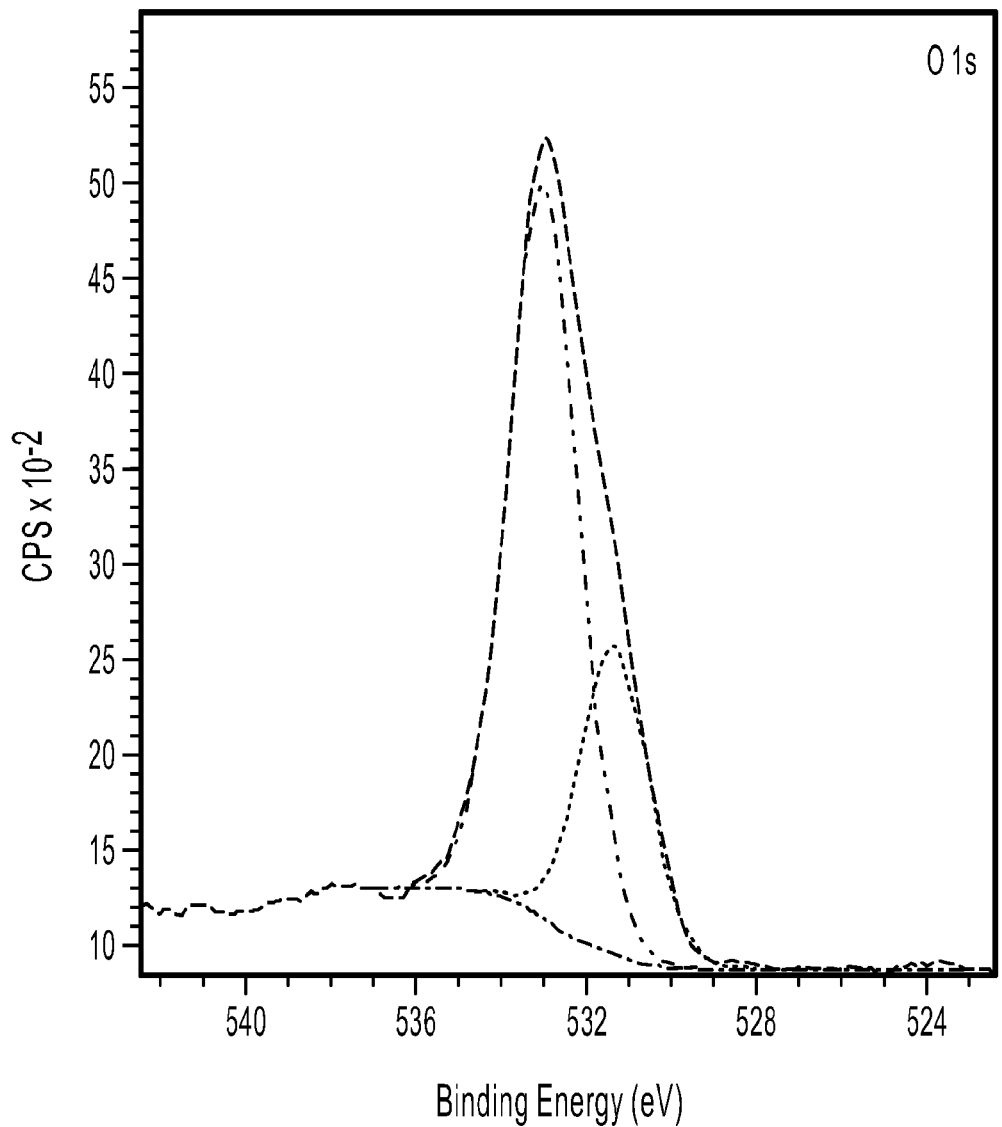
FIG. 10C illustrates a high-resolution spectrum in the O is region.

High resolution XPS spectra of $Ni_3HHTP_2$ and $Ni_3HITP_2$ MOFs revealed the presence of two distinct peaks with binding energies of −851 and −870 eV for $Ni_3HXTP_2$, which were assigned to 2p3/2 and 2p1/2 levels, respectively (FIGS. 7A-C-FIGS. 10A-C). Further deconvolution of Ni 2p regions confirmed that only one type of Ni is present within $Ni_3HXTP_2$ MOFs (FIG. 7B and FIG. 8C). Two distinct chemical environments were observed for $Cu_3HXTP_2$ MOFs with peaks maximum at approximately 932.8 and 934.6 eV, indicating mixed valency ($Cu^{1+}/Cu^{2+}$) within the framework (FIG. 9C and FIG. 10B). These findings are consistent with previous reports.

The BET surface areas of the $M_3HXTP_2$ MOFs (M=Ni, Cu; X=NH, O) synthesized have been reported previously (473 $m^2/g$-284 $m^2/g$).

Example 1.4. Characterizing the Intrinsic Electrochemical Properties of $M_3HXTP_2$ MOFs To characterize applicability of MOF-based electrodes in voltammetric detection, Applicants examined the intrinsic electrochemical performance of $M_3HXTP_2$ MOF thin films (M=Ni or Cu; and X=O or NH) drop-cast on glassy-carbon electrodes.

Figure 11A:
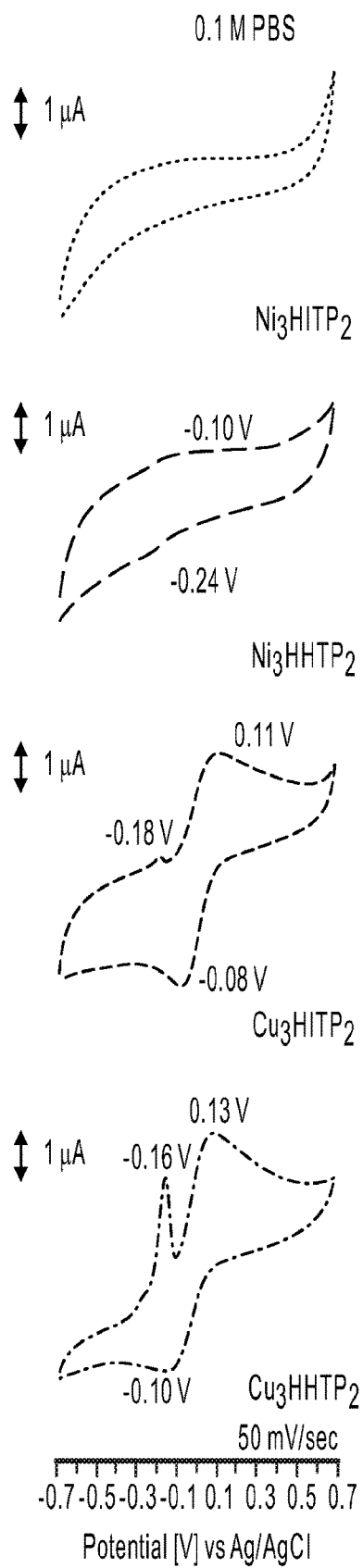
FIGS. 11A-D illustrate cyclic voltammograms obtained for $M_3HHTP_2$ metal-organic frameworks (M=Ni, and Cu) and $M_3HITP_2$ metal-organic frameworks (M=Ni, and Cu) in 0.1 M phosphate buffer saline (FIG. 11A); 100 μM of ascorbic acid (FIG. 11B); in 10 μM of dopamine (FIG. 11C); and in 100 μM of uric acid (FIG. 11D) in 0.1 M phosphate buffer saline (pH=7.4). All voltammetric measurements were run at 50 mV/sec in twenty-five electrode configurations—metal-organic framework films coated glassy carbon electrode, silver/silver chloride, and platinum were used as working, reference and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.

Cyclic voltammetry of $Ni_3HXTP_2$ in 0.1 M PBS (pH=7.4) drop-cast onto GCE revealed the presence of one slight anodic peak at −0.10 V and one cathodic redox wave at −0.24 V in $Ni_3HHTP_2$ indicating the presence of faradaic processes, but no significant oxidation or reduction was observed for $Ni_3HITP_2$ (FIGS. 11A-D). $Cu_3HHTP_2$ MOF in 0.1 M PBS exhibited a well-defined redox couple with two oxidation processes at −0.16 V and 0.13 V and one reduction process at −0.10 V. The voltammetric measurements of $Cu_3HITP_2$ MOFs had very similar redox couples with two anodic peaks at −0.18 V and −0.30 V and one cathodic peak at −0.08 V (FIG. 11A).

The presence of distinct redox transitions in all studied $M_3HXTP_2$ MOFs, with the exception of $Ni_3HITP_2$, which showed a lack of well-defined redox peaks during the cathodic scans, in principle, may originate from the: i) redox activity of the metallic nodes or/and organic linkers (HATP and HHTP ligands can access multiple oxidation states within the MOF network; ii) co-existence of several active redox states due to the presence of defects in the MOF lattice (e.g., exposed-edges); and iii) redox-active impurities that are permanently incorporated within the porous framework. PXRD and XPS data (FIG. 3 and FIGS. 7A-C-FIGS. 10A-C) confirmed that no metallic impurities or extraneous species were present within the frameworks of $M_3HXTP_2$ MOFs, and thus ruling out possibility (iii).

Thus, Applicants hypothesize that the observed voltammetry of $M_3HXTP_2$ MOFs (M=Ni or Cu; X=NH, O) in 0.1 M PBS (pH=7.4) is likely due to the intrinsic redox activity of either the metal nodes or HHTP/HITP ligands, which can undergo reversible redox transformations between catecholate, semiquinone, and quinone forms. The observed voltammetry for $M_3HXTP_2$ MOFs in the solutions containing AA, DA, and UA has pronounced oxidation and reduction peaks that capture the analyte-centered redox activity, where the surface of the MOF functions as an electrocatalyst to promote the redox transitions for the specific analytes. This electrochemical behavior is consistent with electrochemical studies of $Ni_3HHTP_2$, and $Cu_3HHTP_2$ MOFs by Applicants, among others. Specific differences in voltammetric behavior in different studies may be attributed to buffer conditions, choice of electrolyte, ionic strength of the solution, electrode configuration, and the presence of additives. Given that MOFs exhibit permanent porosity, changes in the cumulative pore volume as a function of the MOF layer thickness deposited on the electrode surface may be further manifested by the unique voltammetry of these materials.

Figure 11B:
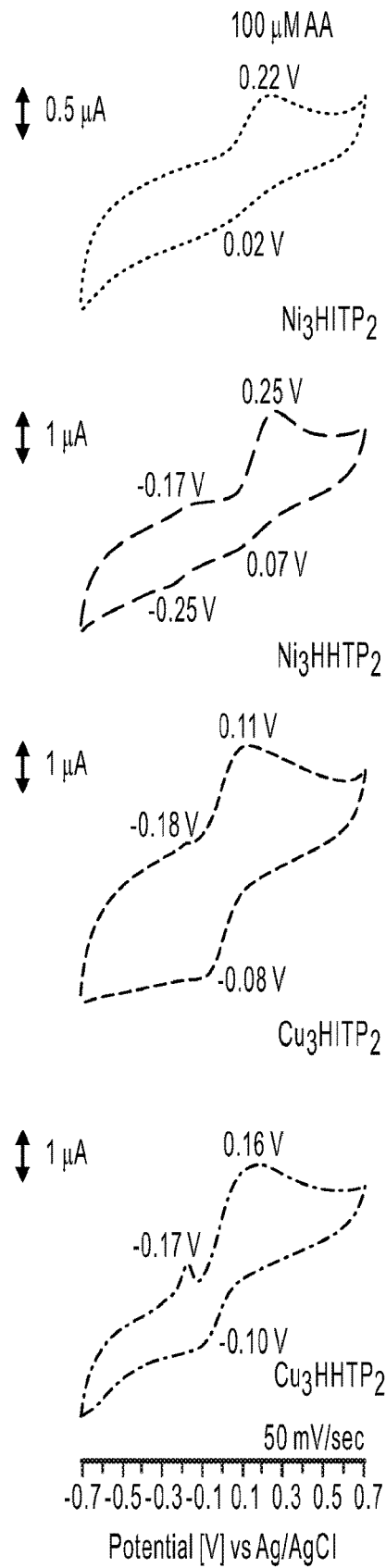
Figure 12:
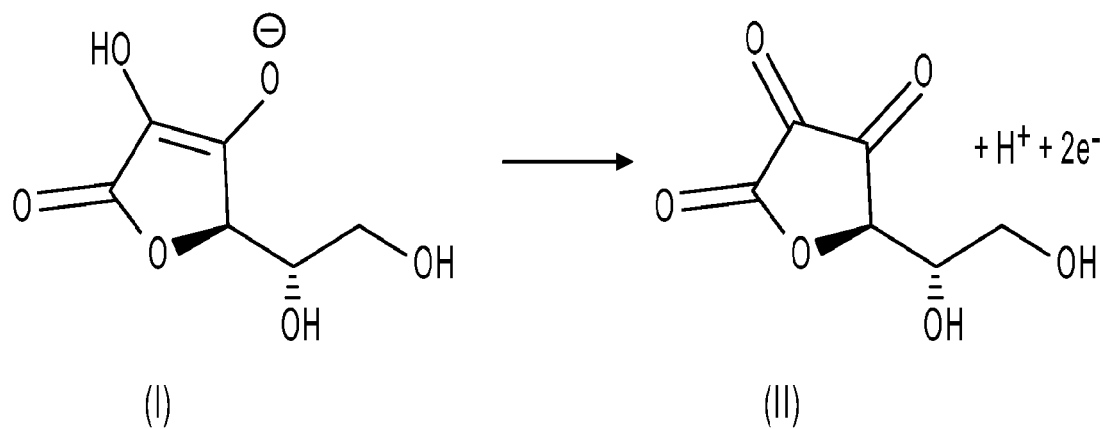
FIG. 12 illustrates a proposed redox pathway for oxidation of ascorbic acid.

Example 1.5. Assessing the Electrochemical Response of $M_3HXTP_2$ MOFs Towards Ascorbic Acid The oxidation of AA is a two-electron, and one-proton mediated redox transformation, with electron-transfer kinetics being strongly influenced by the surface chemistry and microstructure of the electrode (FIG. 12). The electrochemical oxidation of AA on unmodified surfaces (e.g., GCE) may result in the accumulation of reaction products on the electrode surface, and consequently lead to irreversible voltammetric response. Modifications of electrode surface have been proposed to enhance electrode kinetics and improve reversibility of the system. FIG. 11B, and Table 2-Table 5 demonstrate the cyclic voltammetric response obtained with MOF films coated electrodes for 100 μM of AA in 0.1 M PBS (pH=7.4). Voltammetric measurements of $Ni_3HHTP_2$ revealed semi-reversible response to cycling in the presence of AA with $_AEp$ of 0.18 V, similar to the semi-reversible response of $Ni_3HITP_2$ to AA with $_AEp$ of 0.20 V leading to the $K_0$ of X cm $s^{-1}$, respectively (FIG. 11B). In contrast, electrodes coated with $Cu_3HHTP_2$, and $Cu_3HITP_2$, displayed quasi-reversible response to AA oxidation with $_AEp$ of 0.26 V, 0.19 V, and $k_0$ of 2.49×$10^{-3}$ and 1.77×$10^{-3}$ cm $s^{-1}$, respectively.

Another notable difference between the studied MOF-based electrodes was that the anodic peak potential of AA at $Cu_3HHTP_2$, and $Cu_3HITP_2$ ($E_{oxidation}$=0.16 V, and 0.11 V respectively) was significantly shifted to more negative potentials with respect to $Ni_3HXTP_2$ (X=O, NH) structural analogs ($E_{oxidation}$=0.25 V, 0.22 V respectively), demonstrating the surface sensitivity of AA oxidation (FIG. 11B). Interestingly, $M_3HHTP_2$ MOFs (M=Ni, and Cu) consistently showed lower heterogenous electron transfer rates than their HITP analogs, indicating that the latter ligand may exert a stabilizing effect on the AA oxidation (Table 5).

Figure 13:
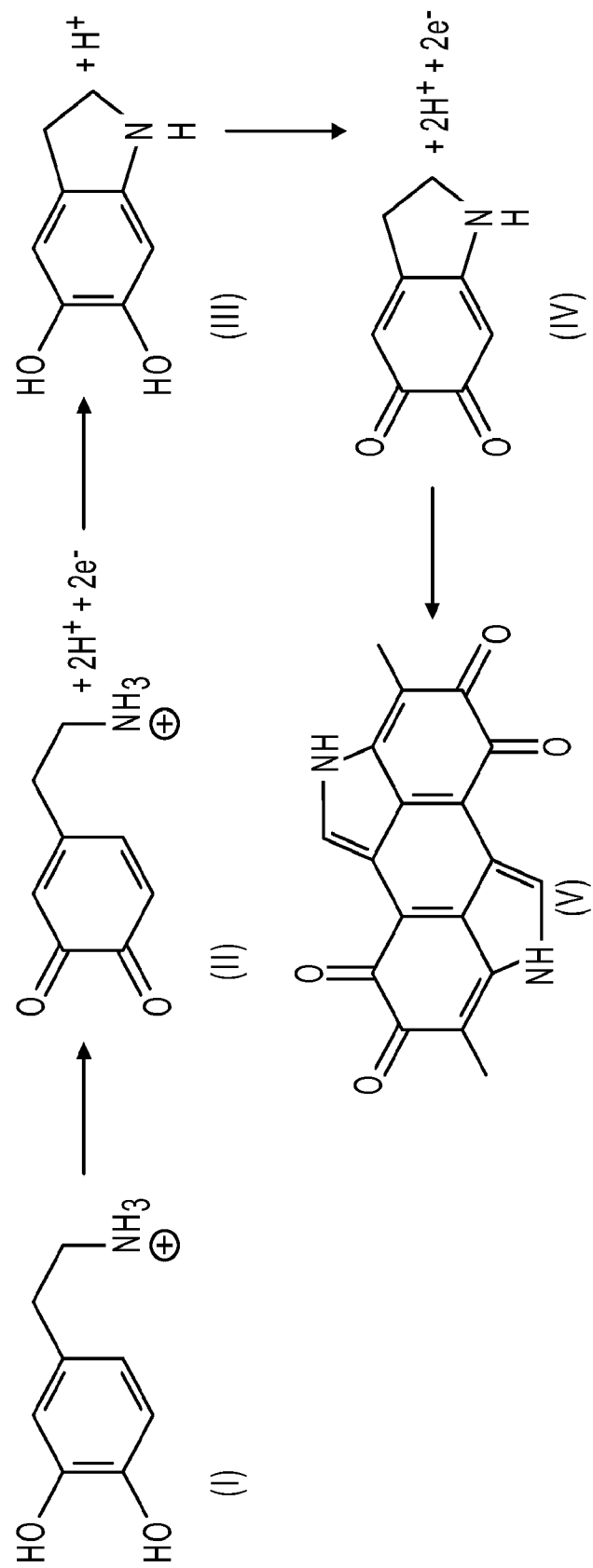
FIG. 13 illustrates a proposed redox pathway for oxidation of dopamine.

Example 1.6. Probing the Ability of MOF Film Modified Electrodes to Promote DA Redox Transformations Voltammetry of DA is known to vary considerably on different electrode surfaces. For instance, on the unmodified electrodes such as GCE, irreversible redox transformations lead to the formation of a passivating layer on the surface (FIG. 13). In the case of graphitic electrodes, the response to DA is mainly dictated by the amount of edge site functionality that tends to enhance electron transfer rates, in contrast to materials where basal plane functionality dominates. Higher loading of graphene-based materials on the electrode surface can also hinder the electron transfer rates due to the blockage of electroactive edges.

Figure 11C:
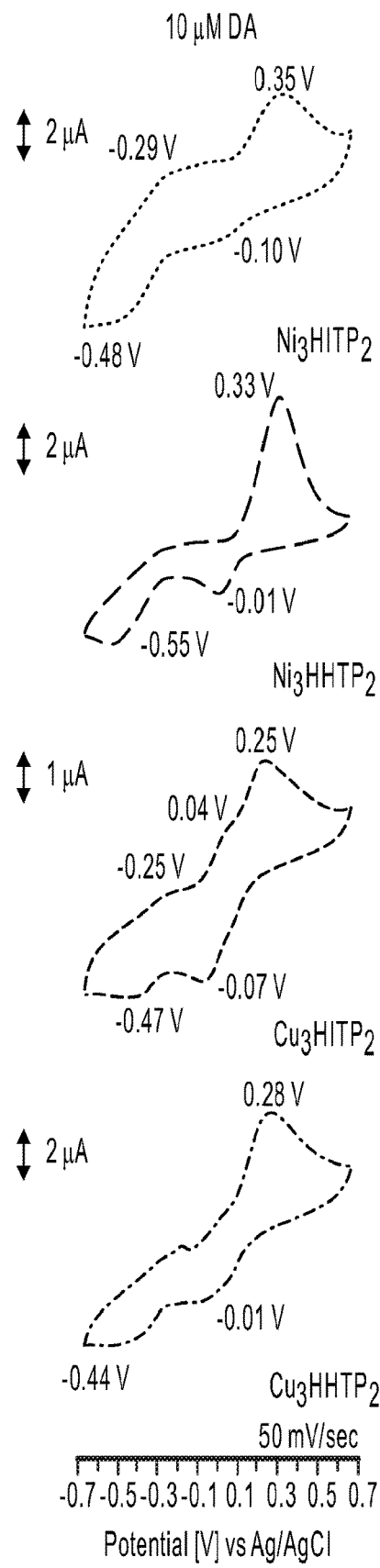

MOF modified electrodes in 10 μM of DA in 0.1 M PBS (pH=7.4) (FIG. 11C) demonstrated improved voltammetric reversibility of the DA redox couple reactions over GCE@Nafion electrode. The anodic peak potential in the range of 0.25 to 0.35 V for DA, and the appearance of a well-defined cathodic peak (FIG. 11C, and Table 2-Table 5) were observed. Such changes may indicate possible electrocatalytic activity of MOF towards dopamine redox transformation. The electrodes coated with $Ni_3HXTP_2$ MOF (X=NH, O) displayed semi-reversible voltammetry as evidenced by the presence of broad redox peaks, large peak-to-peak separations of 220 mV and 274 mV and $k_0$ of $3.15 \times 10^{-3}$ (5-75 mV s$^{-1}$), $1.46 \times 10^{-3}$ (100-1000 mV s$^{-1}$) and $1.18 \times 10^{-3}$ (5-75 mV s$^{-1}$), $1.05 \times 10^{-3}$ (100-1000 mV s$^{-1}$) cm s$^{-1}$ for $Ni_3HHTP_2$ and $Ni_3HITP_2$ MOFs, respectively (FIG. 11C and Table 2-Table 5). A similar trend was observed for electrodes modified with drop-cast layer of $Cu_3HXTP_2$, where $Cu_3HITP_2$ MOF exhibited a smaller peak-to-peak separation of 290 mV and $k_0$ of $2.82 \times 10^{-2}$ (5-75 mV s$^{-1}$), $1.58 \times 10^{-3}$ (100-1000 mV s$^{-1}$) cm s$^{-1}$ compared to the HHTP analog which had a 254 mV separation and electron transfer rates of $3.08 \times 10^{-3}$ (5-75 mV s$^{-1}$), $0.94 \times 10^{-3}$ (100-1000 mV s$^{-1}$) cm s$^{-1}$ (FIG. 11C and Table 2-Table 5).

In graphitic electrodes, the enhanced stability towards DA oxidation is typically related to a higher degree of oxygen functionalities on the electrode surface. Applicants hypothesize that the observed improvement in the response for different MOF film electrodes, compared to GCE, could be caused by three possible factors. First, the presence of hydrogen bonding and π-π interactions between the MOF and DA may accelerate the electron transfer during oxidation, and thus give rise to enhanced voltammetric response. In particular, the $M_3HITP_2$ MOFs may exert a higher stabilizing effect to DA through hydrogen bonding than $M_3HHTP_2$, if no other contributions are present such as defects in the form of exposed leading edges, such as open metal and ligand sites in the framework. Second, the apparent differences in the catalytic effect to redox transformations, between studied MOFs, may indicate large variations in the degree of basal vs edge sites contributions in each material. Third, high degree of porosity of the studied MOFs may give a more sensitive response to DA than traditional macroelectrodes in which the mass transport occurs via semi-infinite diffusion.

Example 1.7. Measuring Surface-Sensitivity to Uric Acid Oxidation

Figure 14:
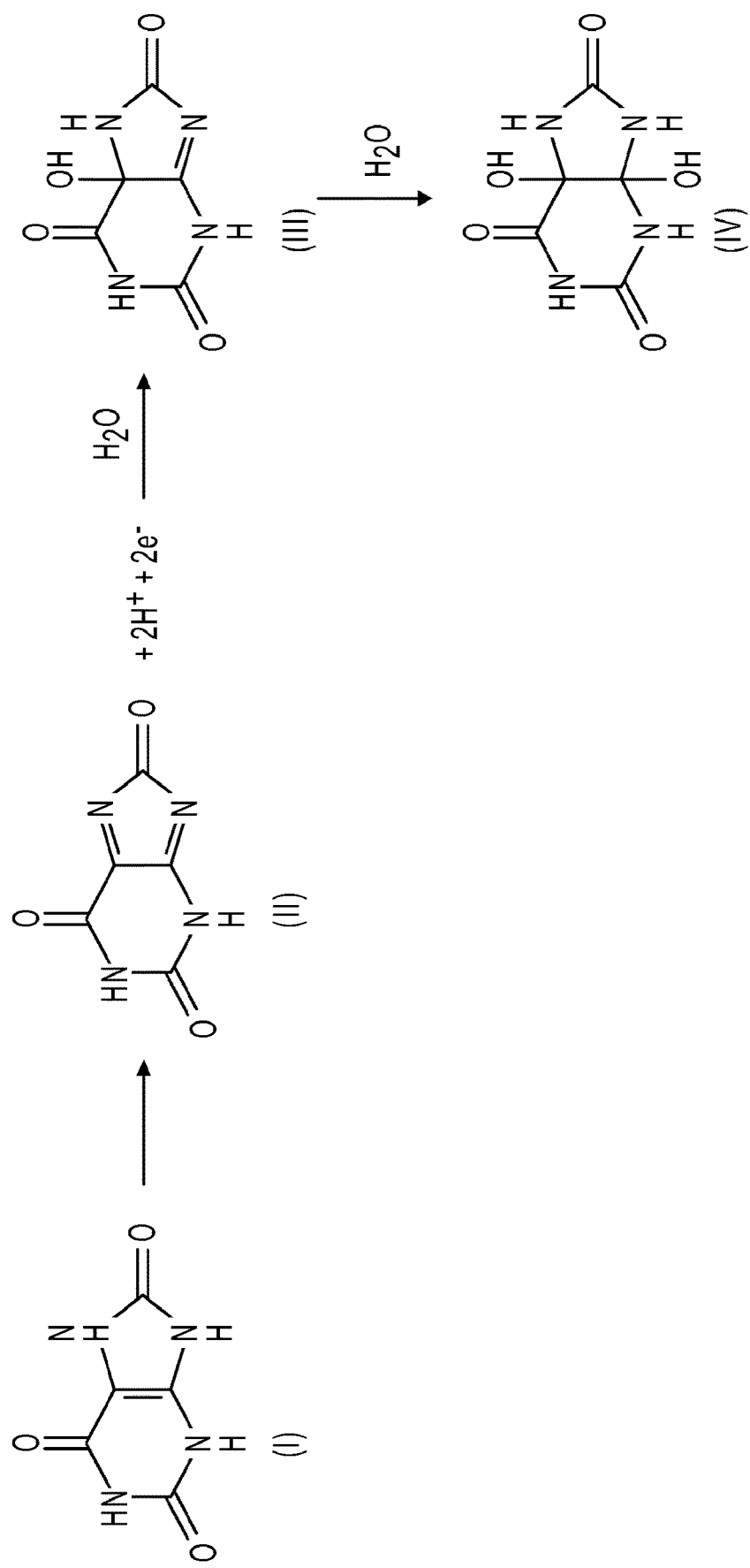
FIG. 14 illustrates a proposed redox pathway for oxidation of uric acid.
Figure 15A:
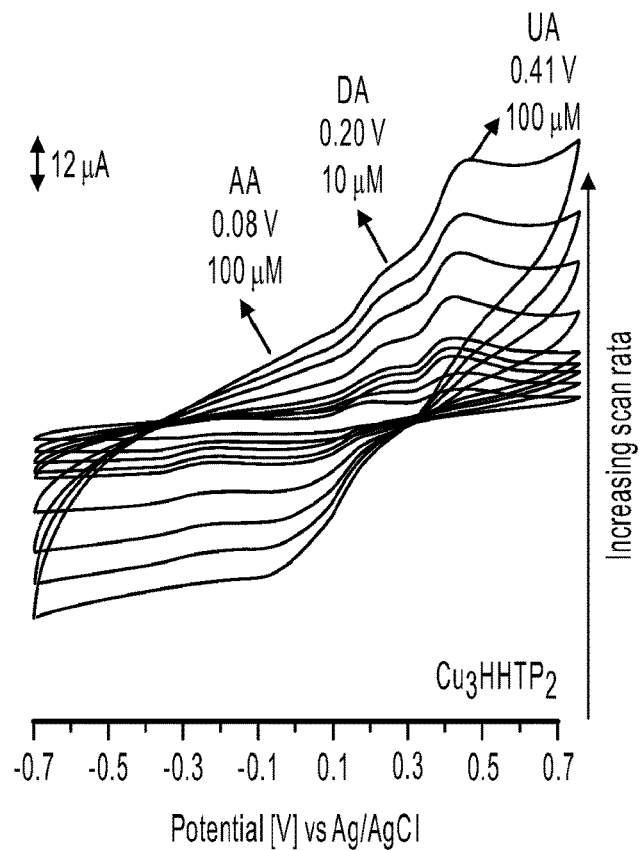
FIG. 15A illustrates cyclic voltammograms recorded for $Cu_3HHTP_2$ metal-organic framework in 100 μM of ascorbic acid, 100 μM of uric acid, and 10 μM of dopamine in 0.1 M phosphate buffer saline at different scan rates ranging from 5 mV/sec to 1000 mV/sec.
Figure 15B:
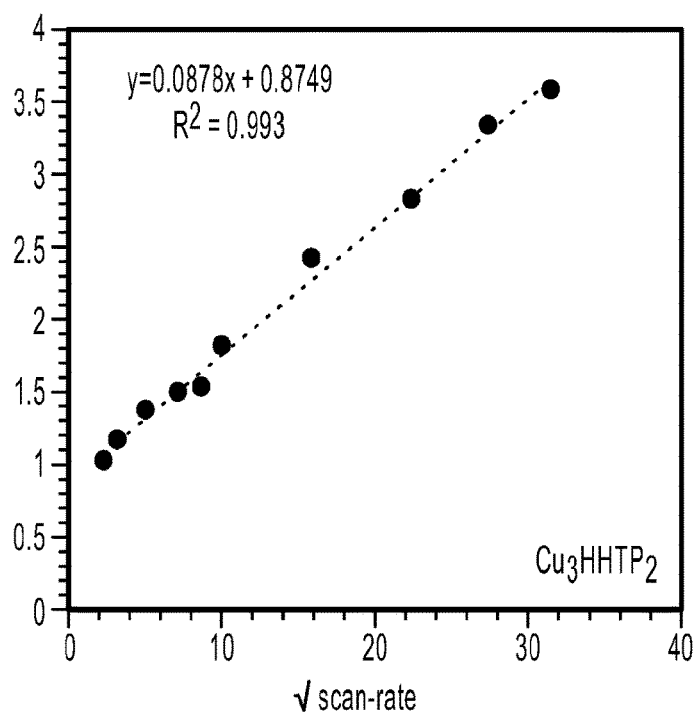
FIG. 15B illustrates a Randles-Sevcik plot of the dopamine peak current versus the √scan-rate.
Figure 15C:
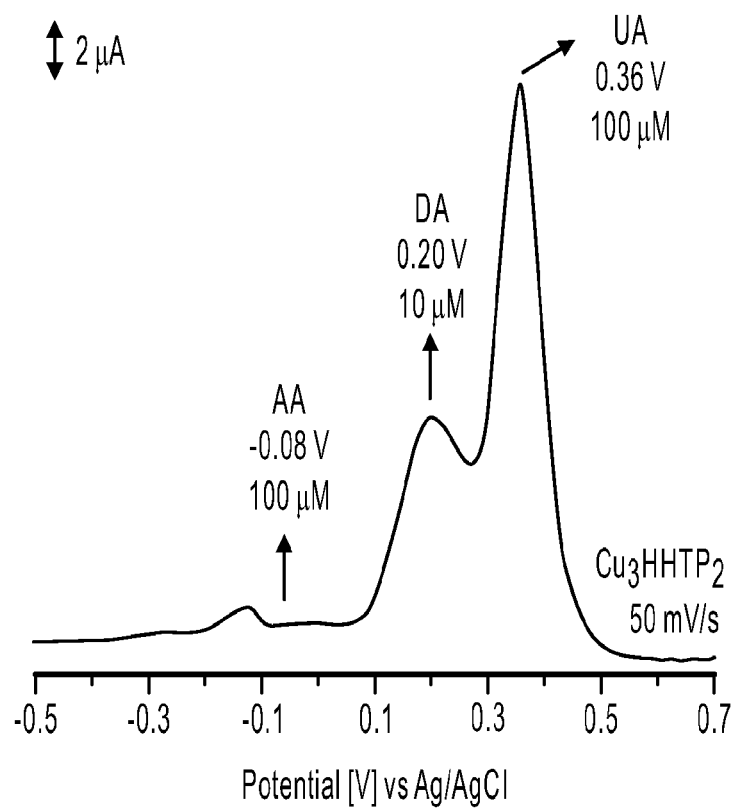
FIG. 15C illustrates differential pulse voltammetry recorded for metal-organic frameworks in 100 μM of ascorbic acid, 100 μM of uric acid, and 10 μM of dopamine in 0.1 M phosphate buffer saline solution. Differential pulse voltammetry parameters: scan rate: 50 mV/sec; pulse width: 50 msec; and amplitude: 50 mV. The solutions were degassed with $N_2$ prior to the electrochemical measurements and the drop-casted metal-organic frameworks on the glassy carbon electrode were initialized with 25 cyclic voltammetry scans at 50 mV/sec.

The oxidation of UA is typically irreversible at GCE and metal electrodes, and is quasi-reversible at graphite electrodes. The electrochemical oxidation of UA undergoes two-electron and two-proton charge transfer typically resulting in the formation of an unstable di-imine species, which can be further converted into an imine-alcohol and then uric acid-4,5 diol (FIG. 14). The uric acid-4,5 diol compound is largely unstable and can decompose to various side-products, depending on the solution pH, which may result in electrode fouling.

Figure 11D:
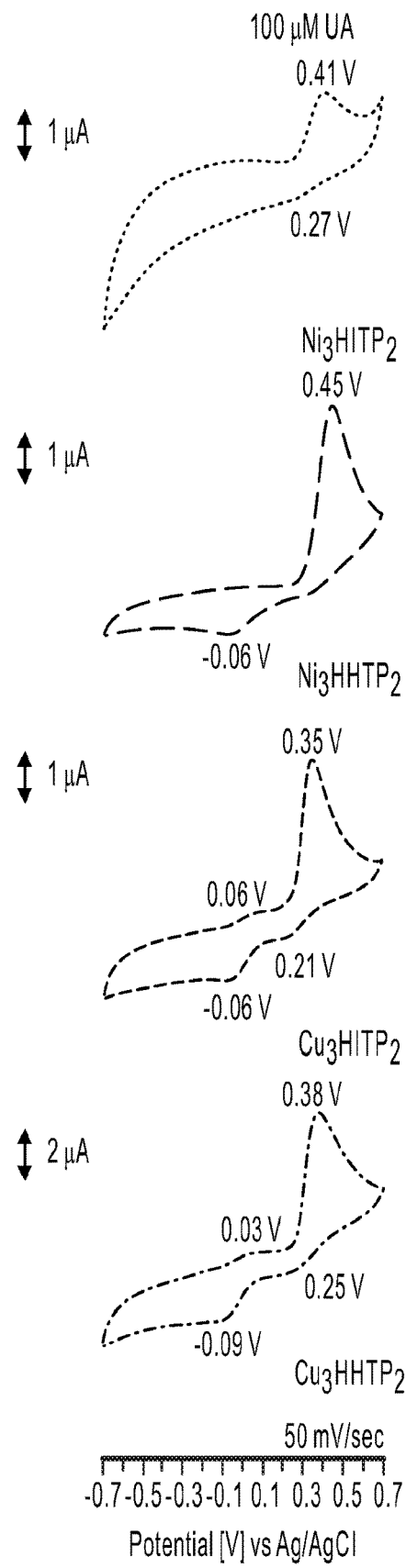

To overcome the challenge with UA detection at graphitic and metallic electrodes, Applicants probed the redox activity of 100 μM UA in 0.1 M PBS (pH=7.4) with cyclic voltammetry at MOF modified electrodes. FIG. 11D, FIGS. 15A-C and Table 2-Table 5 revealed that the some of the drop-cast MOF-based thin films can successfully catalyze the oxidation of UA, with an overall reduction in the activation potential of almost 0.14 V toward the electronegative region, in contrast to unmodified GCE (−0.49 V). The oxidation peak maxima for $Cu_3HXTP_2$ (X=O, NH) MOF films were 0.38 V and 0.35 V respectively, but when the metal center is replaced with Ni forming $Ni_3HXTP_2$ (X=O, NH) MOFs, these materials exhibited broad oxidation peak at 0.41 V and 0.45 V respectively (FIG. 11D). This voltammetric behavior of $Ni_3HHTP_2$ may suggest slow electron transfer kinetics, potentially due to the fouling of the electrode surface by the oxidation product.

Electrodes modified with $Cu_3HITP_2$ demonstrated improved electron transfer kinetics ($k_0=1.16 \times 10^{-2}$ cm s$^{-1}$) compared to the structurally analogous $Cu_3HHTP_2$ MOF ($k_0=9.27 \times 10^{-3}$ cm s$^{-1}$), suggesting that the HITP-based MOFs may possess good affinity for UA through hydrogen bonding (FIG. 11D and Table 3-Table 6).

The improved catalytic performance for UA oxidation over GCE observed for $M_3HXTP_2$ MOF (M=Ni, Cu; X=O, NH) modified electrodes may be due to the presence of surface-active sites, in the form of embedded metallic nodes or heteroatoms (NH, O) in the MOF framework. These sites can potentially interact with UA by hydrogen bonding or through electrostatic interactions, leading to negative shift in their oxidation peak potential and peak current enhancements. The glassy carbon electrodes modified with MOF film layer retained good electrocatalytic effect on UA oxidation despite the presence of repulsive electrostatic interactions between anionic form of UA and the negatively charged surface of Nafion.

Figure 16A:
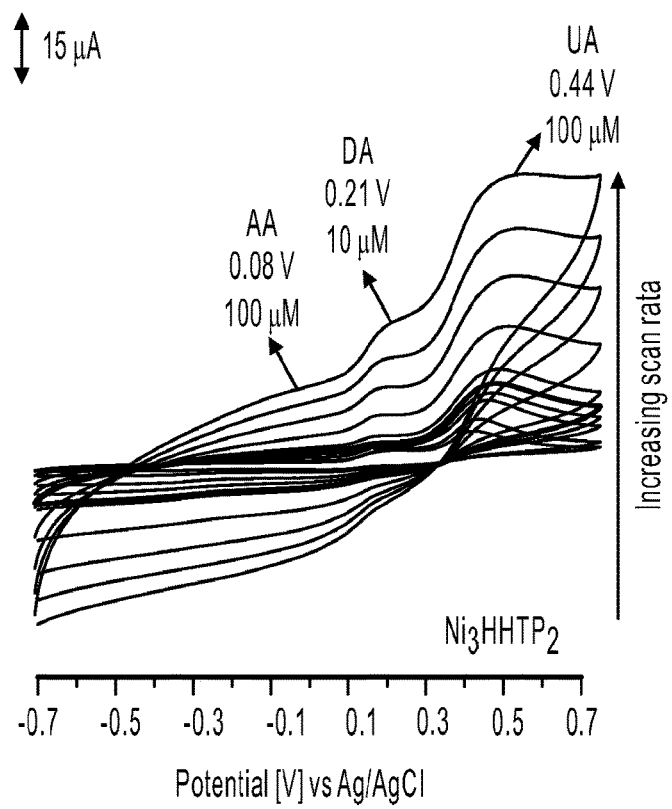
FIG. 16A illustrates cyclic voltammograms recorded for $Ni_3HHTP_2$ metal-organic framework in 100 μM of ascorbic acid, 100 μM of uric acid, and 10 μM of dopamine in 0.1 M phosphate buffer saline at different scan rates ranging from 5 mV/sec to 1000 mV/sec.

Example 1.8. Detection of Dopamine in the Presence of Interferants Using Cycling Voltammetry After the thorough investigation of voltammetric responses of $M_3HXTP_2$ MOFs to different redox probes (FIGS. 11A-D, and Table 2-Table 5), Applicants focused subsequent investigation on the detection of DA in the presence of common interferants (AA and UA) using $Ni_3HHTP_2$ MOF. Applicants selected this MOF as it maintained its morphology and crystallinity after sonication and exhibited reversible redox kinetics with high magnitude of current to all tested analytes. The differences in redox potentials for DA, and UA (0.29 V, and 0.47 V for $Ni_3HHTP_2$ MOF, respectively) make it possible to distinguish and quantify these analytes electrochemically in the same sample. FIG. 16A demonstrates cycling voltammograms recorded at different scan rates (1 mV/sec-1000 mV/sec) in 0.1 PBS solution containing a mixture of AA (100 μM), DA (10 μM), and UA (100 μM). The effect of the scan rate on the kinetics of charge transfer can be a useful parameter for controlling the intensities and the potentials of the redox waves.

Figure 16B:
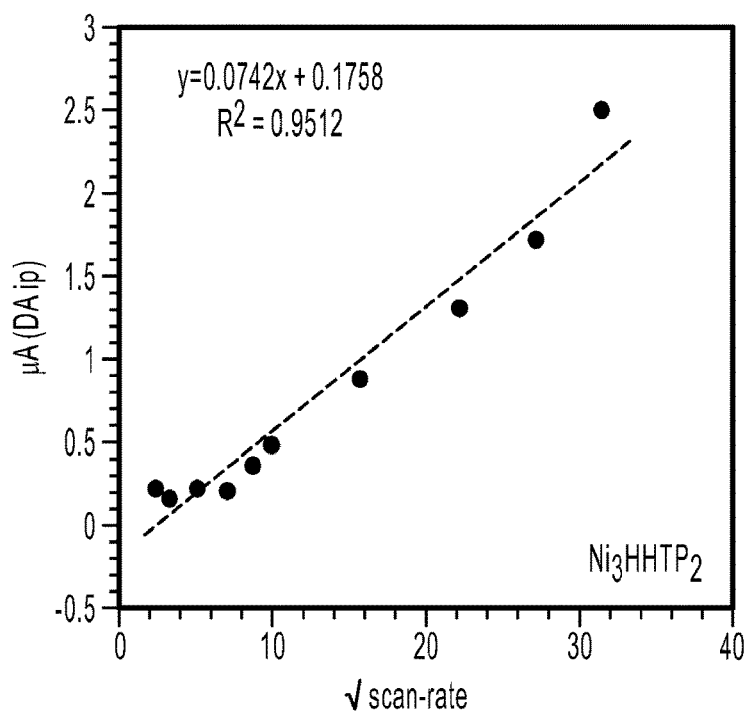
FIG. 16B illustrates Randles-Sevcik plot of the dopamine peak current versus the √scan-rate.
Figure 16C:
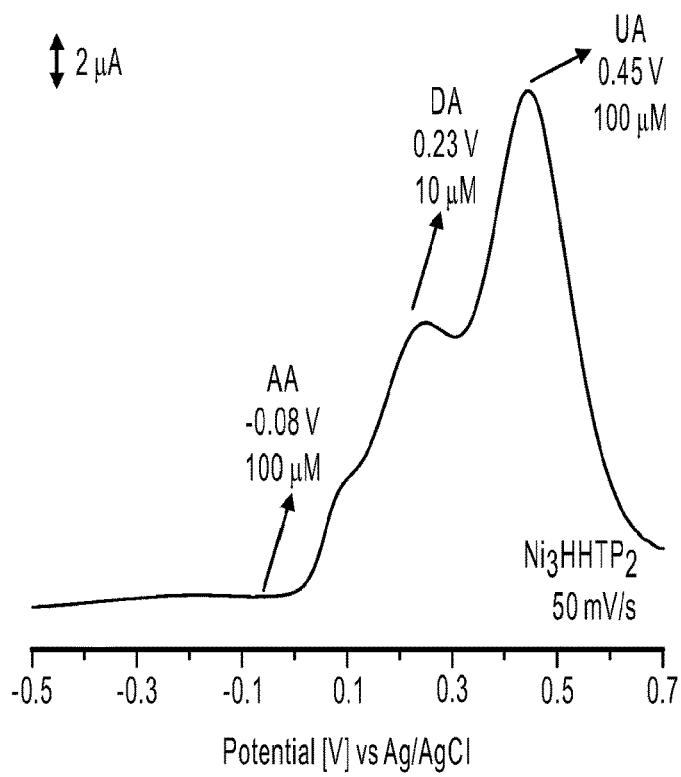
FIG. 16C illustrates differential pulse voltammetry recorded for metal-organic frameworks in 100 μM of ascorbic acid, 100 μM of uric acid, and 10 μM of dopamine in 0.1 M phosphate buffer saline solution.

For each tested scan rate, the DA peak was well separated from the UA signal and no detectable peak for AA with optimal peak-to-peak resolution between DA, and UA at 50 mV/sec. This voltammetric behavior may indicate low AA oxidation with the $Ni_3HHTP_2$ MOF. These findings can be explained by considering the slow kinetics of voltage-actuated oxidation of AA: when the scan rate is lowered, the reaction has more time to occur, and consequently a lower over-potential is required for the oxidation of AA. This behavior, in turn, provides better resolution of AA from DA, which has its peak maximum shifted from 0.20 V to more negative potential of 0.10 V (FIG. 16B-C).

The observed limited detection of the oxidation of AA may arise from slow mass transfer of AA through the MOF framework (FIG. 16A). Nonetheless, the lack of noticeable response to AA does not necessarily pose a limitation towards the practical application of the $Ni_3HHTP_2$ functionalized electrode. On the contrary, it implies higher selectivity to other studied molecules including DA and UA, the detection of which is often compromised by the presence of the AA interferants.

Figure 16D:
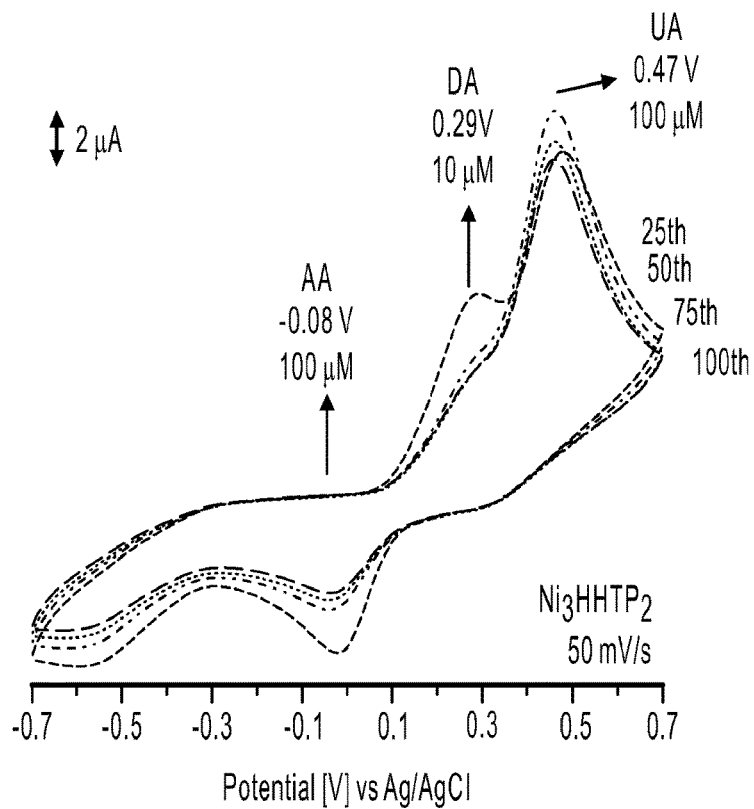
FIG. 16D illustrates stability test of $Ni_3HHTP_2$ using cyclic voltammetry showing scans 25, 50, 75, and 100.

Example 1.9. Evaluating Stability of $M_3HXTP_2$ MOF Electrodes to Electrochemical Cycling, Shelf-Life, and Reusability Evaluation of long-term performance of $Ni_3HHTP_2$ MOF as thin film electrodes by examining the CV peak currents after continuous scanning showed the retention of performance after 100 cycles for the detection of 5-HT, but visible peak decrease for DA (FIG. 16D). Applicants also attempted to evaluate the structural stability of MOF modified electrodes to electrochemical cycling by performing dopamine sensing, and subsequently analyzing the same material with PXRD. Unfortunately, small quantities of MOF used as films in voltammetric detection (5.0 mg) were not sufficient to produce a diffraction pattern.

Example 1.10. Quantitative Determination of Dopamine and Serotonin Using Differential Pulse Voltammetry In contrast to CV, differential pulse voltammetry (DPV) can offer significantly higher sensitivity for measured analytes at low concentrations due to minimal contribution of capacitive current to the measured signal. Thus, to quantify the limit of detection and resolution of MOF-based sensors, Applicants have assessed the electrochemical response of the glassy carbon electrodes modified with $Ni_3HHTP_2$ MOF for the detection of DA, UA and AA using DPV (FIG. 16C). To provide a realistic representation of the detection capability of fabricated MOF based sensors, all the reported detection limits are based on the lowest experimentally added and detectable concentrations of the specific added targeted analytes that is visually from the initial baseline DPV and statistically distinct using signal-to-noise greater than 3.

FIGS. 17A-D depict the voltammograms recorded for $Ni_3HHTP_2$ in 0.1 M PBS with different concentrations of DA, and 5-HT. The experimental parameters were optimized based on the CV results with respect to best peak resolution and short scan time (scan rate: 50 mV/sec; pulse width: 50 mV; pulse amplitude: 50 msec).

Figure 17A:
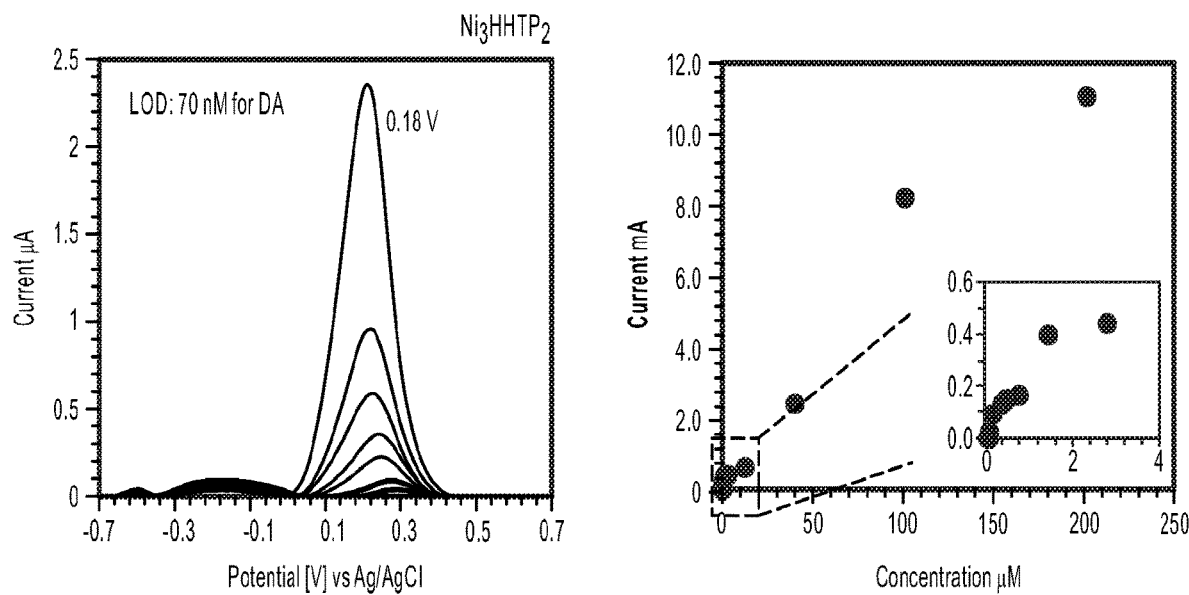
FIG. 17A illustrates differential pulse voltammograms recorded at varying concentrations of dopamine in 0.1 M phosphate buffer saline solution using $Ni_3HHTP_2$ coated glassy carbon electrode. The right illustrates concentration versus current plots with an inset showing addition at lower concentrations.
Figure 17B:
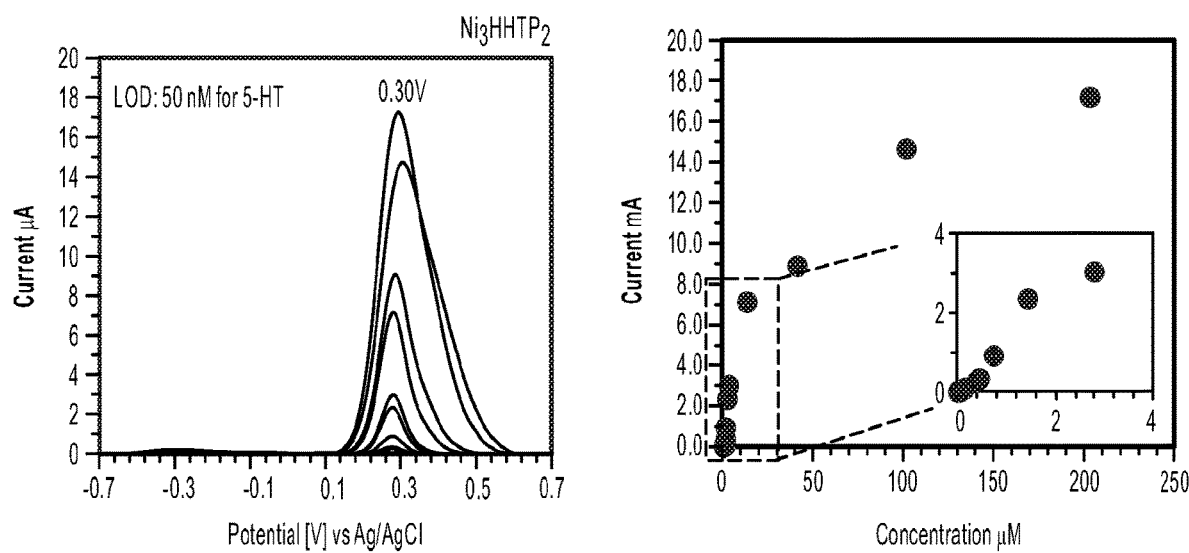
FIG. 17B illustrates differential pulse voltammograms recorded at varying concentrations of serotonin in 0.1 M phosphate buffer saline solution using $Ni_3HHTP_2$ coated glassy carbon electrode. The right illustrates concentration versus current plots with an inset showing addition at lower concentrations.

The DPV spectra recorded for each analyte (DA, and 5-HT) exhibited a redox wave at a characteristic potential and the peak current that was dependent on the analyte concentration. As shown in FIGS. 17A-B, one strong anodic peak corresponding to the oxidation of DA, and 5-HT observed at 0.18 V, and 0.30 V respectively. The magnitude of the oxidation peak currents recorded for DA increased linearly with their concentration, indicating $Ni_3HHTP_2$ to be a very stable and efficient electrocatalyst for redox driven transformations of these analytes (FIGS. 17A-B). Whereas in the case of 5-HT two linear ranges were observed with 10 nm to 3.0 μM and 5.0 μM to 200.0 μM.

Figure 17C:
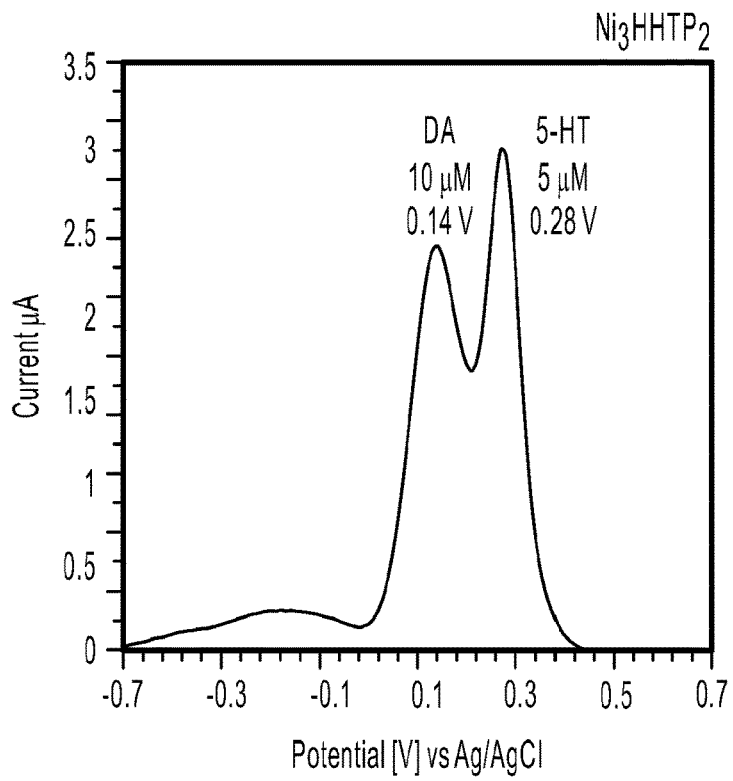
FIG. 17C illustrates differential pulse voltammograms recorded in the presence of 10 μM dopamine and 5 μM 5-HT.
Figure 17D:
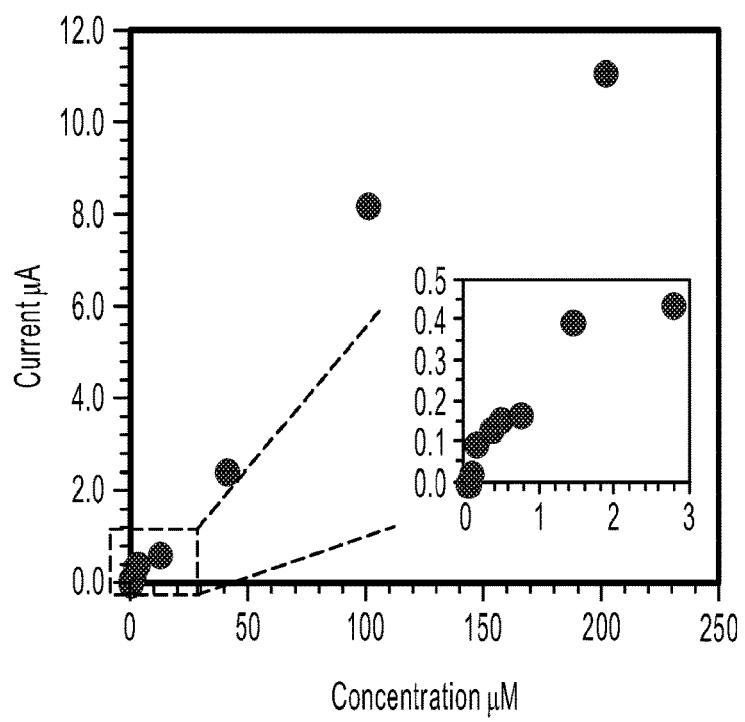
FIG. 17D illustrates concentration versus current plot of $Ni_3HHTP_2$ detecting 5-HT in the presence of 10 μM dopamine. Differential pulse voltammetry parameters: scan rate: 50 mV/sec; pulse width: 50 msec; and amplitude: 50 mV.

During the electrochemical determination dopamine and serotonin, the LODs were 70 nM and 20 nM respectively for single analyte detection (FIGS. 17A-B). Interestingly, at higher concentrations of DA and 5-HT significant peak broadening is observed (>50 μM) that may indicate partial irreversibility of the voltage-actuated response to these analytes due to interactions between electro-oxidized intermediates which may form redox in-active species ultimately leading to the termination of the electroanalytical response. Applicants proceeded to probe the ability of these materials for simultaneous determination of 5-HT in the presence of DA due to the co-existence of these redox active analytes in many biological systems. The resolution of dopamine and serotonin at 10 μM and 5 μM, respectively show good peak-to-peak separation (FIG. 17C). For $Ni_3HHTP_2$ Applicants distinguished the presence of two linear ranges of response: i) 450 nM-1.4 μM, and ii) 3.2 μM-200.0 μM with LODs for 5-HT of 450 nM (FIG. 17D).

All results reported demonstrate that sensitivity and selectivity of MOF electrodes towards small molecule analytes could be modulated by altering the metallic node or organic linker within the MOF framework. For instance, specificity of conductive MOFs for DA or 5-HT oxidation may be achieved through varying the type of heteroatoms (e.g. X=NH, O) within the framework which can exhibit different affinity for hydrogen-bonding formation between the biomolecule and the MOF. Applicants anticipate that further signal enhancement can be achieved by the incorporation of known electro-catalysts such as palladium, nickel or copper into the MOF framework. In particular, such degree of tunability could potentially allow the development of multi-electrode-based assays for simultaneous determination of biomolecules with no cross-reactivity and high sensitivity.

Example 1.11. Discussion

This Example describes the first implementation of 2D conductive metal-organic frameworks as efficient electrocatalysts to achieve reversible electrochemical detection of DA, 5-HT, AA, and UA in aqueous solutions. Based on this Example, Applicants identify at least five fundamental advances for the development of MOF-based electrochemical sensors for neurochemical detection. First, the electroanalytical response (e.g., electron transfer rate or sensitivity) of conductive 2D MOFs to AA, DA, UA, and 5-HT can be modulated by isoreticular tuning of the MOF structure. The identity of the metal within the MOF strongly influences the kinetics of heterogeneous electron transfer with Pd being the most efficient and Ni being the least.

Second, MOF-modified electrodes exhibit excellent analyte sensitivity with nanomolar detection limits ($Ni_3HHTP_2$; DA=70.0 nM and 5-HT 20 μM) and good signal resolution. The sensing results for dopamine vastly surpass the performance of electrodes based on other nanostructured materials, including graphene (2.6 μM), graphene nanoflakes (1-10

μM), carbon fiber (1 μM), graphene oxide (0.27 μM), 2D hexagonal boron nitride (0.65 μM), and 3D carbon nanotube nanoweb (1-20 μM). Notably, the LOD for dopamine established in this Example rivals highly engineered devices incorporating graphene-based nanocomposites. Although the sensitivity of the devices does not yet exceed the best LOD reported for dopamine detection obtained using highly optimized materials with integrated aptamer-functionalized graphene/polymer composite (0.002 nM), the simplicity of accessibility of isoreticular MOF analogs through bottom-up solution-phase chemistry offers a potential advantage.

Third, MOF-based voltage-actuated sensors described herein are stable to electrochemical cycling and that their analytical response to tested neurochemicals is not compromised by the adsorption and subsequently passivation of electrode surface as observed for unmodified GCE or metal-based electrodes. Fourth, in contrast to many carbon-based electrodes, Applicants observed small variability in the analytical response shown through the batch-to-batch reproducibility studies. Current fabrication methods for carbon-based materials offer limited control over the presence of impurities and defects that significantly can alter the electroanalytical performance of resulting sensors.

Applicants expect that the experimental approach described herein may advance the field of electrochemical sensors. Because metal-organic frameworks are so broadly applicable and synthetically accessible, Applicants anticipate that their application in electroanalysis for the determination of biologically relevant species can be further tuned and adapted to produce multifunctional, and stable electrochemical sensing devices.

Examples 1.12. Materials and Methods: Chemicals and Instruments

Chemicals and solvents were purchased from Sigma Aldrich (St. Louis, MO), TCI (Portland, OR), Fisher (Pittsburgh, PA), or Alfa Aesar (Tewksbury, MA) and used as received. EmStat MUX16 potentiostat (Palm Instruments BV, Netherlands) and IviumStat (Ivium Technologies, Netherlands) were used for all electrochemical measurements. Scanning Electron Microscopy (SEM) and Energy Dispersive X-ray Spectroscopy (EDX) were performed using a Hitachi TM3000 SEM (Tokyo, Japan) equipped for X-ray microanalysis with a Bruker Edax light element Si(Li) detector (Billerica, MA). Powder X-ray diffraction (PXRD) measurements were performed with a Rigaku Miniflex diffractometer equipped with a 300 W/600 W Sealed tube-B (40 kV, 15 mA) CuKα (α=1.54 Å) radiation source and a D/teX Ultra 2 detector (Woodlands, TX). Nitrogen adsorption experiments were performed with a 3Flex Surface and Catalyst Characterization analyzer (Micromeritics, Norcross, GA). X-ray photoelectron spectroscopy (XPS) experiments were conducted using a Physical Electronics Versaprobe II X-ray Photoelectron Spectrometer under ultrahigh vacuum (base pressure $10^{-10}$ mbar). The measurement chamber was equipped with a monochromatic Al (Kα) X-ray source. Both survey and high-resolution spectra were obtained using a beam diameter of 200 μm. The spectra were processed with CasaXPS software. The z-dimension (height) for all electrodes were collected using a Zygo NewView 7300 Light Interferometer equipped with a 10× lens.

Example 1.13. Synthesis: Synthesis of $M_3HHTP_2$ MOFs

Synthesis of MOFs: The synthesis of metal-organic frameworks using organic linker 2,3,6,7,10,11-hexahydroxytriphenylene and 2,3,6,7,10,11-hexaaminotriphenylene was adapted from previous methods.

$Ni_3HHTP_2$: To a 100 mL round bottom flask HHTP (200 mg, 0.617 mmol) and nickel(II) acetate tetrahydrate (456 mg, 1.831 mmol) was added. 28 mL of deionized water was added to the round bottom flask. The solution was sonicated for 10 minutes. The reaction mixture was placed in a hot oil bath at 85° C. and stirred for 24 hours. The flask was allowed to cool for 2 hours then the product was filtered through a ceramic funnel and filter paper. The product was washed with deionized water (3×50 mL) and acetone (3×50 mL). The solid product (315 mg) on the filter paper was then transferred to a vial and dried the product in a vacuum oven (49° C. and 84.6 kPa for 24 hours).

$Cu_3HHTP_2$: To a 100 mL round bottom flask HHTP (200 mg, 0.617 mmol) and copper(II) trifluoroacetylacetonate (875 mg, 1.831 mmol) was added. 28 mL of deionized water was added to the round bottom flask. The solution was sonicated for 10 minutes. The reaction mixture was placed in a hot oil bath at 85° C. and stirred for 24 hours. The flask was allowed to cool for 2 hours then the product was then filtered through a ceramic funnel and filter paper. The product was washed with deionized water (3×50 mL) and with acetone (3×50 mL). The solid product (358 mg) on the filter paper was then transferred to a vial and dried the product in a vacuum oven (49° C. and 84.6 kPa for 24 hours).

$Ni_3HITP_2$: Into a 20 mL scintillation vial was added 5 mL of deionized water and $Ni(OAc)_2$ (3.383 mg, 0.0154 mmol). In a separate vial was added and 300 μL of 30% ammonium hydroxide, 10 mL of water, and HATP-HCl (40.526 mg, 0.077 mmol). The second vial was poured into the first vial and the first vial was then heated at 80° C. for 24 h exposed to air. Black precipitate was seen to form after 1 h. After 24 h, the reaction volume was filtered and was washed with water (50 mL), followed by washing with acetone for 24 h in a Soxhlet extractor followed by drying the product in a vacuum oven (49° C. and 84.6 kPa for 24 hours).

$Cu_3HITP_2$: Into a 20 mL scintillation vial was added 5 mL of deionized water, $CuSO_4$ (2.458 mg, 0.0154 mmol), and 300 μL of 30% ammonium hydroxide. Into a separate 20 mL vial was added 10 mL of water and HATP-HCl (40.526 mg, 0.077 mmol). The second vial was poured into the first vial. Black precipitate was seen to form instantly. The reaction was then heated at 80° C. for 24 h exposed to air. After 24 h, the reaction volume was filtered and was washed with water (50 mL), followed by washing with acetone for 24 h in a Soxhlet extractor followed by drying the product in a vacuum oven (49° C. and 84.6 kPa for 24 hours).

Example 1.14. Characterization of $M_3HXTP_2$ MOFs with pXRD

FIG. 3 illustrates $M_3HXTP_2$ characterization with pXRD.

Example 1.15. Scanning Electron Microscopy of $Cu_3HHTP_2$ MOFs after Sonication FIG. 5 illustrates SEM of $Cu_3HHTP_2$ after Sonication Example 1.16. Characterization of $M_3HXTP_2$ MOFs with Photoelectron Spectroscopy The XPS survey analysis confirmed the presence of NH or O and C along with the respective metals (Cu, and Ni) used for the preparation of $M_3HXTP_2$ MOFs (X=NH, O) (FIGS. 7A-C-FIGS. 10A-C).

High-resolution spectrum of the Ni 2p region revealed only a single type of Ni, further confirming that no extraneous $Ni^{2+}$ ions are present within the analyzed samples (FIGS. 7A-C-FIGS. 8A-C). As these species would be the only possible cations that could potentially balance a negatively charge material, these finding strongly point out towards charge neutrality within $Ni_3HHTP_2$ and $Ni_3HITP_2$ MOFs. Moreover, deconvoluted high resolution spectrum for O 1 s revealed the presence of two different environments ~531 eV and ~532 eV, which were assigned to C—O and C=O, respectively. These two distinct types of O can be expected for a charge neutral molecule in which the HHTP ligand can adapt semiquinone and quinone structures. In $Ni_3HITP_2$, high resolution scan of N (−399 eV) revealed the presence of only one environment suggesting that no extraneous $NH_4^+$ ions are associated with the framework.

High-resolution XPS analysis of $Cu_3HXTP_2$ MOFs (X=NH, O) also showed the presence of two peaks at 932.8 and 934.6 eV, which can be ascribed to $Cu'$ and $Cu''$ centers (60% of $Cu'$, and 40% of $Cu''$ in $Cu_3HHTP_2$ MOF; and 45% of $Cu'$, and 55% of $Cu''$ in $Cu_3HITP_2$ MOF), respectively, which is indicative of mixed valency within the MOF framework (FIGS. 9A-C—FIGS. 10A-C). The lack of charge-balancing counterions in the $Cu_3HHTP_2$ and $Cu_3HITP_2$ MOFs demonstrates that the variation from the $Cu^{2+}$ oxidation state of the metal is most likely compensated by the redox-active ligands.

Example 1.17. Characterization of $M_3HXTP_2$ Using 4-Point Probe Measurements To make a pressed pellet, 30 mg of the MOF sample was put into a 6 mm inner-diameter split sleeve pressing die and pressed for 5 min under a pressure of approximately 1000 psi. A Singatone tungsten carbide four-point linear probe was employed to collect bulk conductivity measurements of the MOFs with a space between tips of 1.25 mm. Applicants calculated the bulk conductivity measurements (S/cm) using Equation 1. Herein, 1 (A) is current, V is the voltage of cross the probes, s (cm) is distance of between the probes (1.25 mm), F (unitless) is the correction factor accounting for the diameter and thickness of the pellet.

$$\sigma = \frac{I}{V} \frac{1}{2\pi s F} \qquad \text{Equation 1}$$

Figure 18:
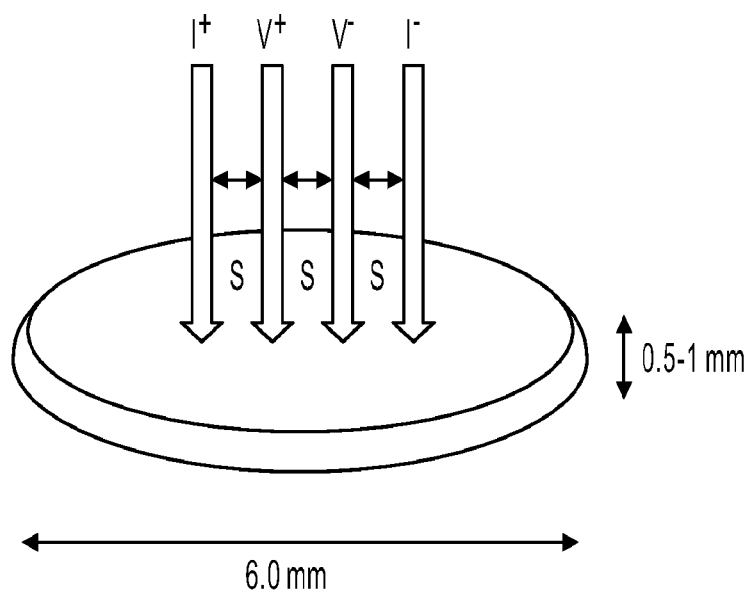
FIG. 18 illustrates a representation of a configuration for the measurement of conductivity by four-point probe method.
Figure 19A:
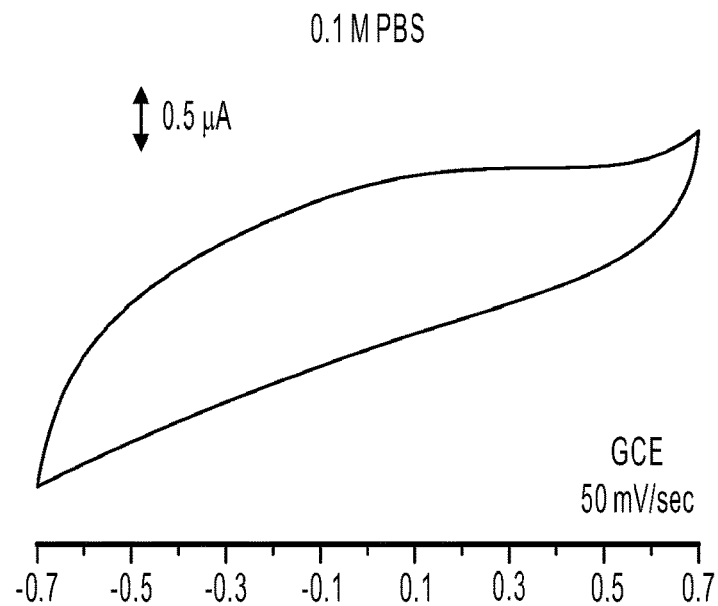
FIGS. 19A-E illustrate cyclic voltammograms obtained for glassy carbon electrodes in 0.1 M phosphate buffer saline (FIG. 19A); 100 μM of ascorbic acid (FIG. 19B); in 10 μM of dopamine (FIG. 19C); in 100 μM of uric acid (FIG. 19D); in 10 μM 5-HT (FIG. 19E) in 0.1 M phosphate buffer saline (pH=7.4). All voltammetric measurements were run at 50 mV/sec, in twenty-five electrode configurations—glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.
Figure 19B:
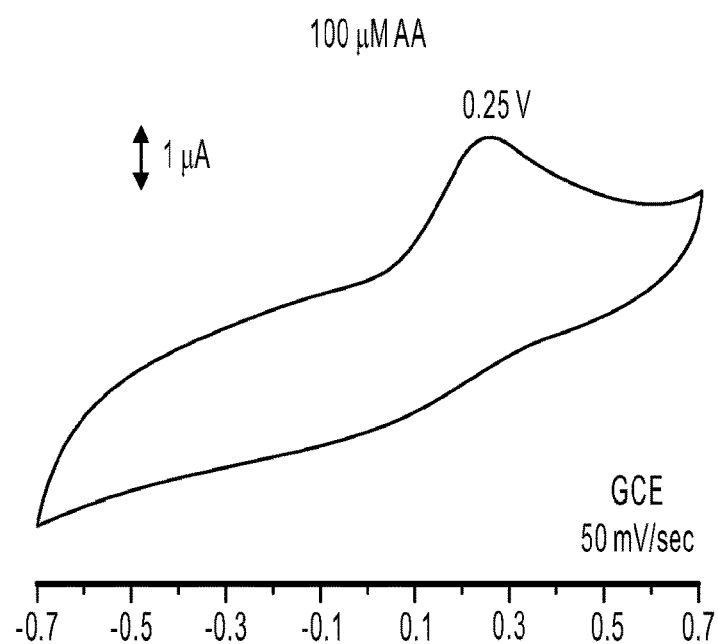
Figure 19C:
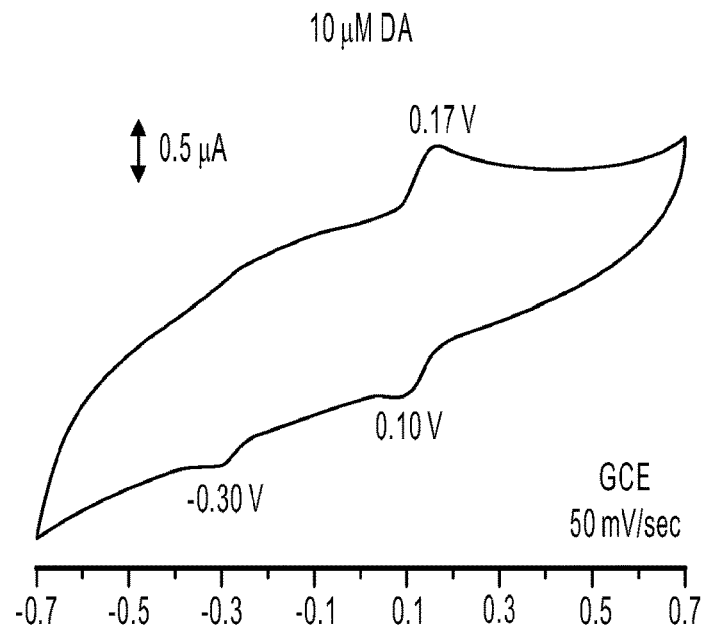
Figure 19D:
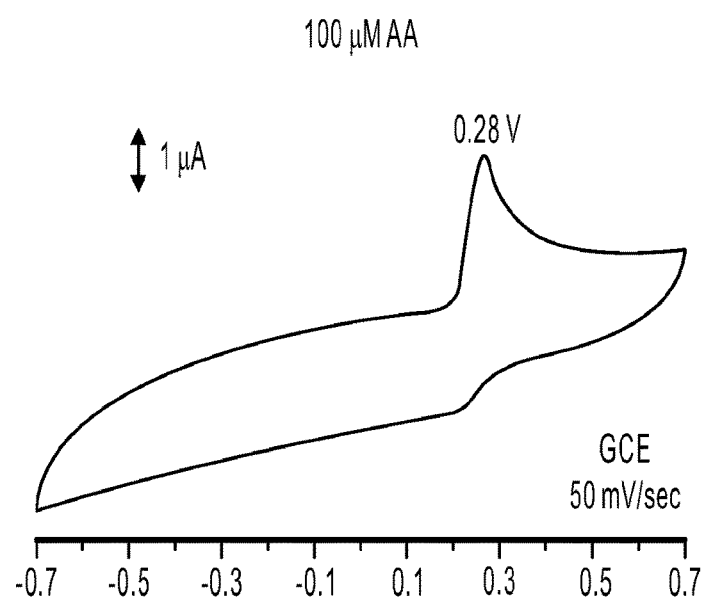
Figure 19E:
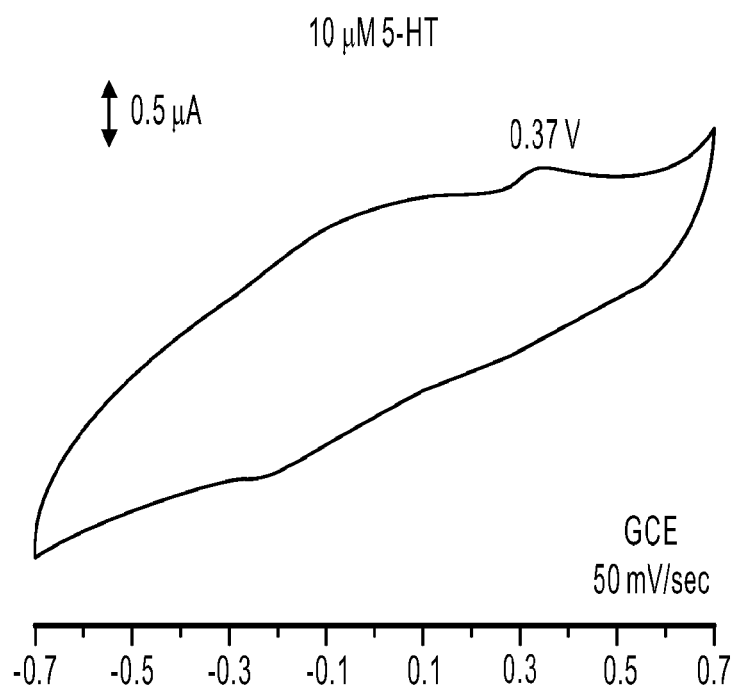

FIG. 18 illustrates a representation of configuration for the measurement of conductivity by four-point probe method.

Table 1 illustrates conductivity of the MOF measured by four-point probe method.

TABLE 1

| MOF | Conductivity |
| --- | --- |
| $Cu_3HHTP_2$ | $2.0 \times 10^{-2}$ S/cm |
| $Cu_3HITP_2$ | $2.0 \times 10^{-1}$ S/cm |
| $Ni_3HHTP_2$ | $1.0 \times 10^{-2}$ S/cm |
| $Ni_3HITP_2$ | 2.0 S/cm |

Example 1.18. Electrochemical Characterization of $M_3HXTP_2$ Modified Electrodes. Preparation of Electrode: Drop-Casted Film 2 mg of either $M_3HXTP_2$ MOFs (M=Cu, Ni; and X=NH, O) were suspended in 2.0 mL of deionized water. The mixture was then sonicated for 72 hours. 5 µL total through two 2.5 µL additions of the resulting suspension was pipetted onto the glassy carbon working electrode (3 mm diameter, CH Instruments) and dried under ambient air conditions. All glassy carbon working electrodes were polished on polishing pads with 1 µm, 0.3 µm, and 0.05 um alumina slurry to achieve a mirror finish on the GCE. The GCE was polished using the 0.05 µm every time before each electrochemical measurement.

Example 1.19. Cyclic Voltammetry for the Elucidation of Redox Properties of $M_3HXTP_2$ Using Organic Molecular Probes: Ascorbic Acid, Dopamine, and Uric Acid The cyclic voltammetry experiments were performed using a three-electrode system including a 3 mm glassy carbon working electrode with a drop-cast layer of conductive $M_3HXTP_2$ MOF (5 µL), a reference electrode: Ag/AgCl electrode, and a platinum wire counter electrode. The background electrolyte was 7 mL of 0.1 M phosphate buffer saline (PBS) buffer (pH=7.4) containing biologically relevant concentrations of AA, UA, DA, and 5-HT (100 µM, 100 µM, 10 µM, and 10 µM respectively). Before all experiments, the solutions were degassed by bubbling nitrogen gas for 15 min.

Example 1.20. Differential Pulse Voltammetry for Detection of Ascorbic Acid, Uric Acid, Dopamine, and Serotonin Differential pulse voltammetry was performed using a three-electrode system including a 3 mm glassy carbon working electrode with a drop-cast layer of $M_3HXTP_2$ MOF (5 µL), a reference electrode: Ag/AgCl electrode, and a platinum wire counter electrode. The supporting electrolyte was 0.1 M PBS (pH=7.4). DPV experimental parameters: scan rate: 50 mV/sec; pulse width: 50 msec; and amplitude: 50 mV. The individual and simultaneous determination of AA, UA, DA, and 5-HT were achieved by measuring the oxidation peak currents with respect to the concentrations of the respective analytes.

Example 1.21. Cyclic Voltammetry Controls with GCE

FIGS. 19A-E illustrate cyclic voltammetry controls with GCE.

Figure 20A:
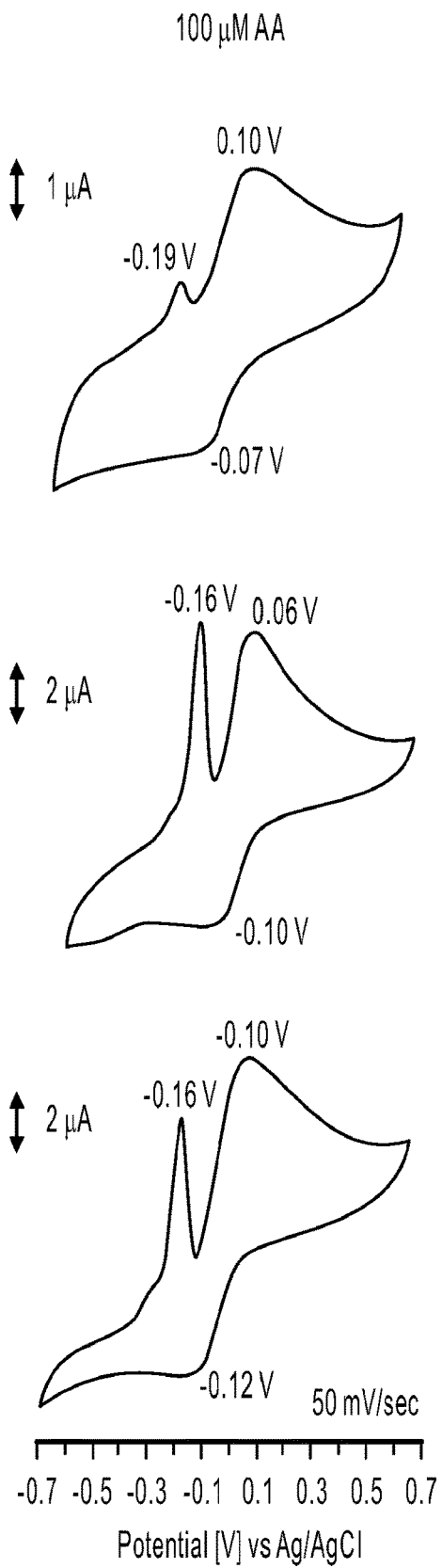
FIGS. 20A-C illustrate cyclic voltammograms obtained for $Cu_3HHTP_2$ on glassy carbon electrode in 100 μM of ascorbic acid (FIG. 20A); in 10 μM of dopamine (FIG. 20B); in 100 μM of uric acid (FIG. 20C) in 0.1 M phosphate buffer saline (pH=7.4). Each voltammogram shows repeatability of the same $Cu_3HHTP_2$ in $H_2O$ dispersion. All voltammetric measurements were run at 50 mV/sec in twenty-five electrode configurations—glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.
Figure 20B:
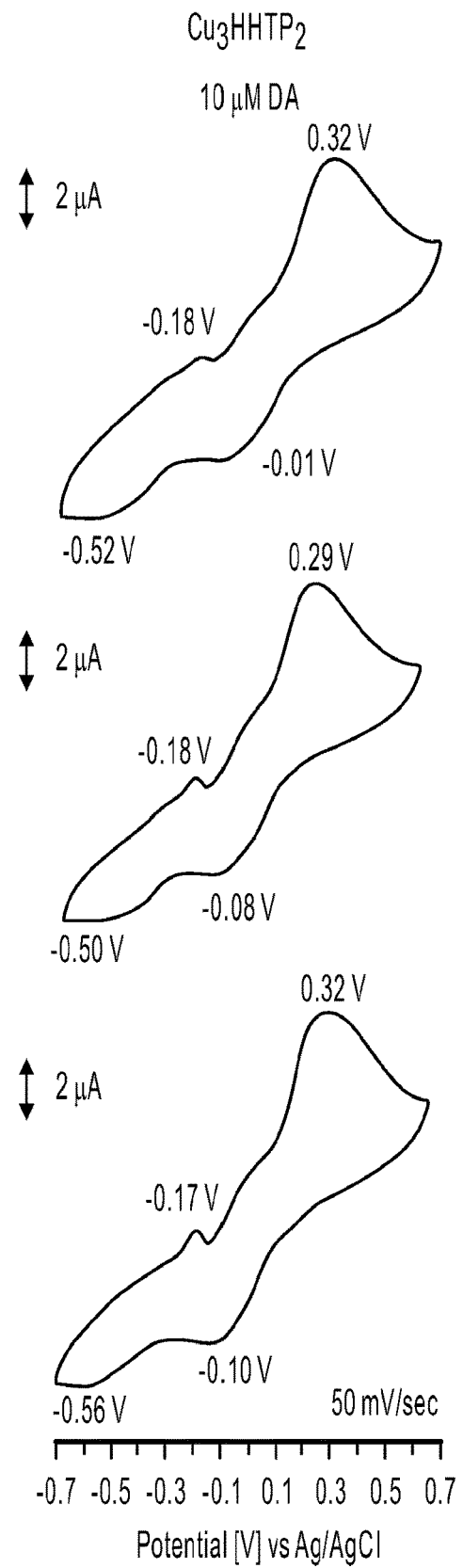
Figure 20C:
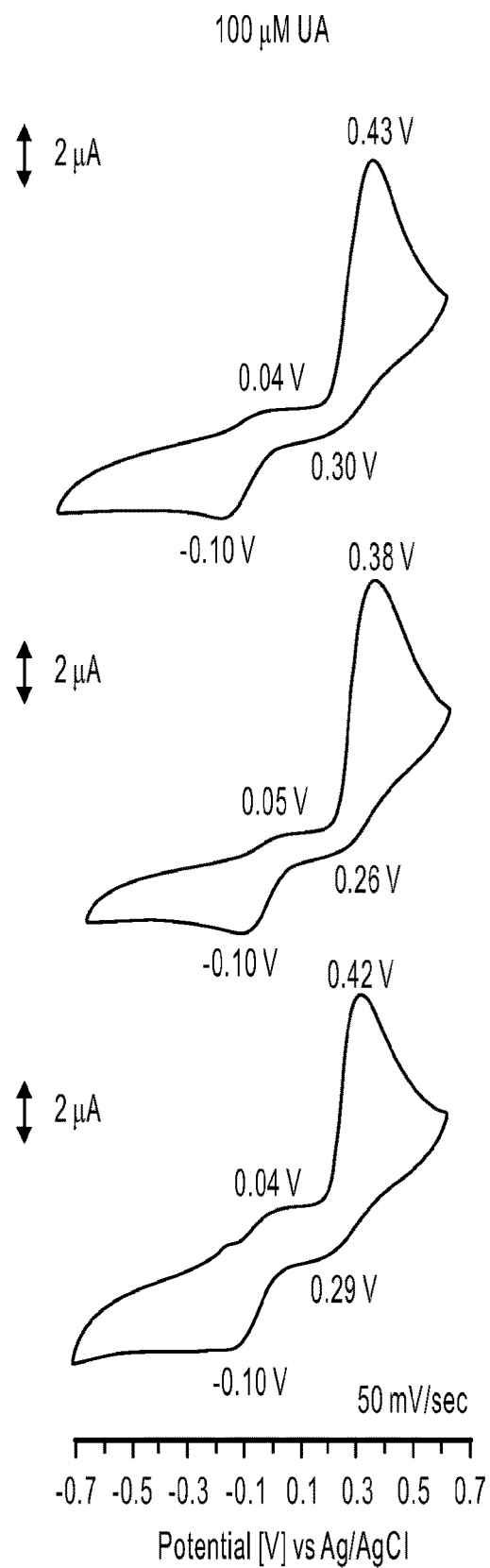

Example 1.22. Batch to Batch Reproducibility of the Same $Cu_3HHTP_2$ MOF Dispersion FIGS. 20A-C illustrate batch-to-batch reproducibility of the same $Cu_3HHTP_2$ dispersion.

Example 1.23. Cyclic Voltammetry of 5-HT

Figure 21:
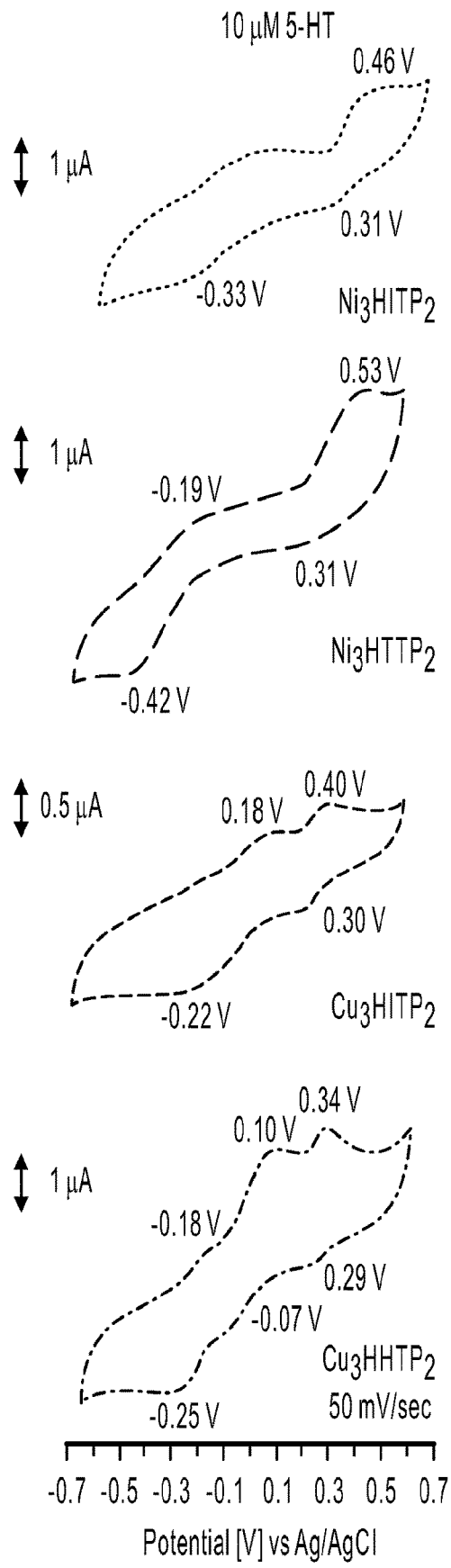
FIG. 21 illustrates cyclic voltammograms obtained for glassy carbon electrodes in 10 μM of 5-HT in 0.1 M phosphate buffer saline (pH=7.4). All voltammetric measurements were run at 50 mV/sec, in three electrode configurations—glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.
Figure 22A:
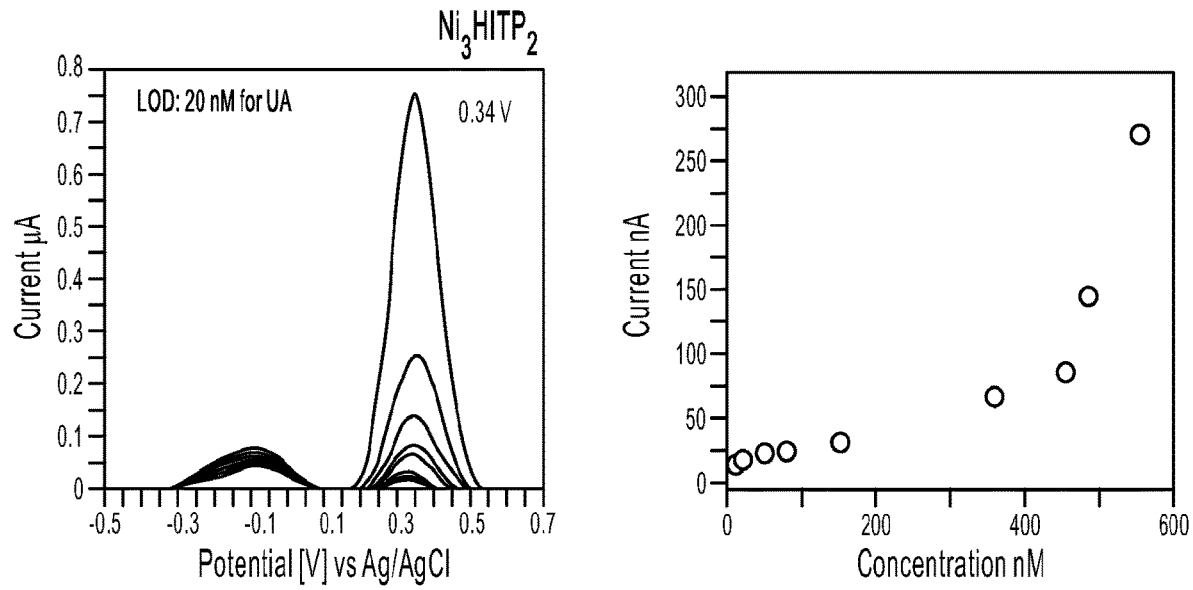
FIGS. 22A-D illustrate differential pulse voltammograms recorded at varying concentrations of uric acid (FIG. 22A), ascorbic acid (FIG. 22B), dopamine (FIG. 22C), and serotonin (FIG. 22D) in 0.1 M phosphate buffer saline solution using $Ni_3HITP_2$ coated glassy carbon electrode. Differential pulse voltammetry parameters: scan rate: 50 mV/sec; pulse width: 50 msec; and amplitude: 50 mV. The right illustrates corresponding concentration dependence graphs obtained for the $Ni_3HITP_2$ coated electrodes.
Figure 22B:
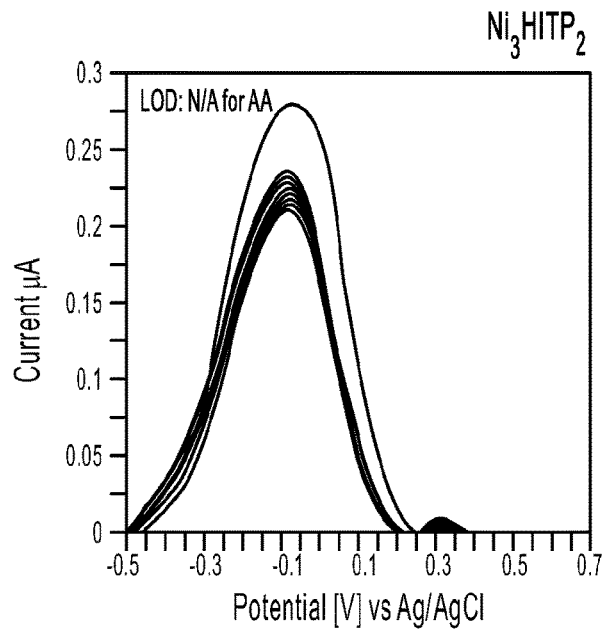
Figure 22C:
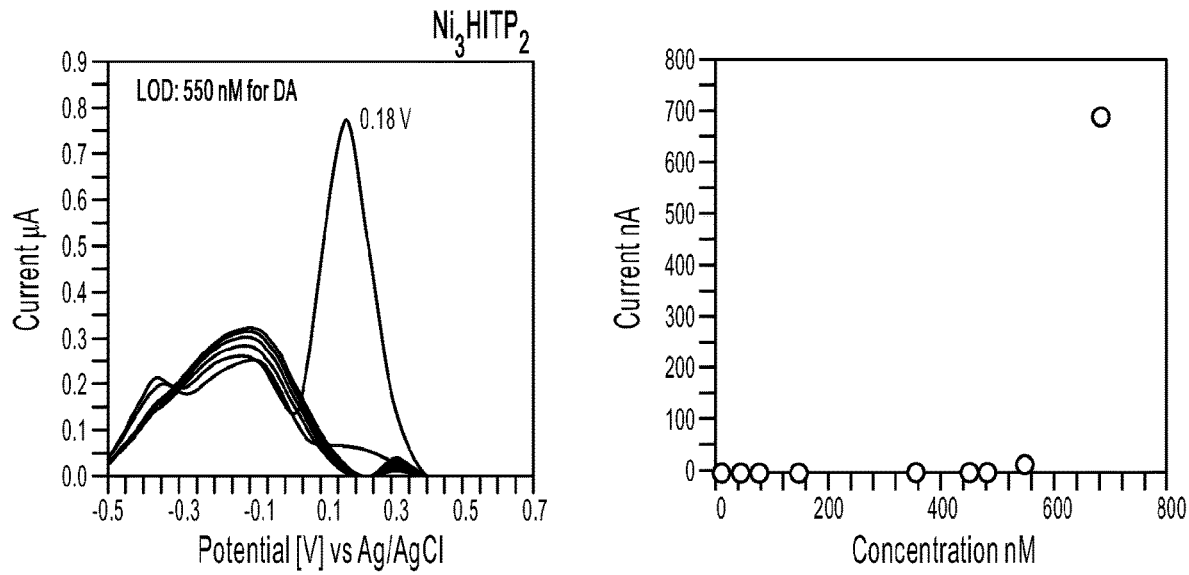
Figure 22D:
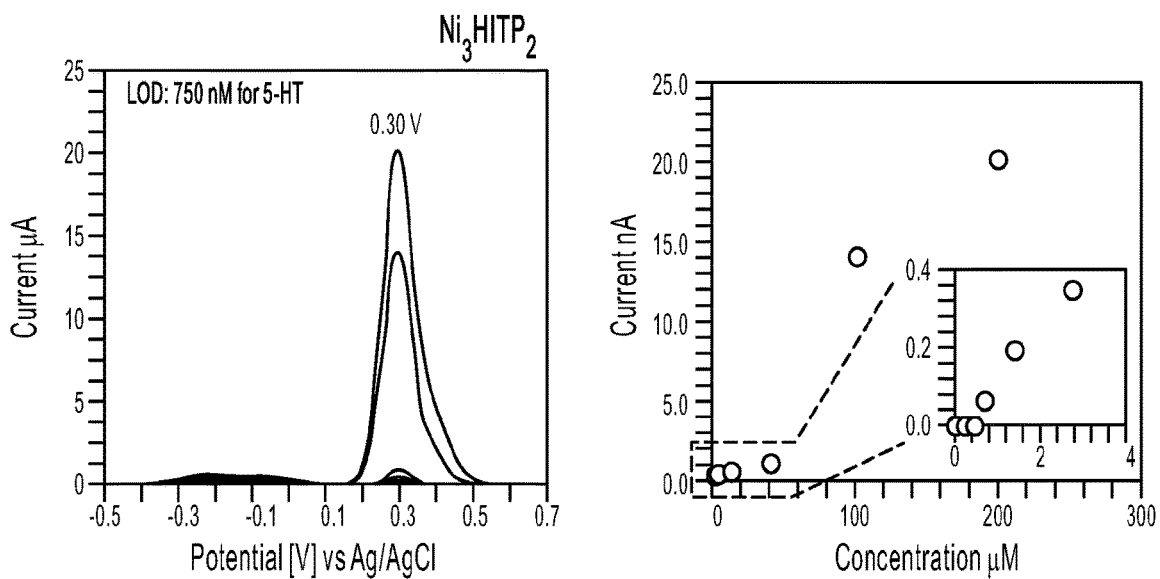
Figure 23A:
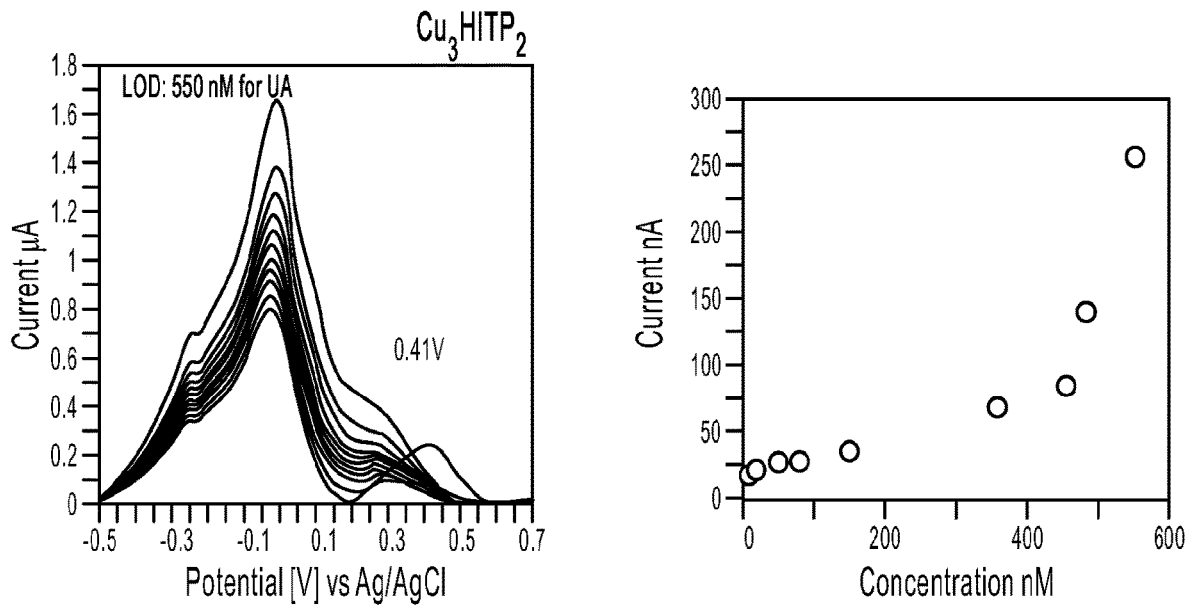
FIGS. 23A-D illustrate differential pulse voltammograms recorded at varying concentrations of uric acid (FIG. 23A), ascorbic acid (FIG. 23B), dopamine (FIG. 23C), and serotonin (FIG. 23D) in 0.1 M phosphate buffer saline solution using $Cu_3HITP_2$ coated glassy carbon electrode. Differential pulse voltammetry parameters: scan rate: 50 mV/sec; pulse width: 50 msec; and amplitude: 50 mV. The right illustrates corresponding concentration dependence graphs obtained for the $Cu_3HITP_2$ coated electrodes.
Figure 23B:
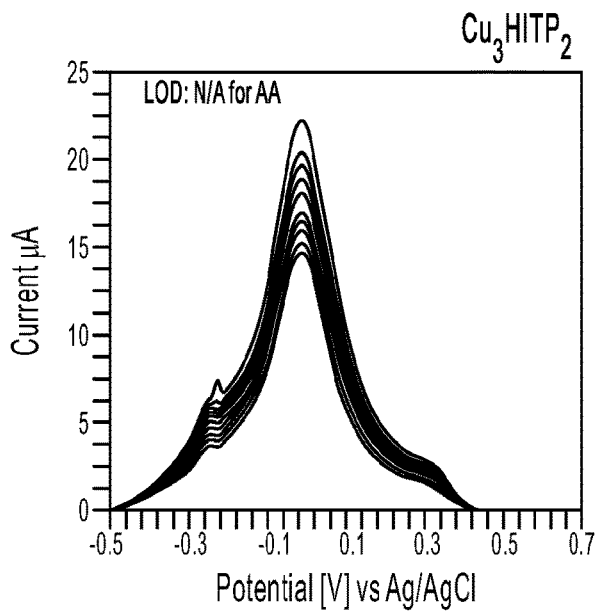
Figure 23C:
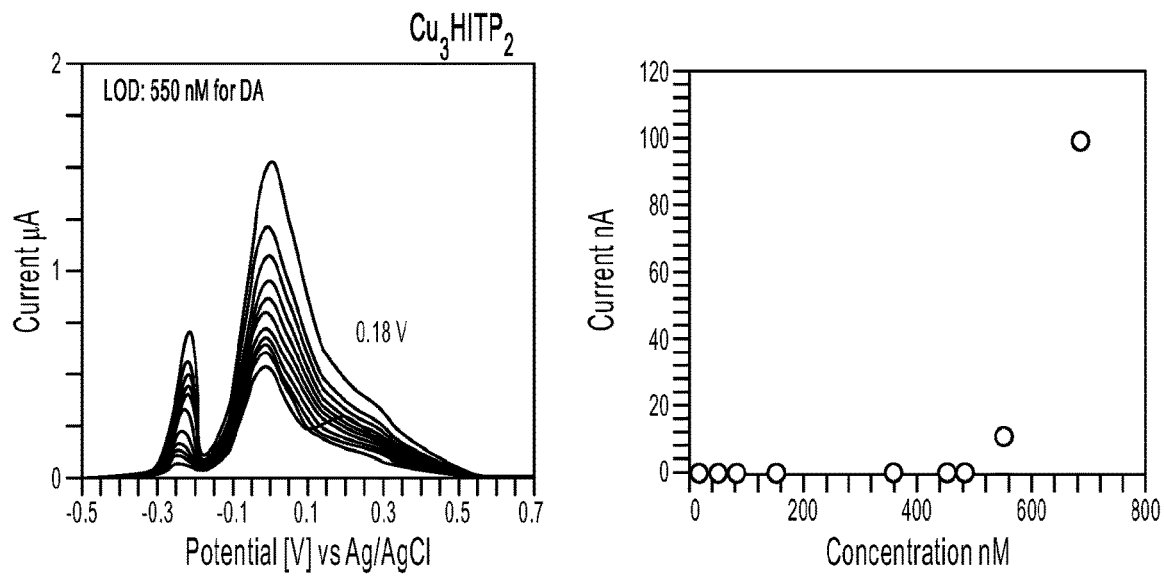
Figure 23D:
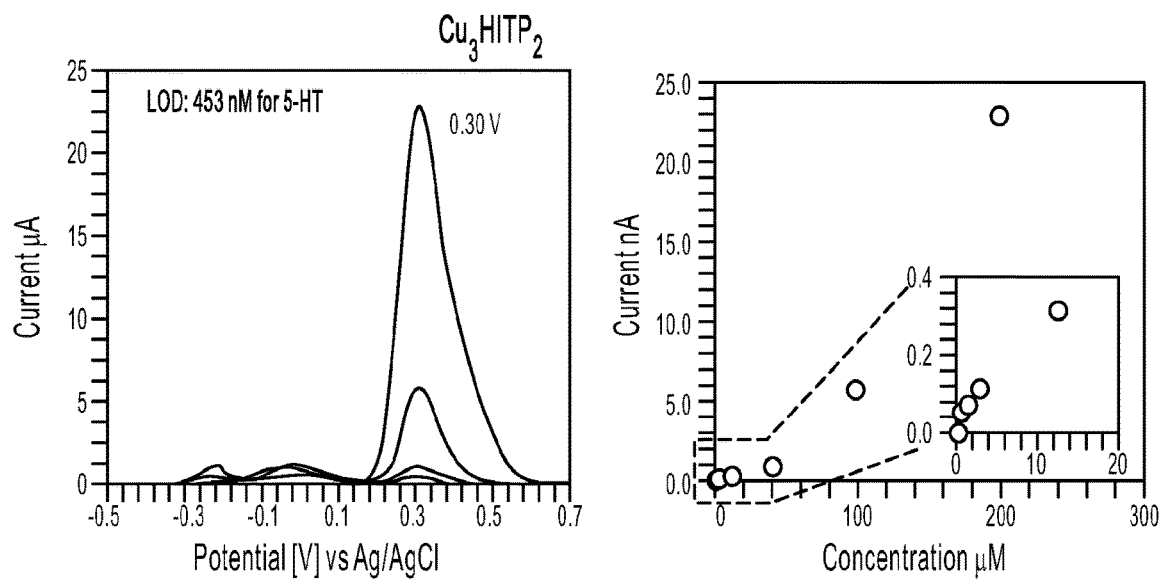
Figure 24A:
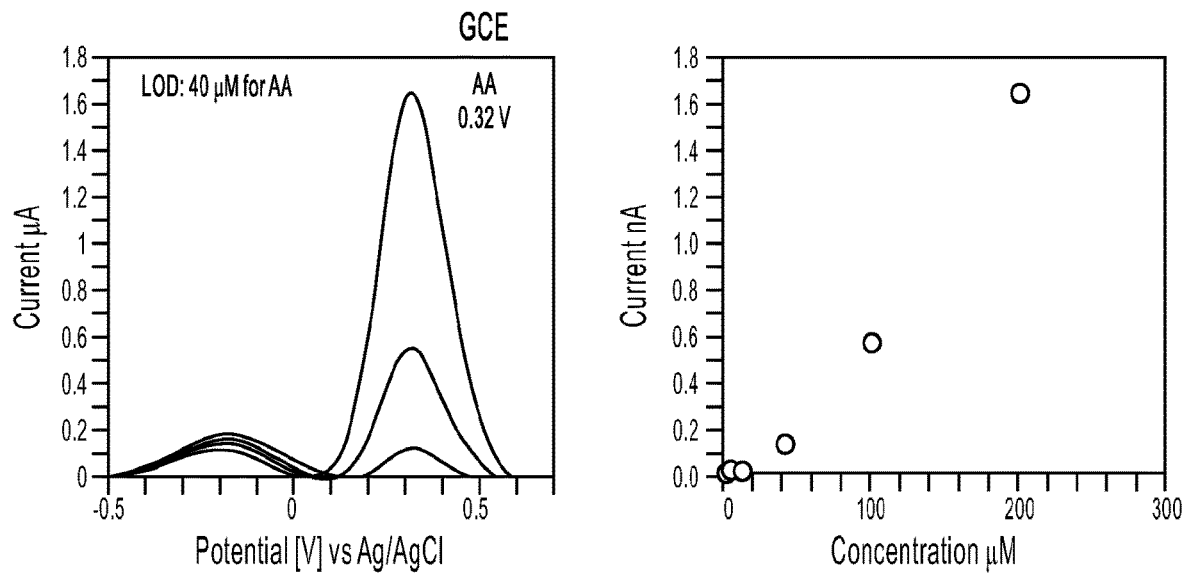
FIGS. 24A-D illustrate differential pulse voltammograms recorded at varying concentrations of uric acid (FIG. 24A), ascorbic acid (FIG. 24B), dopamine (FIG. 24C), and serotonin (FIG. 24D) in 0.1 M phosphate buffer saline solution using glassy carbon electrode. Differential pulse voltammetry parameters: scan rate: 50 mV/sec; pulse width: 50 msec; and amplitude: 50 mV. The right illustrates corresponding concentration dependence graphs obtained for the $Ni_3HITP_2$ coated electrodes.
Figure 24B:
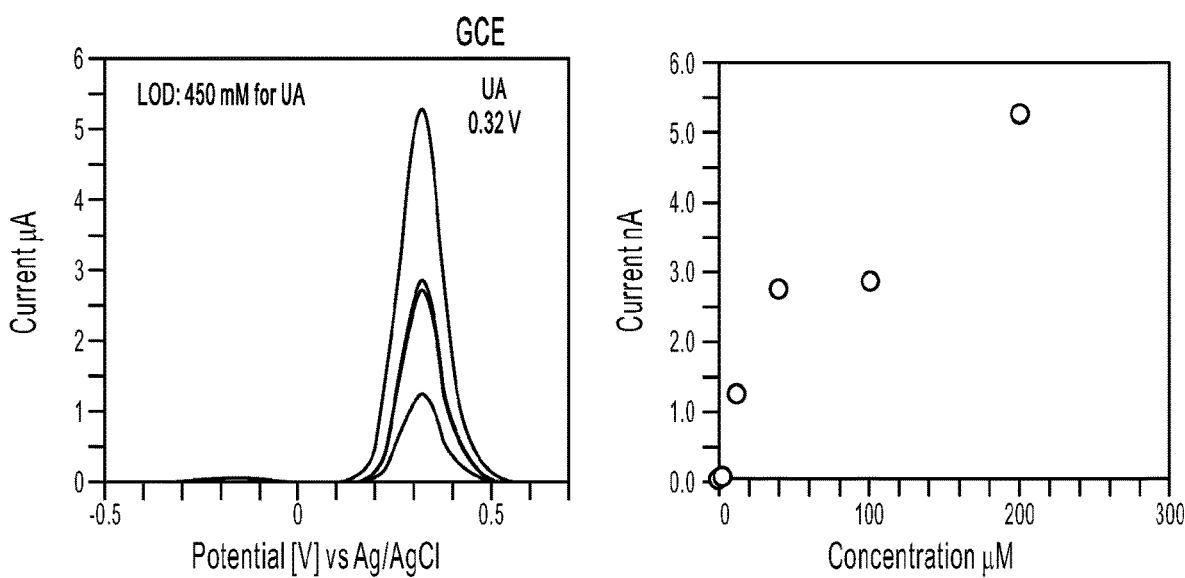
Figure 24C:
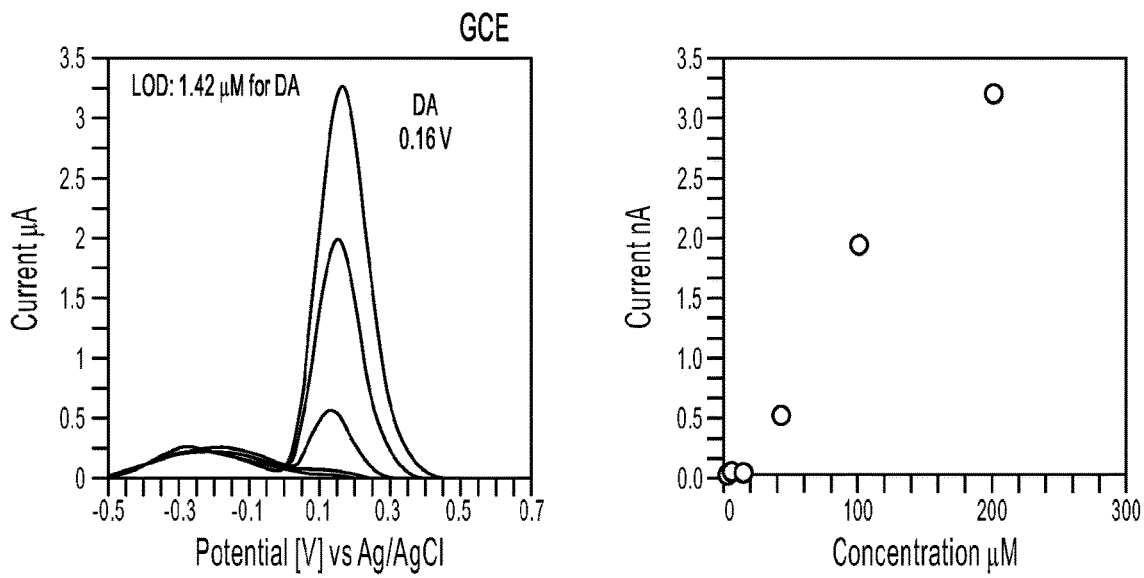
Figure 24D:
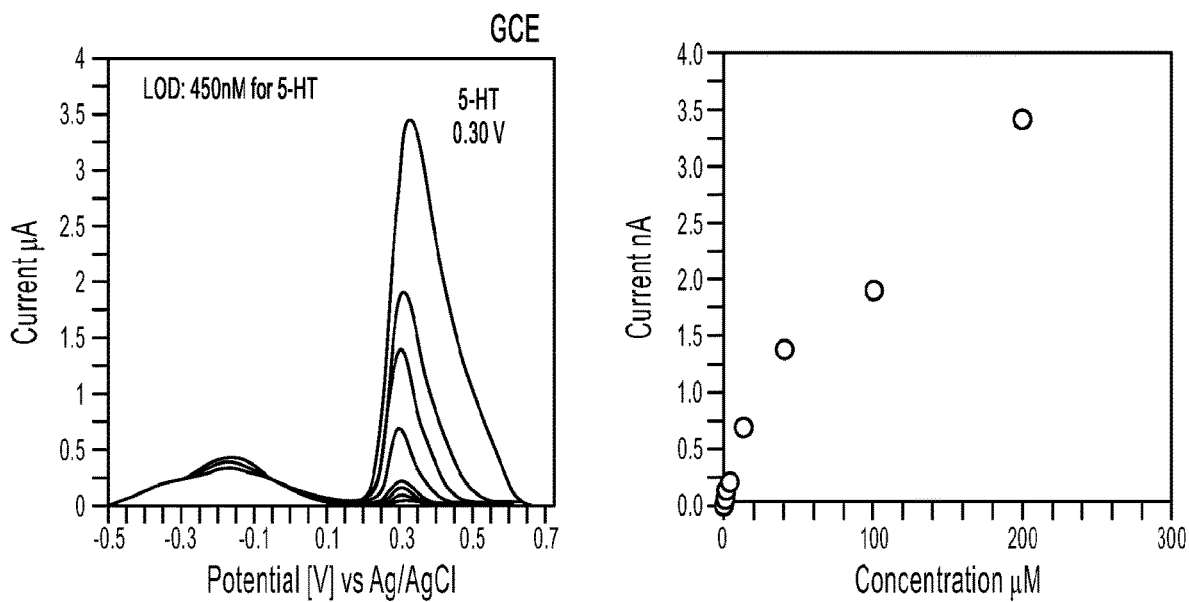

FIG. 21 illustrates cyclic voltammetry of 5-HT.

Example 1.24. Differential Pulse Voltammetry of $M_3HXTP_2$ MOFs for AA, UA, DA, and 5-HT Single Analyte Detection FIGS. 22A-D illustrate differential pulse voltammetry for $Ni_3HITP_2$, while FIGS. 23A-D illustrate differential pulse voltammetry for $Cu_3HITP_2$.

Example 1.25. Differential Pulse Voltammetry of GCE Control for AA, UA, DA, and 5-HT Single Analyte Detection FIGS. 24A-D illustrate differential pulse voltammetry of GCE control for AA, UA, DA, and 5-HT single analyte detection.

Figure 25A:
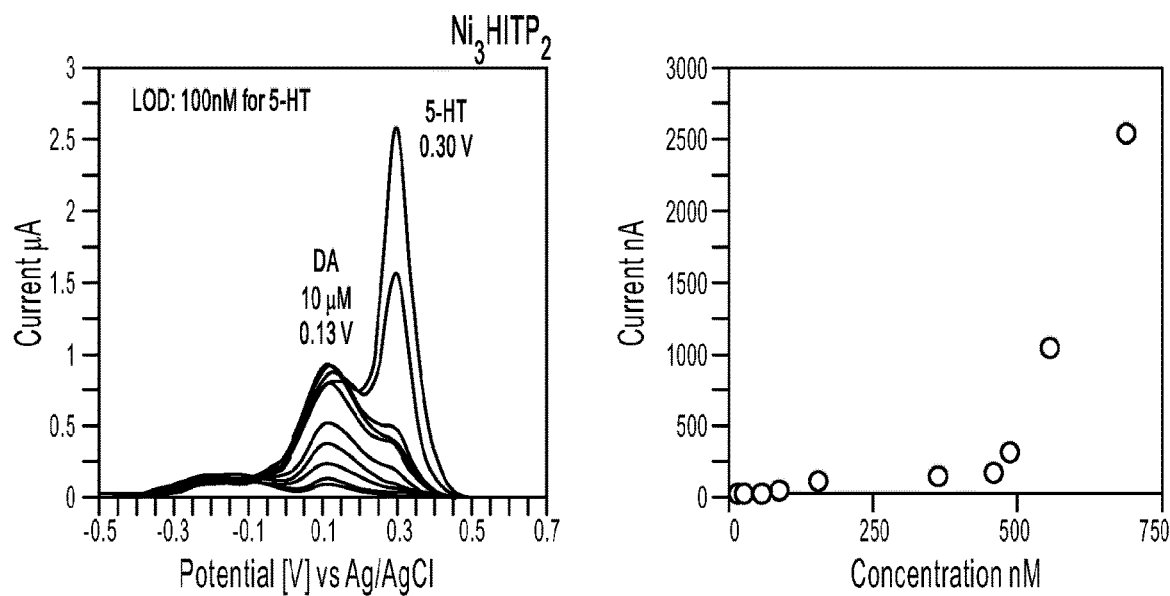
FIGS. 25A-B illustrate differential pulse voltammograms recorded at varying concentrations of serotonin in the presence of 10 μM dopamine in 0.1 M phosphate buffer saline solution using $M_3HITP_2$ (M=Ni, Cu) coated glassy carbon electrode. Differential pulse voltammetry parameters: scan rate: 50 mV/sec; pulse width: 50 msec; and amplitude: 50 mV. The right illustrates corresponding concentration dependence graphs obtained for the $M_3HITP_2$ (M=Ni, Cu) coated electrodes.
Figure 25B:
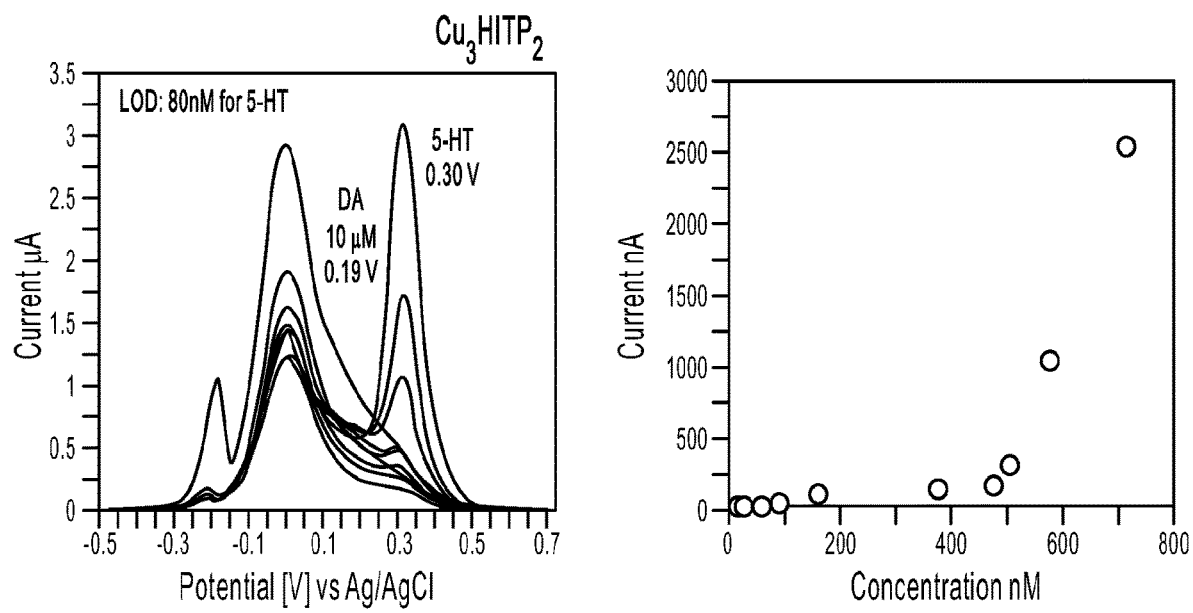

Example 1.26. Differential Pulse Voltammetry of $M_3HXTP_2$ MOFs for DA, and 5-HT Multianalyte Detection FIGS. 25A-B illustrate differential pulse voltammetry of $M_3HXTP_2$ MOFs for DA, and 5-HT multianalyte detection.

Example 1.27. Calculation of Diffusion Coefficients for $M_3HXTP_2$ MOFs (M=Ni, Cu, Pd; X=NH, O)

Table 2 illustrates peak-to-peak separation recorded for $M_3HXTP_2$ MOFs (M=Ni, Cu, Pd; X=NH, O) in $Ru(NH_3)_6Cl_3$, $K_4Fe(CN)_6$, $FeCl_3$, UA, DA, and AA.

TABLE 2

| MOF | $Ni_3HHTP_2$ | $Ni_3HITP_2$ | $Cu_3HHTP_2$ | $Cu_3HITP_2$ |
|---|---|---|---|---|
| Analyte | Peak-to-peak separation (Ep) | | | |
| $Ru(NH_3)_6Cl_3$ | 150 mV | 160 mV | 65 mV | 100 mV |
| $K_4Fe(CN)_6$ | 140 mV | 90 mV | 120 mV | 100 mV |
| $FeCl_3$ | 600 mV | 300 mV | 290 mV | 400 mV |
| UA | 181 mV | 90 mV | 120 mV | 120 mV |
| DA | 100 mV | 145 mV | 81 mV | 100 mV |
| AA | 149 mV | 151 mV | 110 mV | 174 mV |

Table 3 Illustrates experimental slopes obtained for $M_3HXTP_2$ MOFs (M=Ni, Cu, Pd; X=NH, O) in $Ru(NH_3)_6Cl_3$, $K_4Fe(CN)_6$, UA, DA, and AA from peak current vs square root of scan rate.

TABLE 3

| MOF | $Ni_3HHTP_2$ | $Ni_3HITP_2$ | $Cu_3HHTP_2$ | $Cu_3HITP_2$ |
|---|---|---|---|---|
| Analyte | Experimental slopes [$i_p$ vs $\sqrt{v}$] | | | |
| $Ru(NH_3)_6Cl_3$ | $1.86 \times 10^{-4}$ | $5.01 \times 10^{-5}$ | $3.60 \times 10^{-5}$ | $3.85 \times 10^{-5}$ |
| $K_4Fe(CN)_6$ | $2.20 \times 10^{-5}$ | $8.50 \times 10^{-6}$ | $1.27 \times 10^{-5}$ | $7.00 \times 10^{-6}$ |
| UA | $6.40 \times 10^{-6}$ | $3.90 \times 10^{-6}$ | $4.03 \times 10^{-5}$ | $5.04 \times 10^{-5}$ |
| DA | $1.86 \times 10^{-4}$ | $7.80 \times 10^{-6}$ | $4.60 \times 10^{-6}$ | $4.07 \times 10^{-5}$ |
| AA | $5.80 \times 10^{-6}$ | $3.10 \times 10^{-6}$ | $8.60 \times 10^{-6}$ | $1.58 \times 10^{-5}$ |

The peak current, $i_p$ is directly proportional to the analyte concentration, C, as described by the simplified Randles-Sevcik at 25° C.

$$i_p = k \times n^{3/2} \times A \times \sqrt{Dv} \times C \qquad \text{Equation 2}$$

In this equation, k is a constant of $2.69 \times 10^5$ [C $mol^{-1}$ $V^{-1/2}$], n is the number of electrons transferred during the redox event, A is the area of electrode [$cm^2$], D is the analyte diffusion coefficient [$cm^2\ s^{-1}$] and v is the scan rate at which the potential is swept [V $s^{-1}$]. v was measured over a range of scan rates from 10 to 1000 mV $sec^{-1}$. From the slope of the plots of current (ip) versus the square root of the scan rate, and appropriate substitution and analysis, the diffusion coefficient of $M_3HXTP_2$ MOFs (M=Ni, Cu, Pd; X=NH, O).

$$\text{Slope} = \left(\frac{i_p}{\sqrt{v}}\right) = k \times n^{3/2} \times A \times \sqrt{D} \times C \qquad \text{Equation 3}$$

where A is equal to 0.07 $cm^2$, n is 1 for $Ru(NH_3)_6Cl_3$, and $K_4Fe(CN)_6$ and n=2 for DA, UA and AA.

Table 4 illustrates diffusion coefficient obtained for $M_3HXTP_2$ MOFs (M=Ni, Cu, Pd; X=NH, O) in $Ru(NH_3)_6Cl_3$, $K_4Fe(CN)_6$, UA, DA, and AA.

TABLE 4

| MOF | $Ni_3HHTP_2$ | $Ni_3HITP_2$ | $Cu_3HHTP_2$ | $Cu_3HITP_2$ |
|---|---|---|---|---|
| Analyte | Diffusion Coefficient [$cm^2s^{-1}$] | | | |
| $Ru(NH_3)_6Cl_3$ | $9.75 \times 10^{-5}$ | $7.10 \times 10^{-6}$ | $3.67 \times 10^{-6}$ | $4.19 \times 10^{-6}$ |
| $K_4Fe(CN)_6$ | $1.37 \times 10^{-6}$ | $2.04 \times 10^{-7}$ | $4.56 \times 10^{-7}$ | $1.39 \times 10^{-7}$ |
| UA | $1.45 \times 10^{-6}$ | $5.38 \times 10^{-7}$ | $5.74 \times 10^{-5}$ | $8.98 \times 10^{-5}$ |
| DA | $3.40 \times 10^{-6}$ | $2.15 \times 10^{-6}$ | $7.48 \times 10^{-7}$ | $5.86 \times 10^{-5}$ |
| AA | $1.19 \times 10^{-6}$ | $3.40 \times 10^{-7}$ | $2.62 \times 10^{-6}$ | $8.83 \times 10^{-6}$ |

$$k_0 \left[\frac{\pi \times D \times n \times v \times F}{(R \times T)}\right]^{-1/2} \qquad \text{Equation 4}$$

where, $k_0$ is the standard rate constant [cm $5^{-1}$]; $\pi$ is the mathematical constant, D is the diffusion coefficient used from Table 5 [$cm^2s^{-1}$], v is scan rate [V $s^{-1}$], n= 1 ($Ru(NH_3)_6Cl_3$, $K_4Fe(CN)_6$, and DA), or 2 (UA and AA), R is the gas constant of 8.314 [J $K^{-1}$ $mol^{-1}$], T is the room temperature 298 K, F is Faraday constant [C $mol^{-1}$], and $\Psi$ is the Nicolson dimensionless number tabulated from the original Nicholson's report.

Table 5 Illustrates heterogenous electron transfer rates obtained for $M_3HXTP_2$ MOFs (M=Ni, Cu, Pd; X=NH, O) in $Ru(NH_3)_6Cl_3$. $K_4Fe(CN)_6$, UA, DA, and AA.

TABLE 5

| MOF | $Ni_3HHTP_2$ | $Ni_3HITP_2$ | $Cu_3HHTP_2$ | $Cu_3HITP_2$ |
|---|---|---|---|---|
| Analyte | Heterogenous electron transfer rate – $k_0$ [cm $s^{-1}$] | | | |
| $Ru(NH_3)_6Cl_3$ | $5.86 \times 10^{-3}$ | $1.32 \times 10^{-3}$ | $2.37 \times 10^{-2}$ | $2.99 \times 10^{-3}$ |
| $K_4Fe(CN)_6$ | $7.23 \times 10^{-4}$ | $8.94 \times 10^{-4}$ | $5.85 \times 10^{-4}$ | $5.43 \times 10^{-4}$ |
| UA | $6.31 \times 10^{-4}$ | $2.05 \times 10^{-3}$ | $9.27 \times 10^{-3}$ | $1.16 \times 10^{-2}$ |
| DA | $3.80 \times 10^{-3}$ | $1.26 \times 10^{-3}$ | $3.78 \times 10^{-3}$ | $1.58 \times 10^{-2}$ |
| AA | $9.15 \times 10^{-4}$ | $4.89 \times 10^{-4}$ | $2.49 \times 10^{-3}$ | $1.77 \times 10^{-3}$ |

Example 1.28. Redox Transformations of $Ru(NH_3)_6Cl_3$, and $K_4Fe(CN)_6$ and $FeCl_3$ Equation 5 illustrates a proposed redox pathway for oxidation of $Ru(NH_3)_6Cl_3$.

$$[Ru(NH_3)_6]^{2+} \rightarrow [Ru(NH_3)_6]^{3+} + e^- \qquad \text{Equation 5}$$

Equation 6 illustrates a proposed redox pathway for oxidation of $K_4Fe(CN)_6$.

$$Fe(CN)_6^{4-} \rightarrow Fe(CN)_6^{3-} + e^- \qquad \text{Equation 6}$$

Equation 7 illustrates a proposed redox pathway for oxidation of $FeCl_3$.

$$Fe^{2+} \rightarrow Fe^{3+} + e^- \qquad \text{Equation 7}$$

Example 1.29. Mechanism of AA, UA, and DA Redox Transformations

Ascorbic Acid: The electrochemical oxidation of AA on unmodified surfaces can be challenging and numerous electrode modifications have been proposed to enhance electrode kinetics. At neutral pH ascorbic acid exists primarily as the ascorbate mono-anion (I), which is oxidized in a coupled two electron, one proton reaction to the dehydroascorbate (II). FIGS. 11A-D and FIGS. 15A-C demonstrate the presence of well-defined redox peaks at −0.19-0.03 V. The reverse cathodic waves may be due to the conversion of oxidation products, stabilized by adsorption, back to the mono-anion ascorbate form.

FIG. 12 illustrates a proposed redox pathway for oxidation of ascorbic acid.

Dopamine: The voltammetry of dopamine is known to strongly depend on the type of electroactive surfaces (e.g. metals, graphite, carbon nanotubes). For example, it was recently realized that graphene exhibits low activity towards oxidation of dopamine on the basal plane compared to edge plane sites, giving rise to broader peaks at more oxidative potentials. FIGS. 11A-D and FIGS. 15A-C demonstrate the presence of redox couple with the oxidative peak maxima in the range of 0.19-0.24 V vs Ag/AgCl, which findings agree well with previous literature on carbon modified electrodes. The presence of only one distinct pair of redox peaks indicates that oxidation of dopamine most likely undergoes redox transformation as illustrated in FIG. 13.

In addition, Applicants mentioned that the $M_3HXTP_2$ MOF@Nafion modified electrodes (M=Pd, Cu; X=NH, O) exhibit good stability to electrochemical cycling (50 scans). It is well-established that dopaminequinone, a product of 2e oxidation of dopamine (II) can undergo subsequent ring closure reaction resulting in the formation of leucodopaminechrome (III), which can undergo further oxidation to dopaminechrome (IV). The resulting product may polymerize on the surface of the electrode to form melanin-like species (V), which can block electron transfer reactions, and thus produce irreversible voltammetry. The observed antifouling behavior of MOF@Nafion coated electrodes is likely to arise from the presence of negatively charged groups in the composite film, which can suppress the mobility of dopaminequinone, and thus prevent the ring-closure reaction (II) as this process requires the protonated side chain of dopaminequinone to be moved toward the quinone ring.

Uric Acid: Voltammetric measurements of 100 µM UA in 0.1 PBS (pH=7.4) using $M_3HXTP_2$ MOF@Nafion electrodes (M=Cu, Ni, Pd; X=O, NH) have revealed the presence of well-defined oxidative peaks at approximately 0.33-0.35 V (FIGS. 11A-D and FIGS. 15A-C). Since the pKa of uric acid is 5.60, at pH 7.4 UA would predominantly exist as a charge-neutral species (I). UA is known to undergo $2e^-+2\ H^+$ oxidation at the C4=C5 position to form the bis-imine compound (II). The presence of first cathodic peak observed on recorded voltammograms suggests that the bis-imine product is adsorbed at the surface of MOF@Nafion electrode, and it is stabilized to some extent in the adsorbed state. The resulting bis-imine is very unstable in aqueous solution and is rapidly hydrated to an imine-alcohol (III). The presence of second reduction wave during voltammetric measurements of UA uric acid at moderate scan rates (50 mV/sec) may be caused by the reduction of the imine-alcohol formed by partial hydration of the bis-imine, which is the oxidation product of uric acid. The imine-alcohol may be further hydrated to produce uric acid-4,5-diol (IV), which can then decomposes to the allantoin, urea and $CO_2$ at physiological pH.

FIG. 14 illustrates a proposed redox pathway for oxidation of uric acid.

Figure 26:
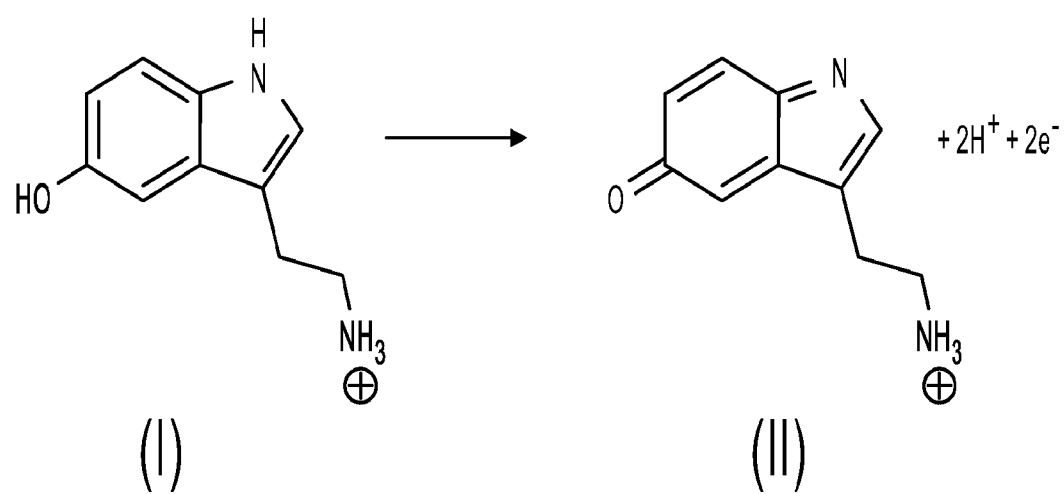
FIG. 26 illustrates a proposed redox pathway for oxidation of serotonin.

Serotonin: The oxidation of serotonin (5-hydroxytryptamine, 5-HT) involves a two-electron, and two-proton transfer process (FIG. 26). It has been also demonstrated that 5-HT can undergo further chemical oxidation to a dihydroxytryptamine species during which reactive side-products and dimers are formed. These reactive species may adsorb irreversibly on the electrode surface resulting in fouling through formation of an insoluble polymer-like by-product.

Example 1.30. Summary of the Detection of Biologically and Neurologically Relevant Analytes Table 6 Illustrates detection of AA, DA, 5-HT, and UA using the listed material, architecture, method, limits of detection, and experimental range.

TABLE 6

| Specific Analyte | Material | Architecture | Readout/Method | LOD | Experimental Range |
|---|---|---|---|---|---|
| AA | Gr | Gr/GCE | Amp | 6.45 µM | 9.00-2314 µM |
| AA | Gr | Gr/PPF | CV | 0.12 mM | 0.4-6.0 mM |
| AA | Gr-$Fe_3O_4$—$NH_2$ | Gr-$Fe_3O_4$—$NH_2$/GCE | Amp | 0.074 µM | 5.0-1600 µM |
| AA | Gr-Pt-Nafion | Gr-Pt—Nafion/GCE | DPV | 0.15 µM | 0.15-34.4 µM |
| AA | h-BN | h-BN/GCE | DPV | 3.77 µM | 30-1000 µM |
| AA | rGO | rGO/GCE | DPV | 250 µM | 0.5-2 mM |
| AA | rGO-Au | rGO-Au/GCE | DPV | $5.1 \times 10^{-5}$ M | $2.4 \times 10^{-4}$-$1.5 \times 10^{-3}$ M |
| AA | o-Phenylenediamine | Fluorescence spectrophotometer | Fluorescence | 3.41 nM | 0.03-22.71 µM |
| AA | CdSe/Cds quantum dots | Luminescence analyzer | Chemiluminescence | 6.7 nM | $1.0 \times 10^{-7}$-$1.0 \times 10^{-4}$ M |
| AA | Graphene quantum dots | Fluorescence spectrophotometer | Fluorescence | 94 nM | 0.3-10 µM |
| AA | dLys-Ag nanoclusters | Fluorescence spectrophotometer | Fluorescence | 20 mM | 0.05-45 µM |
| DA | GO-Au-polydA | GO-Au-polydA/Au | DPV | 0.1 pg $mL^{-1}$ | $1.0 \times 10^1$-$1.0 \times 10^5$ cells $mL^{-1}$ |
| DA | GO-Ferulic acid | GO-Ferulic acid/GCE | Amp | 0.19 µM | 0.6-1000 µM |
| DA | Gr | Gr/Si | DPV | 0.17 µM | 1-50 µM; 50-100 µM |
| DA | Gr | Gr/GCE | DPV | 2.64 µM | 4-100 µM |
| DA | Gr | Gr/GCE | DPV | 1 mM | N/A |
| DA | Gr-CT | Gr-CT/GCE | DPV | 5 µM | 5-200 µM |
| DA | Gr-EDTA-Nafion | Gr-EDTA-Nafion/GCE | DPV | 0.01 µM | 0.20-25 µM |

TABLE 6-continued

| Specific Analyte | Material | Architecture | Readout/Method | LOD | Experimental Range |
|---|---|---|---|---|---|
| DA | Gr-Fe$_3$O$_4$-NH$_2$ | Gr-Fe$_3$O$_4$—NH$_2$/GCE | Amp | 0.13 μM | 0.2-38 μM |
| DA | Gr-LDH | Gr-LDH/GCE | SQWV | 0.3 μM | 1.0-199 μM |
| DA | Gr-PANI-DA-Aptamer | Gr-PANI-DA-Aptamer/GCE | CV | 1.98 pM | 0.007-90 nM |
| DA | Gr-Pt-Nafion | Gr-Pt-Nafion/GCE | DPV | 0.03 μM | 0.03-8.13 μM |
| DA | Gr-PVP | Gr-PVP/GCE | Amp | 0.2 nM | $5.0 \times 10^{-10}$-$1.1 \times 10^{-3}$ M |
| DA | Gr-SO$_3^-$ | Gr-SO$_3^-$/GCE | DPV | 40 nM | 0.20-20 μM |
| DA | Gr-β-CD | Gr-β-CD/GCE | CV | 5.0 nM | 0.009-12.7 μM |
| DA | h-BN | h-BN/SPE | DPV | 1.57 μM | 3-75 μM |
| DA | h-BN | h-BN/SPE | DPV | 0.65 μM | 3-75 μM |
| DA | h-BN | h-BN/GCE | DPV | 0.02 μM | 0.5-150 μM |
| DA | h-BN-PI | h-BN-PI/Pt | DPV | $4 \times 10^{-8}$ M | $4.0 \times 10^{-8}$-$52.0 \times 10^{-8}$ M |
| DA | MoS$_2$-APTES | MoS$_2$-APTES/GCE | DPV | 1 μM | 1-50 μM |
| DA | rGO | rGO/GCE | DPV | 0.5 μM | 0.5-60 μM |
| DA | rGO-Au | rGO-Au/GCE | DPV | $1.4 \times 10^{-6}$ M | $6.8 \times 10^{-6}$-$4.1 \times 10^{-5}$ M |
| DA | rGO-Fe$_3$O$_4$ | rGO-Fe$_3$O$_4$/GCE | DPV | 0.08 μM | 0.4-3.5 μM |
| DA | rGO-nile blue-AuNP | rGO/nile blue/AuNP | SWV | 1 nM | 10 nM to 0.2 mM |
| DA | rGO-Pd NP | rGO-Pd NP/GCE | DPV | 0.233 μM | 1-150 μM |
| DA | rGO-SnO$_2$—Au NP-PDA | rGO-SnO$_2$ Au NP-PDA/GCE | DPV | 5 nM | 0.008-20 μM |
| DA | Ti$_3$C$_2$T$_x$ | FET: Glass/Ti$_3$C$_2$T$_x$/Ag/Ag | I | $100 \times 10^{-9}$ M | $100 \times 10^{-9}$ M-$50 \times 10^{-6}$ M |
| DA | GO/GCE | CV/EIS | DPV | 0.27 □M | 1.0-15.0 □M |
| DA | Si nanoparticles | Fluorescence spectrophotometer | ratiometric fluorescence | 0.3 nM | 0.005-10 □M |
| DA | Thiolate-protected Au nanoparticles | Fluorescence spectrophotometer | ratiometric fluorescence | 1 nM | $1 \times 10^{-9}$-$1 \times 10^{-3}$ M |
| DA | DNA templated Cu nanoparticles | Fluorescence spectrophotometer | Fluorescence | 20 pM | 0.1-10,000 nM |
| DA | Au@Ag nanorod dimers | Surface-enhanced Raman | Intensity | 0.006 pM | 0.01-10 μM |
| 5-HT | h-BN-Gr QDs | h-BN-Gr QDs/GCE | DPV | $2.0 \times 10^{-13}$ M | $1.0 \times 10^{-12}$-$1.0 \times 10^{-8}$ M |
| 5-HT | Aptamer Au nanoparticles | Plasmonic assay | Binding activity | 300 nM | 0.75-2.5 □M |
| 5-HT | Graphene quantum dots/h-BN molecularly imprinted polymers | GCE | DPV | $2.0 \times 10^{-13}$ M | $1.0 \times 10^{-12}$-$1.0 \times 10^{-8}$ M |
| 5-HT | Metal oxide nanoparticles/MWCNT | GCE | Square wave voltammetry | $5.98 \times 10^{-3}$ μM to 62.8 μM | 118 nM |
| UA | Gr | Gr/GCE | Amp | 4.82 μM | 6.00-1330 μM |
| UA | Gr-Fe$_3$O$_4$-NH$_2$ | Gr-Fe$_3$O$_4$—NH$_2$/GCE | Amp | 0.056 μM | 1.0-850 μM |
| UA | Gr-PBA-Au NP | Gr-PBA-Au NP/GCE | Amp | $2.0 \times 10^{-7}$ M | $2.0 \times 10^{-6}$-$6.2 \times 10^{-5}$ M |
| UA | Gr-Pt-Nafion | Gr-Pt-Nafion/GCE | CV/DPV | 0.05 μM | 0.05-11.85 μM |
| UA | h-BN | h-BN/GCE | DPV | 0.15 μM | 1-300 μM |
| UA | rGO | rGO/GCE | DPV | 0.5 CM | 0.5-60 μM |
| UA | rGO-Au | rGO-Au/GCE | DPV | $1.8 \times 10^{-6}$ M | $8.8 \times 10^{-6}$-$5.3 \times 10^{-5}$ M |
| UA | Uricase-peroxidase | Fluorescence spectrophotometer | Fluorescence | 20 nM | 20 nM-1 μM |
| UA | enzyme-functionalized gold nanocluster | Fluorescence spectrophotometer | ratiometric fluorescence | 25 nM | 10-200 μM |
| UA | CdTe nanoparticles | Fluorescence spectrophotometer | Fluorescence | 10 μM | 0.22-6 μM |

Example 2. Metal-Organic Frameworks for Differentiating Catecholamines

This Example describes metal-organic frameworks for differentiating catecholamines. Catecholamines, including dopamine (DA), norepinephrine (NE), and epinephrine (E), are neurotransmitters (NTs) that play a key role in cognition, emotion, motor control, memory processing, and endocrine functioning. Dysfunctions in catecholamine neurotransmission are associated with a number of neuropsychiatric and neurodegenerative disorders. Mapping chemical dynamics of catecholamine NTs via in vivo monitoring poses some difficulty, but it allows catecholamine fluctuations to be related to disease, behavior, and drug effects. In vivo monitoring would also allow for an improved understanding of the role of catecholamine neurotransmission and the most suitable method to monitor electroactive catecholamines is electrochemically.

Through many years of research and concerted efforts, the electroanalysis of DA in the presence of the electroactive concomitants ascorbic acid (in the brain) and uric acid (in the blood) with various electrode designs have shown capabilities for this application. Applicants have shown M$_3$HXTP$_2$ metal-organic frameworks (MOFs, M=Ni, Cu; X=O, NH) that have been implemented into electrochemical devices for voltammetric sensing, have capabilities of detecting DA at a lower concentration (10 μM) in the presence of higher concentrations of ascorbic acid (100 μM) and uric acid (100 μM).

Figure 27:
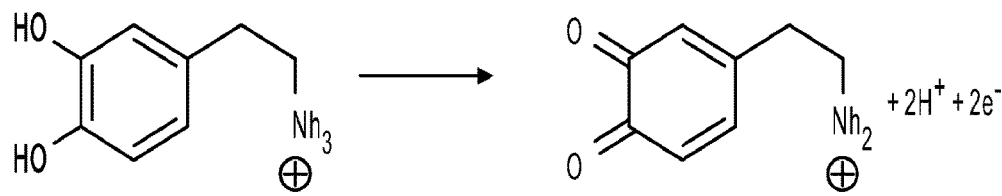
FIG. 27 illustrates an electrochemical mechanism for dopamine, norepinephrine, and epinephrine oxidations.
Figure 27:
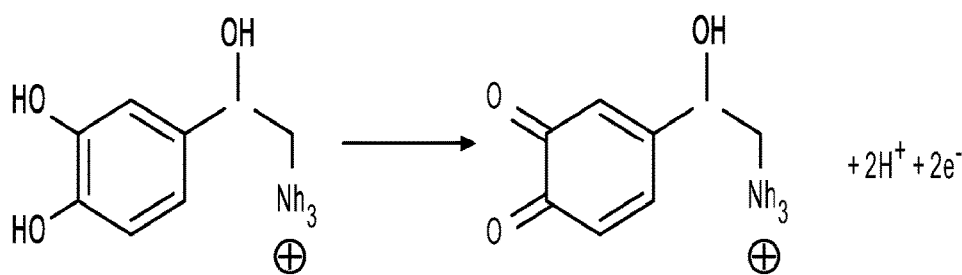
Figure 27:
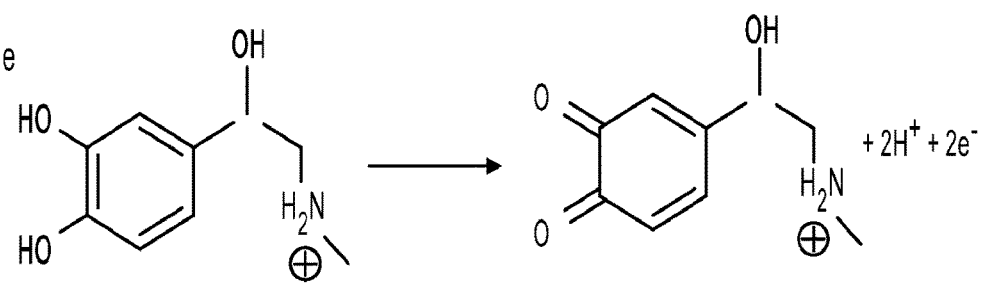
Figure 28A:
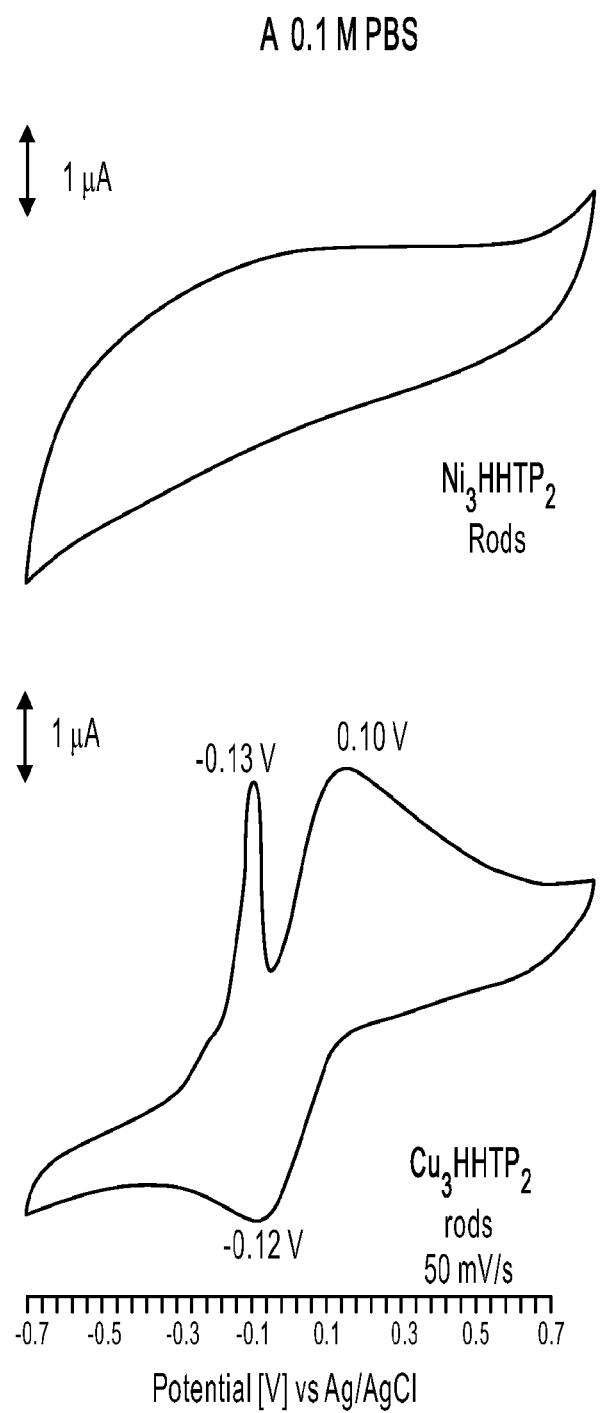
FIGS. 28A-D illustrate cyclic voltammograms obtained for $M_3HHTP_2$ metal-organic frameworks (M=Ni, and Cu) in 0.1 M phosphate buffer saline (FIG. 28A); in 10 μM of dopamine (FIG. 28B); in 10 μM of norepinephrine (FIG. 28C); and in 10 μM of epinephrine (FIG. 28B) in 0.1 M phosphate buffer saline (pH=7.4). All voltammetric measurements were run at 50 mV/sec in three electrode configurations—metal-organic framework films coated glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.
Figure 28B:
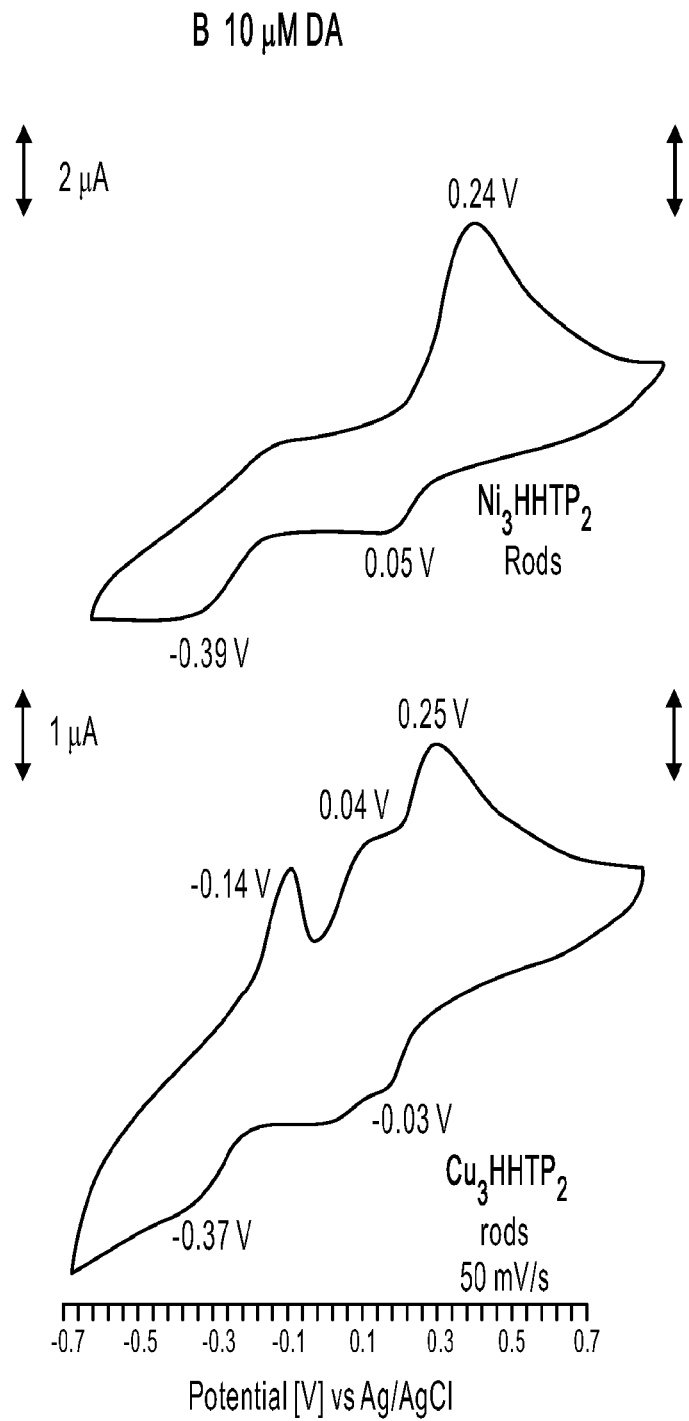
Figure 28C:
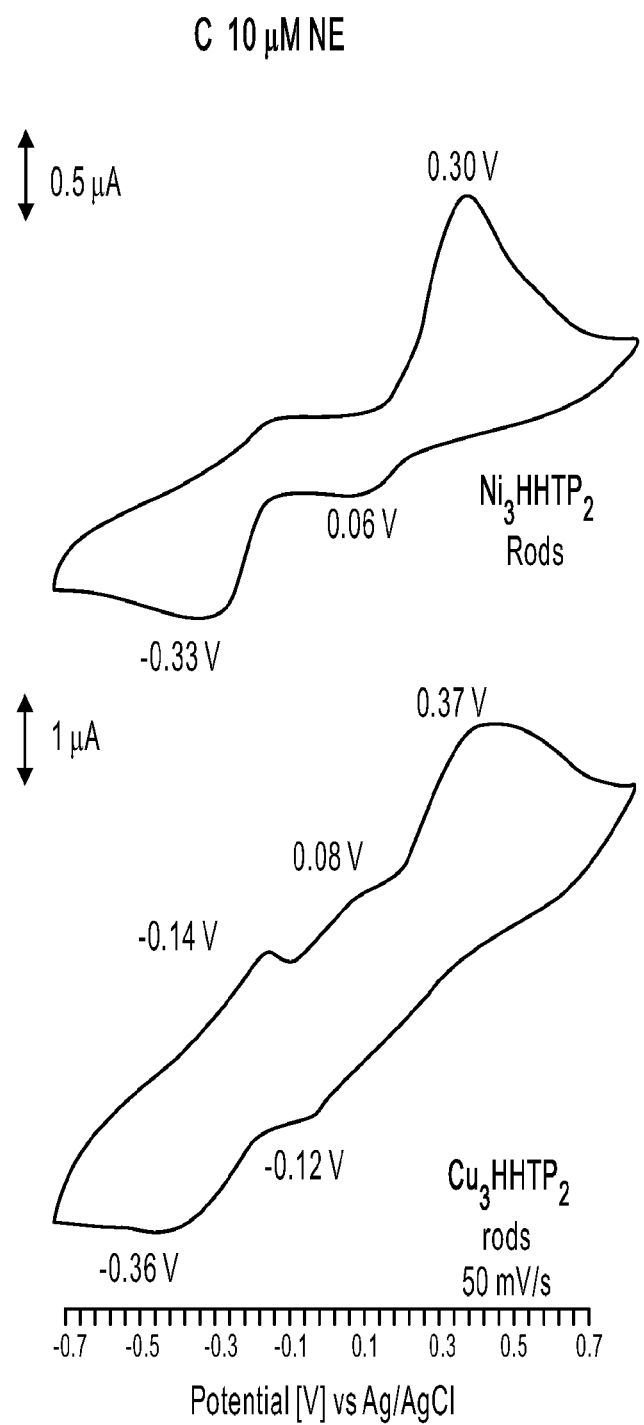
Figure 28D:
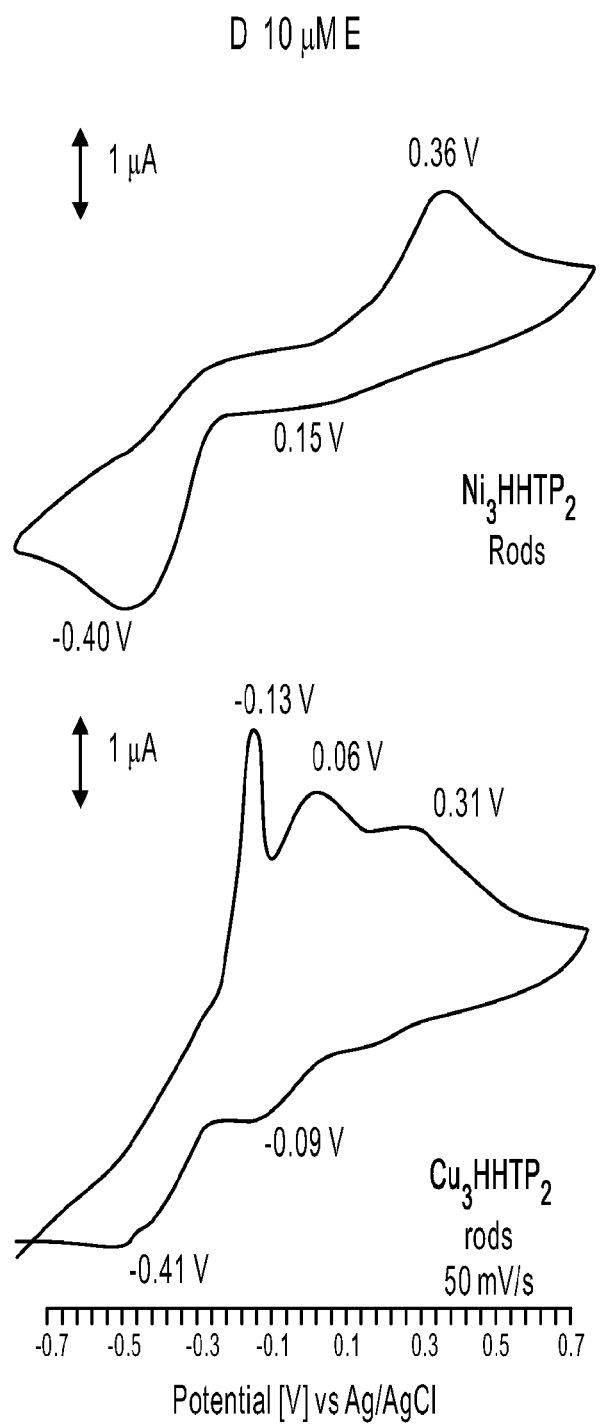
Figure 29A:
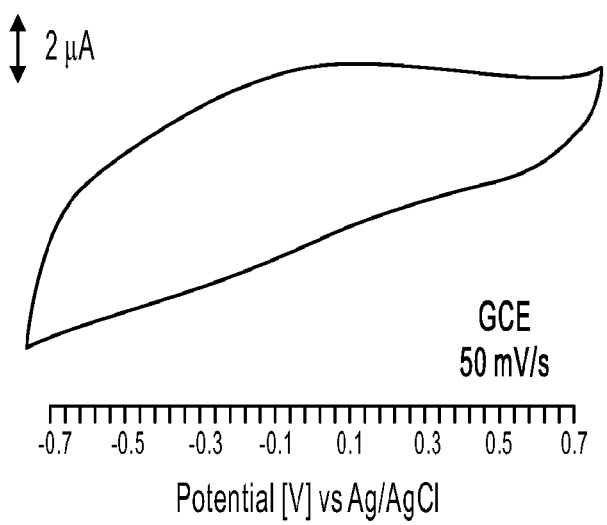
FIGS. 29A-D illustrate cyclic voltammograms obtained for glassy carbon electrodes in 0.1 M phosphate buffer saline (FIG. 29A); 10 μM of norepinephrine (FIG. 29B); in 10 μM of epinephrine (FIG. 29C); in 10 μM of dopamine (FIG. 29D) in 0.1 M phosphate buffer saline (pH=7.4). All voltammetric measurements were run at 50 mV/sec, in three electrode configurations—glassy carbon electrode, silver/silver chloride, and platinum were used as working, reference, and counter electrodes, respectively. The solutions were degassed with $N_2$ prior to the electrochemical measurements and the drop-casted metal-organic frameworks on the glassy carbon electrode were initialized with 25 cyclic voltammetry scans at 50 mV/sec.
Figure 29B:
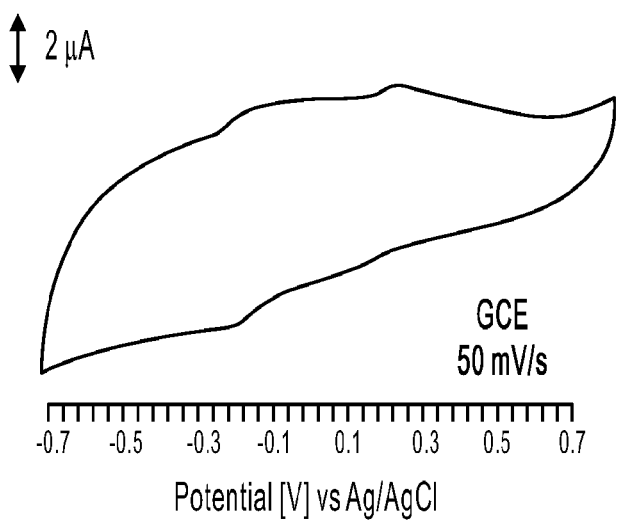
Figure 29C:
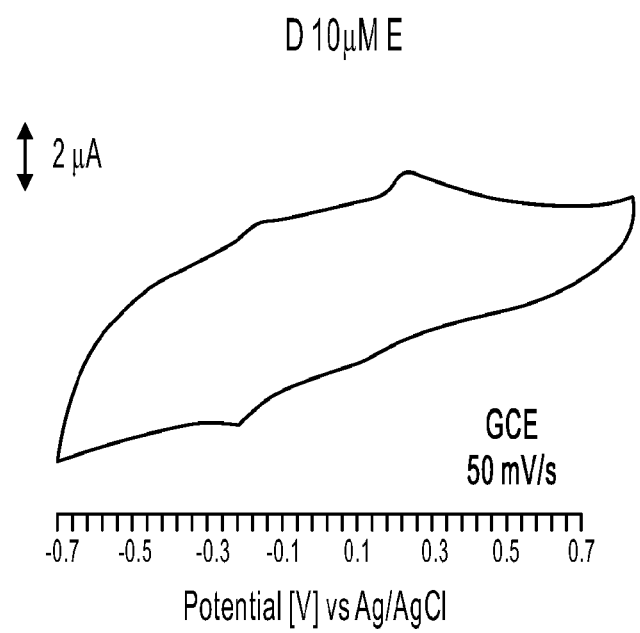
Figure 29D:
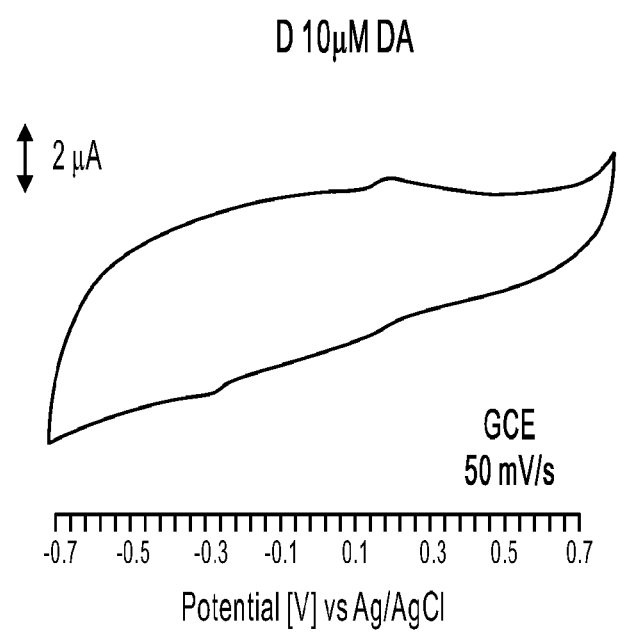

It is a challenge to monitor co-existing catecholamines simultaneously due to the similarities in structure and electrochemical activity. The catecholamines are typically electro-catalyzed from the catechol form into their quinone form. The catecholamines DA, NE, and E have similar redox potentials and mechanistically have a $2e^-/2H^+$ oxidation of the catechol moiety (FIG. 27).

In order to monitor these probes simultaneously with the same material, one possible strategy is to slow down the kinetics of the electrochemical process. In order to slow down the kinetics, the morphology of the two-dimensional (2D) $M_3HXTP_2$ MOFs (M=Ni, Cu; X=O, NH) material can be tuned accordingly. The basal plane is advantageous for this purpose and a sheet morphology can be employed.

In this Example, Applicants have focused on using the rod morphology of the 2D MOF materials to detect DA, ascorbic acid, uric acid, and serotonin due to the fact that the rod morphology has faster kinetics when detecting NT probes and biologically relevant molecules. In FIGS. 28A-D, $M_3HHTP_2$ MOFs (M=Ni, Cu) with rod morphology have been used to detect DA, NE, and E at a 10 μM concentration in 0.1 M phosphate buffer saline (PBS, pH=7.4). Applicants hypothesized that slowing down the kinetics of the electrode reaction by having the catecholamine probe interact with the basal plane of $Ni_3HHTP_2$ sheets would allow for the discrimination of DA, NE, and E.

$Ni_3HHTP_2$ is a better material for detecting and distinguishing NTs because it does not have redox activity in the absence of probe, and therefore only exhibits redox activity in the presence of probe and has no interfering electrochemical activity—this is illustrated in FIGS. 28A-D. $Ni_3HHTP_2$ does not exhibit redox activity in 0.1 M PBS (pH=7.4) whereas $Cu_3HHTP_2$ does exhibit redox activity in 0.1 M PBS (pH=7.4). $Ni_3HHTP_2$ and $Cu_3HHTP_2$ both have a significant response to the catecholamines when compared to the glassy carbon electrode controls (FIGS. 29A-D). $Ni_3HHTP_2$ sheets were used for the multianalyte detection of DA, NE, and E.

Figure 30A:
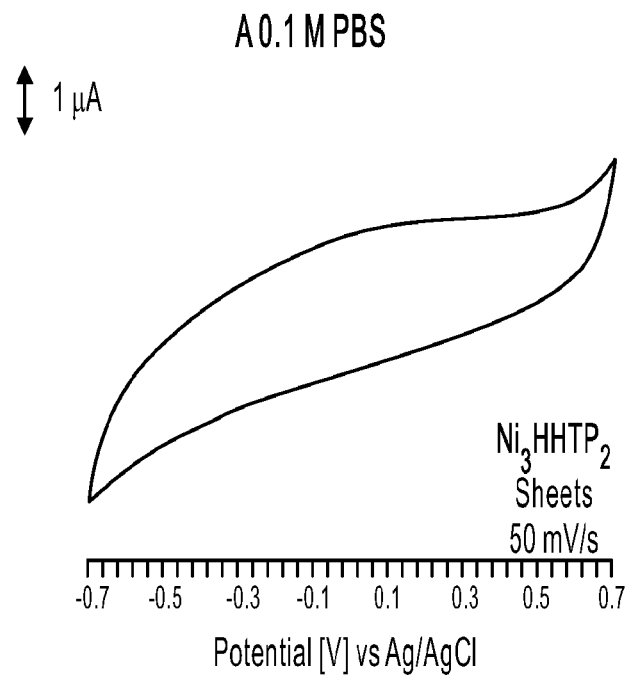
FIG. 30A illustrates cyclic voltammogram obtained for $Ni_3HHTP_2$ sheets in 0.1 M PBS (pH=7.4) at 50 mV/s.
Figure 30B:
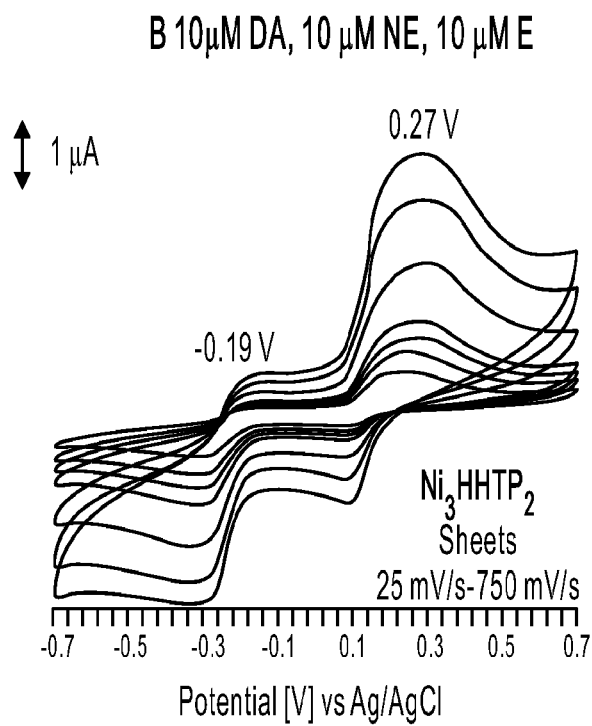
FIG. 30B illustrates that scan rate was varied for $Ni_3HHTP_2$ sheets in the presence of 10 μM of dopamine, 10 μM of norepinephrine, and 10 μM of epinephrine in 0.1 M phosphate buffer saline (pH=7.4) from 25 mV/s-750 mV/s.
Figure 30C:
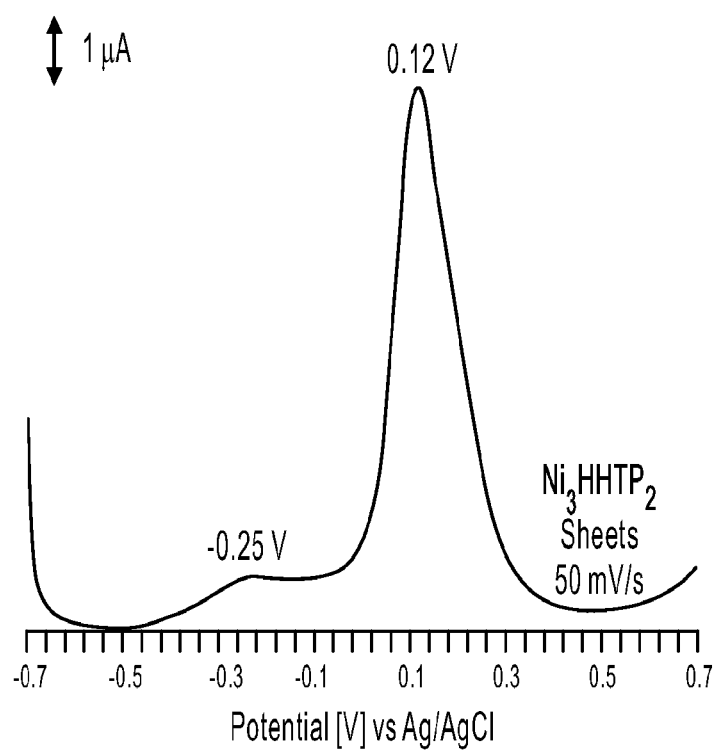
FIG. 30C illustrates a differential pulse voltammetry scan of $Ni_3HHTP_2$ sheets in the presence of 10 μM of dopamine, 10 μM of norepinephrine, and 10 μM of epinephrine in 0.1 M phosphate buffer saline (pH=7.4).

FIGS. 30A-C illustrate preliminary data for multianalyte detection of catecholamines using $Ni_3HHTP_2$ sheets. In 0.1 M PBS (pH=7.4), the $Ni_3HHTP_2$ sheets do not exhibit redox activity. When the $Ni_3HHTP_2$ sheets were in the presence of 10 μM concentrations of the catecholamines, there was a significant electrochemical response compared to the response of $Ni_3HHTP_2$ sheets in 0.1 M PBS (pH=7.4) alone. When cyclic voltammetric (CV) detection of DA (10 μM), NE (10 μM), and E (10 μM) is employed, two redox peaks appear at −0.19 V and 0.27 V (FIG. 30B). As illustrated in FIG. 30C, using differential pulse voltammetry (DPV) methods, these peaks are shifted to −0.25 V and 0.12 V. The presence of these two peaks suggest that there is some discrimination between the catecholamines, but it is unknown which of the three (DA, NE, and E) are differentiated in CV and DPV.

Example 3. Self-Assembly of Electrochemically Active Sites in 2D Metal-Organic Frameworks This Example describes self-assembly of electrochemically active sites in two-dimentional (2D) metal-organic frameworks.

Example 3.1. Introduction

Electrochemistry is a powerful means of studying and understanding phenomena and environments at the interface of liquid electrolyte and solid electrode. Analytical electrochemistry has developed tools that have revolutionized chemical detection in healthcare, industry, and research. Methods that employ electrochemistry have enabled chemical detection with unprecedented spatial resolution, sensitivity, and selectivity. Among the most powerful and commonly used electroanalytical techniques, voltammetric techniques (primarily cyclic voltammetry (CV), linear sweep voltammetry (LSV), and differential pulse voltammetry (DPV)) have excelled due to their ability to differentiate analytes in solution in real time at low cost. They have proven amenable to miniaturization, integration into wireless sensors, and remote sensing applications.

Voltammetric electroanalytical methods detect the oxidation and reduction of specific analytes by an electrode under a swept working potential. Differentiation between target analytes and interferents (off target analytes displaying similar redox chemistry) by voltammetric electroanalysis relies on the electrode kinetics and explicit interactions between the surface of the working electrode and analytes and interferents in solution.

Innovations to electroanalytical device performance are motivated by development of materials for working electrodes. For example, carbon-based materials encompassing all allotropes of carbon have been implemented as working electrodes for electrochemical detection of small molecules in solution. The progression from naturally occurring graphites, to advanced materials such as, boron-doped diamonds, and dimensionally controlled materials such as carbon nanotubes, highly oriented pyrolytic graphite (HOPG), and graphene, have improved sensing parameters of electrochemical systems. While these materials benchmark performance for chemical detection in contemporary analyte-interferent systems, their all-carbon construction and lack of tunability from de novo synthesis restricts rapid low-cost development towards new analytical targets. To overcome this issue, selectivity and in some cases sensitivity of these systems towards specific analytes is supplied by post-synthetic modification using complex procedures creating hybrid materials with improved sensing performance.

It is a well-known phenomenon that pristine carbon surfaces provide subpar performance as electrochemical interfaces in terms of electron transfer kinetics and catalytic activity. An ideal material system would offer facile preparation of materials and integration into electrodes, a high degree of tunability in structure, morphology, and surface chemistry, while also conforming to the requirements of electrochemical applications (e.g. high conductivity, no electrochemical signature, electrochemically stable). Bottom-up synthetic methods of obtaining these design elements would enable a material with superior adaptability to analyte systems.

Conductive 2D metal-organic frameworks (MOFs) based on 2,3,6,7,10,11-hexahydroxytriphenyelene (HHTP) are promising functional materials for electrochemical applications because they are readily prepared using highly tunable bottom-up methods, have high surface area, and can be used to transduce chemical interactions into electrical signals. The fully conjugated nature of the HHTP ligand allows a rigid extended π-framework which provides good conductivity and drives the self-assembly of 2D sheets into nanoscale crystalline solids. The self-assembly of 2D sheets into nanorods creates three unique surfaces, 1) a basal plane rich in $sp^2$ carbons and cofacially aligned pores, 2) an edge-face rich in sheet termination sites, and 3) interior pore volume with surfaces consisting of heteroatom lone-pairs and aromatic protons projected inwardly to the pore volume.

Each of these chemically distinct surfaces provide a unique set of interactions with their chemical environment potentially allowing higher degrees of control over electrochemical behavior. However, little is known about how morphology and dimensionality of MOF nanostructures impact the reactivity of active sites present, and the concentration of these sites on the surface. This limitation restricts progress in molecular design of conductive MOFs for targeted applications and prevents a fundamental understanding of emergent structure-property relationships at the nanoscale.

Examples 1 and 2 of this Application detail the use of $Cu_3HHTP_2$ as an electrode material for the detection and differentiation of biologically relevant analytes (i.e. dopamine (DA) and ascorbic acid (AA)) in solution. The demonstration showed an impressive limit of detection, linear response range, and the ability to distinguish between multiple analytes concurrently. In this Example, Applicants further elucidate how these MOFs perform their demonstrated electrochemical function, how surface-chemistry interfaces with electrochemical response, and how the heterogeneous electron transfer rate (HETR) associated with detection of surface-sensitive analytes such as DA and AA can be controlled.

In particular, Applicants demonstrate in this Example that specific crystalline faces of stacked 2D MOF systems are responsible for the good electrochemical properties of this class of materials. Using surface-sensitive and surface-insensitive probes, Applicants identify the electrochemically most active surface of MOF microcrystalline nanorods and nanosheets to be the [100] surface while the [004] is primarily a passivating presence electrochemically.

Applicants show that electrochemically active sites can be organized through self-assembly into surfaces that promote or inhibit fast HETRs. Finally, Applicants demonstrate that morphology-controlled surface chemistry can be used to enhance the resolution of biological analytes in solution. The identification of sites having good electrocatalytic activity, and the demonstration of rationally designed surfaces for the enhancement of chemicals sensing provide a valuable contribution to the study and design of 2D materials for electrochemical sensing.

Example 3.2. Electrochemistry Methods

Electrode systems were investigated using cyclic voltammetry to determine the behavior of materials towards surface-sensitive and surface-insensitive redox probes. Peak separation between oxidation and reduction peaks for these probes was used to determine the heterogeneous electron transfer rate (HETR), $k^0$, for electrode-systems. For peak separations smaller than 200 mV, previously developed theories were used to obtain $k^0$. For peak separations larger than 200 mV, $k^0$ was obtained by application of previously developed theories. These two methods allow accurate evaluation of electrode kinetics using cyclic voltammetry at scan rates between 5 mV/s and 1000 mV/s. Practical application of these two methods was accomplished by applying the equation describing an extended working curve. An experimental determination of the diffusion coefficient for analytes with each electrode system was needed in order to determine $k^0$. This was obtained by plotting the peak potential versus the square root of the scan rate to generate Randles-Sivcek plots.

MOF materials were mounted on glassy carbon electrodes (GCE) by drop casting to provide good electrical contact between the surface of the GCE and the MOF crystallites. Good electrical contact between MOF and GCE ensures that charge transfer at the heterojunction is fast and does not interfere with measurements taken at the MOF-solution interface.

To examine electron transfer rates, redox probes were examined across a potential window of –0.7 V to 0.7 V. This window was chosen to prevent water-splitting reactions at high potentials and to provide a window under which the MOF would be stable. Oxidation and reduction of target analytes occurs at specific potentials determined by factors related to the working electrode (over potential, electron transfer rate, and diffusion coefficient) and the electrochemical system (nature of target probe).

Since the materials used in this Example were both microstructured and highly porous, the morphology of materials deposited on the GCE is anticipated to dramatically enhance the surface area of the working electrode with respect to pristine GCE. Therefore, the prepared electrodes were investigated to determine the electrochemical surface area (ECSA). This was accomplished by monitoring current density in non-Faradaic regions. Current densities monitored over multiple scan rates provided the double layer capacitance ($C_{dl}$) which could then be compared to a smooth GCE standard surface. The roughness factor obtained was then used to scale the surface area of the GCE to account for the increased surface area when functionalized with MOF nanomaterials.

Example 3.3. Identifying Electrochemical Behavior at Surfaces

The electrochemical reactivity of distinct surfaces was determined by quantifying the redox behavior of inorganic and biological electrochemical probes. A selection of probes was chosen based on utility to characterization efforts and those that posed a bracing analytical challenge. The redox behavior of probes at surfaces can be characterized as surface sensitive or surface insensitive. Surface insensitive probes typically display fast redox kinetics independent of the surface involved in the electron transfer process. Surface sensitive probes display fast kinetics on surfaces that are conducive to electron transfer while displaying slow kinetics on surfaces that hinder electron transfer. The distinction arises from differences in reorganization energy different probes must overcome to accept or donate electrons.

Example 3.4. Inorganic Probes

Inorganic probes provide a strong fundamental foundation with which to investigate the electrochemical behavior of new electrode materials. In comparison to organic probes, they can be selected to represent a range of surface-sensitivities and are less prone to side reactions and fouling of electrode surfaces. The inorganic probe $K_3Fe(CN)_6$ is an established surface sensitive probe. Its behavior at electrodes is highly dependent on the nature of surface. When fast redox kinetics are observed for $K_3Fe(CN)_6$, it indicates that a surface possesses functionalities and a density of states that is beneficial for electrochemical processes. The inorganic probes $Ru(NH_3)_6Cl_3$ and $K_4IrCl_6$ are well known surface insensitive redox probes. Their insensitivity to surface functionalization was used as a control to confirm that surfaces with poor electrochemical activity observed for $K_3Fe(CN)_6$ were reducing reactivity based on interactions between the probe and electrode, not reduced conductivity.

Example 3.5. Organic Probes

The catecholamines (CA) are biological signaling molecules that play imperative roles in physiological homeostasis and human wellbeing. A wide range of endogenous catecholamines have been identified as relevant to biological systems some with therapeutic or diagnostic value. The differentiation of CAs such as dopamine (DA), norepinephrine (NE), and epinephrine (EP) in vivo is a challenging task as they often display similar redox reactivity and potentials. Since the only chemical differences in the above three CAs are limited to hydroxylation of the alkyl chain and N-alkylation, differentiation of these analytes in solution will necessarily utilize these differences to achieve resolution. Applicants anticipate that the chemical differences listed above will influence the diffusion coefficients of these analytes towards electrodes and thus alter the observed HETR values. At appropriates surfaces this can be used to achieve resolution of peak potentials and thus concentrations of materials in solution.

Example 3.6. Electrode Materials

In this Example, $Ni_3HHTP_2$ was chosen to provide a representative material for 2D stacked materials and conductive MOFs. $Ni_3HHTP_2$ was analyzed in two primary morphologies—nanowires and nanosheets. The anisotropy intrinsic to the crystal cell of these stacked 2D materials ensures that material structure is maintained across morphologies even as the aspect ratio (basal plane:edge site) changes.

Example 3.7. Morphological Control of Solvent-Accessible Crystal Faces

Nanorods and nanosheets of $Ni_3HHTP_2$ were dropcast onto silicon plates for analysis by SEM and PXRD. The similar manner in which samples were prepared allowed the morphology determined by SEM to be compared with observations of crystallinity obtained by PXRD.

Figure 31A:
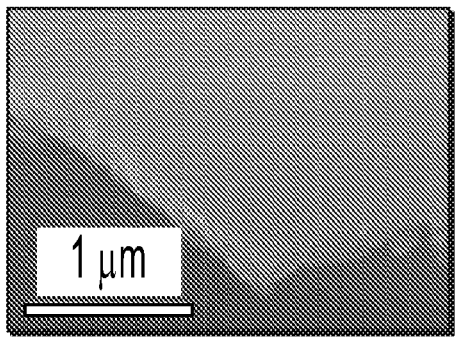
FIG. 31A illustrates metal-organic frameworks in the form of nanorod and nanosheet crystalline solids were analyzed by scanning electron microscopy to determine morphology.
Figure 31B:
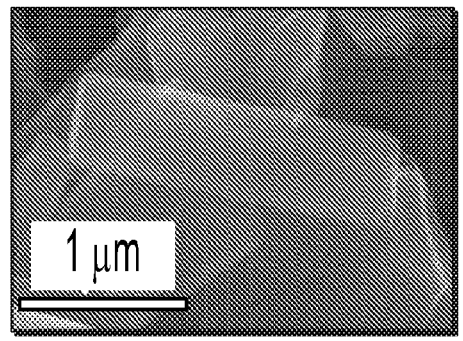
FIG. 31B illustrates exposed crystal faces of nanorods and nanosheets were anticipated from their reported crystal structure.

SEM imaging of the silicon-mounted samples revealed that sheets lifted onto silicon plates preferentially aligned with their long-axis parallel to the silicon plate once dried (FIG. 31A). Nanorods characterized in a similar manner (FIG. 31B) revealed a distribution of orientations with respect to the plane of the silicon plate but with nanorods generally laying parallel to the surface.

Figure 31C:
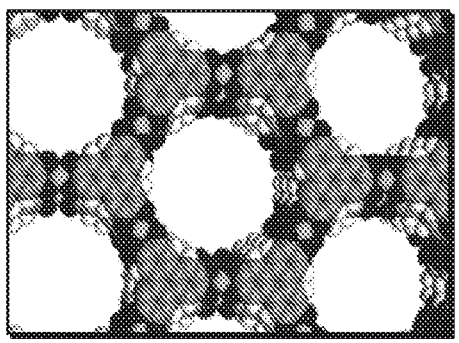
FIG. 31C illustrates powder X-ray diffraction patterns characterization showing that nanosheets exhibit mainly [004] crystal faces.

Applicants anticipated that the plane of the 2D nanosheet observed by SEM was coplanar with the molecular basal plane described by the Miller index [004] meaning that nanosheets consisted of stacked 2D molecular sheets (FIG. 31C). Similarly, Applicants anticipated that the majority surface area of nanorods was described by the Miller index [100], meaning that the majority surface area was exposed edge sites.

Figure 31D:
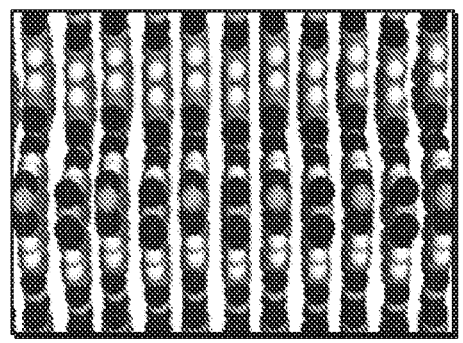
FIG. 31D illustrates powder X-ray diffraction patterns characterization showing that nanorods exhibit mainly [100] faced crystallinity.
Figure 31E:
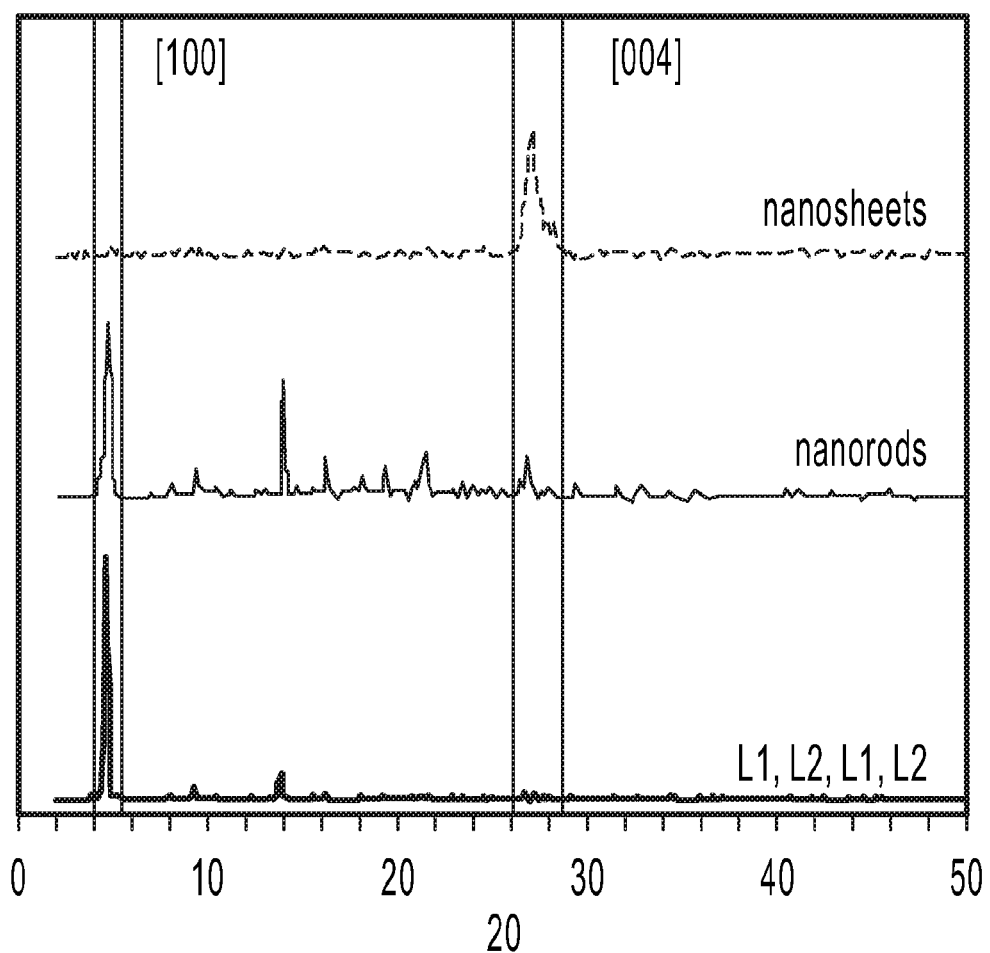
FIG. 31E illustrates that the crystallinity of the nanorods and nanosheets is maintained throughout morphological control as shown by powder X-ray diffraction patterns of the samples. Powder X-ray diffraction patterns were also able to confirm the orientation of nanorod and nanosheet facets with respect to the bulk materials.

To confirm these premises, the crystallinity of both morphologies was assessed by PXRD. The highly oriented sheets, characterized by PXRD (FIG. 31E), exhibited a single strong diffraction at 27.5° 2θ and was calculated to arise from an intermolecular distance of 3.34 Å. By comparison with computational models and single crystal structures of previously published isostructural $Co_3HHTP_2$, Applicants determine the Miller index of the corresponding diffraction plane to be [004]. This confirmed that the orientation observed by SEM coincided with the orientation of the stacked structure and that the majority surface area of the nanosheets could be described by the [004] crystal face. Nanorods exhibited a prominent diffraction peak at 4.6° 2θ, corresponding to an interatomic distance of 18.0 Å commiserate with the anticipated prominence of the [100] crystal face (FIG. 31D). Because of the distribution of orientations of nanorods on the surface of the silicon plate, the PXRD trace observed for $Ni_3HHTP_2$ nanorods (FIG. 31E) matched with powder patterns reported previously.

After confirming that the observed morphological features of controlled morphologies corresponded to specific crystal faces (i.e. nanorod edge sites were [001] and nanosheet basal planes were [004]), Applicants assessed the behavior of these two morphologies towards a series of electrochemical probes.

Example 3.8. Electrochemical Behavior of Nanorods and Nanosheets Towards Inorganic Probes To test the electrocatalytic nature of the MOF [100] and [004] surfaces towards a range of inner-sphere and outer-sphere analytes, three well-known inorganic probes were chosen— $K_3Fe(CN)_6$, $Ru(NH_3)_6Cl_3$, $K_3IrCl_6$.

Example 3.9. The Electrochemical Response of $Ru(NH_3)_6Cl_3$ on Nanorods

The voltammetric response of $Ni_3HHTP_2$ nanorods in 1 mM $Ru(NH_3)_6Cl_3$ was observed across a range of scan rates. The morphologic control of the CV showed strong 1e⁻ oxidation and reduction peaks, corresponding to the $Ru^{3+}/Ru^{2+}$ redox couple on $Ni_3HHTP_2$ nanorods. The peak separation at 50 mV/s was 120 mV, which was larger than a Nernstian response. The highly asymmetric peak shape indicated that a catalytic process was occurring at the surface of the electrode. At scan rates below 25 mV/s, multiple oxidation peaks were observed indicating contributions from surface-adsorbed species and a freely diffusing species.

Example 3.10. The Electrochemical Response of $Ru(NH_3)_6Cl_3$ on Nanosheets

The response of nanosheets in 1 mM $Ru(NH_3)_6Cl_3$ was similar to nanorods. The peak separation at 50 mV/s was 120 mV, which was similar to that found for nanorods. The maximum peak current was found to be less for nanosheets compared to nanorods. At scan rates below 25 mV/s, multiple oxidation peaks were observed, indicating contributions from surface-adsorbed species and a freely diffusing species. The similarity of the response of $Ru(NH_3)Cl_3$ at nanorods and nanosheets confirmed that both surfaces are capable of electron transfer to surface-insensitive probes with equal facility. To test whether surface chemistry was changing as a function of morphology, a surface-sensitive probe was next investigated.

Example 3.11. The Electrochemical Response of $K_3Fe(CN)_6$ on Nanorods

Figure 32B:
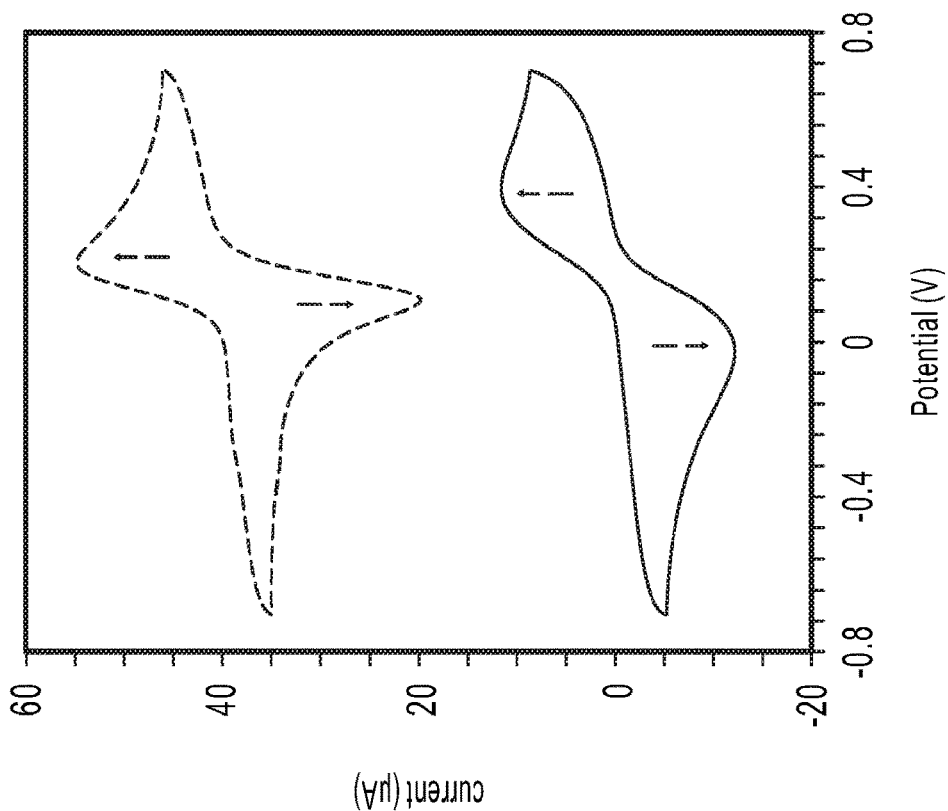
FIGS. 32A-C illustrate the electrochemical behavior of inorganic probes at nanorod and nanosheets surfaces demonstrate a strong dependence of morphology on electrochemical behavior. The behavior of surface insensitive $Ru(NH_3)_6Cl_3$ (FIG. 32A) on nanorods and nanosheets showed very similar peak separation. $K_3Fe(CN)_6$ (FIG. 32B) was showed strong dependence of peak separation on morphology which was anticipated for the surface-sensitive probe. Surface insensitive $K_4IrCl_6$ (FIG. 32C) again showed very little dependence of peak separation on morphology.
Figure 32A:
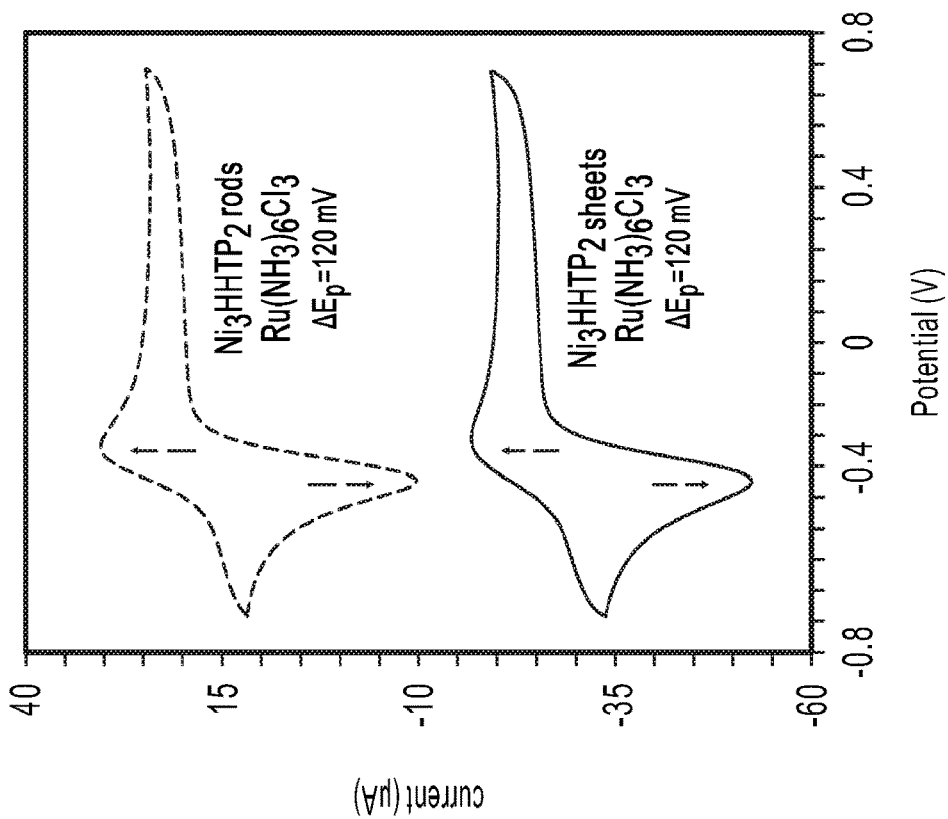
Figure 32C:
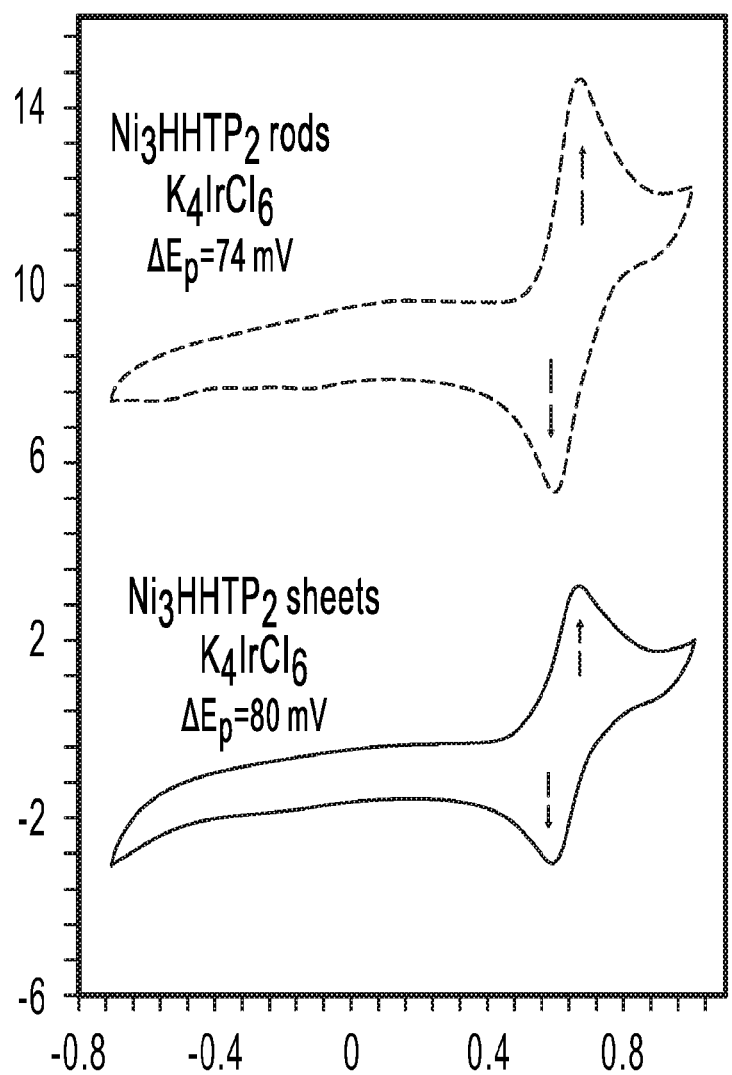
Figure 33:
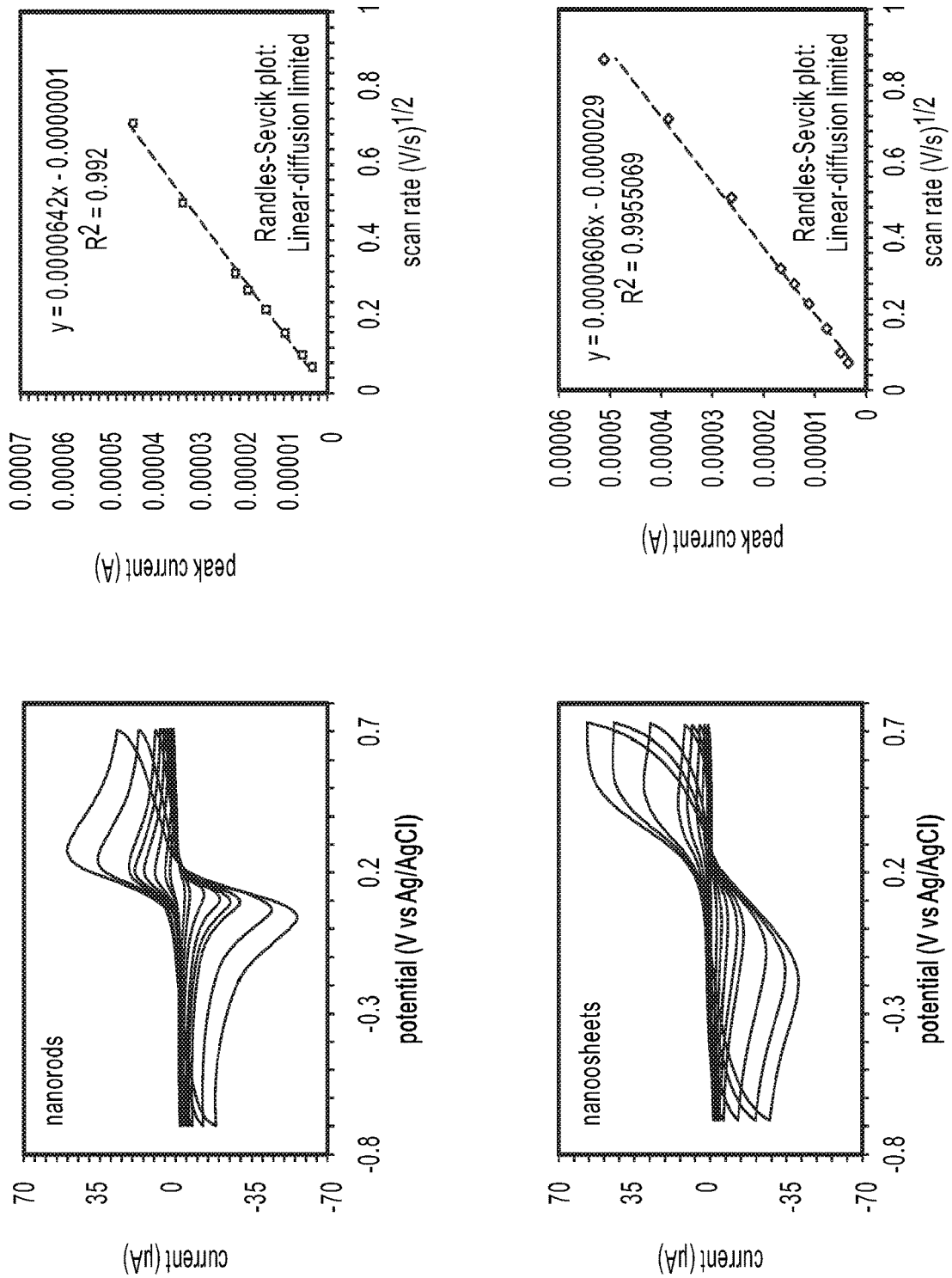
FIG. 33 illustrates cyclic voltammograms of 1 mM $K_3Fe(CN)_6$ in 0.1 M KCl were collected with nanorods on glassy carbon electrodes at scan rates of 5, 10, 25, 50, 75, 100, 250, 500, 750, and 1000 mV/s. The maximum current for the oxidation and reduction peaks of $K_3Fe(CN)_6$ were plotted against the square root of the scan rate in V/s. A linear fit was applied to the data with a good fit.

The voltammetric response of $Ni_3HHTP_2$ nanorods in 1 mM $K_3Fe(CN)_6$ was observed across a range of scan rates. Strong 1e⁻ oxidation and reduction events corresponding to the $Fe(CN)_6^{3-}/Fe(CN)_6^{4-}$ redox couple (FIG. 32A) were observed with $U_o$ of 154 mV. The peak separation at 50 mV/s was observed to be 110 mV (FIG. 32A) but was observed to be Nernstian at scan rates slower than 10 mV/s (FIG. 33).

Example 3.12. The Electrochemical Response of $K_3Fe(CN)_6$ on Nanosheets

Next, the voltammetric response of $Ni_3HHTP_2$ nanosheets in 1 mM $K_3Fe(CN)_6$ was investigated. Similar to Ni$_3$HHTP$_2$ nanorods, 1e$^-$ oxidation and reduction events were observed. However, the peak separation at 50 mV/s was 383 mV (FIG. 32A). At the slowest scan rate recorded, 5 mV/s, the peak separation was 195 mV, which was larger than the expected Nernstian value of 57 mV for a one-electron process.

Example 3.13. Application of Morphological Control for the Detection of Biological Analytes To expand the understanding of morphologically controlled kinetics to organic probes, and relevant biological analytes, the behavior of DA, NE, and EP on nanorods and nanosheets was explored. Applicants were particularly interested in observing morphology-specific changes in redox potentials, new peaks, and peak intensities between nanorod and nanosheet examples.

Example 3.14. The Electrochemical Response of Dopamine on Nanorods and Nanosheets The electrochemical reaction of DA at 10 µM on Ni$_3$HHTP$_2$ surfaces was observed to be mostly irreversible. Nanorods showed a poor response for DA. At 50 mV/s, the peak potential corresponding to the 2e$^-$/2H$^+$ oxidation of the catechol appeared at 326 mV. A weak reduction peak was observed at −33 mV and a poorly defined peak at −569 mV.

On nanosheets, a scan rate of 50 mV/s strong oxidation peak was observed at 233 mV, corresponding to a 2e$^-$/2H$^+$ oxidation of the catechol. At the same scan rate a weak reduction peak was observed at −26 mV and a second stronger reduction peak was observed at −635 mV. The differences between DA on nanorods and on nanosheets had two distinct differences. First, the peak intensity and definition of the oxidation peak on nanosheets was better than nanorods, and second, the potential of the peak was shifted to lower potentials for nanosheets over nanorods by almost 100 mV.

Example 3.15. The Electrochemical Response of Norepinephrine on Nanorods and Nanosheets Applicants next investigated the electrochemical response of 10 µM of NE on Ni$_3$HHTP$_2$ materials. The redox process of NE on the selected materials was observed to be mostly irreversible. On nanorods the primary 2e$^-$/2H$^+$ oxidation was observed at 287 mV while a strong reduction peak was observed at −511 mV. On nanosheets the 2e$^-$/2H$^+$ oxidation potential shifted to 325 mV and two reduction events were observed at 32 mV and a more intense reduction event at −382 mV. Three differences were observed for the redox behavior of NE on nanorods and nanosheets. First, the peak potential of NE on nanosheets was 38 mV higher than on nanorods. Second, the reduction peak at 32 mV was present for NE on nanosheets but not on nanorods. Third, the most intense reduction peak for NE on nanosheets was well defined at −382 mV while NE on nanorods demonstrated only an ill-defined peak shifted to negative potentials by 129 mV.

Example 3.16. The Electrochemical Response of Epinephrine on Nanorods and Nanosheets The behavior of EP on Ni$_3$HHTP$_2$ surfaces was investigated at 10 µM. On nanorods, the 2e$^-$/2H$^+$ oxidation of catechol was observed at 374 mV/s and a single strong reduction peak was observed at −537 mV. On nanosheets, the peak potential corresponding to the primary 2e$^-$/2H$^+$ oxidation was relatively unchanged at 359 mV. However, a second weak oxidation was observed at −66 mV that was not observed at nanorod surfaces. A single, well-defined, and strong reduction peak was observed at −500 mV. The difference in response at nanorods and nanosheets was primarily two-fold. First, the appearance of a new oxidation peak at −66 mV was observed for nanorods but not for nanosheets. Second, the intensity and shape of the reduction peak was much better at nanosheets than nanorods.

Example 3.17. Differences Observed in the Behavior of Catecholamines at Nanorod and Nanosheet Surfaces The analysis of morphologies by SEM and PXRD allowed the conclusion that nanosheets were dominated by exposed [004] surface area while nanorods were dominated by surface area. Once the nanorods and nanosheets were mounted on GCE, the electrochemical behavior towards various analytes could be correlated to specific crystal faces.

Once solvent-exposed crystal faces were controlled for, analysis progressed to determining the nature of electron transfer kinetics at each type of electrode surface. Two types of electrochemical probe were employed for this analysis, surface-sensitive probes and surface-insensitive probes. As indicated by the results obtained for the surface-sensitive probe K$_3$Fe(CN)$_6$, the edge plane ([100] face) of the MOF showed better kinetics for redox of surface-sensitive species than the basal plane ([004] face). For surface-insensitive inorganic species such as K$_4$Ir(Cl)$_3$ and Ru(NH$_3$)Cl$_3$, the [100] and [004] surfaces showed similar kinetics and peak currents. These findings confirmed that the edge-plane of MOFs as found in nanorods possesses superior electrochemical properties for the redox transformation of surface-sensitive species. Because the catalysis of Fe(CN)$_6^{4-}$/3− redox reactions demonstrate promiscuity towards a number of surface chemistries, no specific electrocatalytic claims could be made about the rate increase of this reaction at electrode surfaces.

Applicants attribute the superior efficacy of electron transfer to surface-sensitive species at [100] surfaces of Ni$_3$HHTP$_2$ to be due to a higher density of states as well as more favorable non-specific binding sites for the interaction of Fe(CN)$_6^{3-}$ with the surface of the MOF (e.g. terminal ligand sites, terminal metal sites, etc.). These observations demonstrate that reactivity of electrochemical surfaces can be tuned by controlling the morphology of the active material. The methods used herein demonstrate that the self-assembly of surfaces can provide control over chemical interactions with the surface and help to modulate electron-transfer processes across the electrode-electrolyte interface.

Example 3.18. Opportunities for Differentiation of Catecholamines

The ability to distinguish between catecholamines in complex mixtures where they are co-occurring depends on quantifiable differences observed in their respective electrochemical behavior. For the catecholamines investigated herein, the primary differences observed suggest that nanosheets provide more opportunities for differentiating analytes. For example, the experimental evidence presented suggests that differentiation between DA and NE would be possible by DPV when examining oxidation peak potentials (DA Eox=233 mV, NE Eox=325 mV). A similar method of differentiation is possible between DA and EP (DA Eox=233 mV, EP Eox=359). For the pair of catecholamines NE and EP, primary Eox values are too similar for resolution by DPV. However, the additional oxidation peak observed for EP on nanosheets Eox=−66 mV is not present in the CV of NE and may thus be used to distinguish between these two analytes in complex mixtures using CV. The strong primary reduction peak of EP on nanosheets ($E_{Red}$=−500 mV) and lack of a weak reduction peak in the region +100 mV to −100 mV can be used across the three catecholamines to differentiate between them.

The complexity of the response of catecholamines at the surface of anisotropic 2D MOF surfaces was revealed by CV investigations Applicants undertook in this Example. Applicants anticipate that the complexity arises from three primary interactions. First, the behavior of catecholamines is both diffusion controlled and adsorption controlled. The adsorption of catecholamines on the [100] face of MOFs is anticipated to be more favorable and thus less reversible compared to adsorption on the [004] face. This could help to alleviate fouling on for nanosheets. Second, intramolecular cyclization reactions may occur for the catecholamines leading to multiple analyte species in solution, or additional fouling of the electrode. The greater reversibility of catecholamine redox reactions at nanosheets indicates that these reactions are less favorable at the [004] surface. Third, the hydrophilicity of the [100] face and relative lipophilicity of the [004] face could play a prominent role in the complexity of the behavior at the surface of nanorods and nanosheets.

Example 3.19. Electrochemical Response of Catecholamines

Figure 34A:
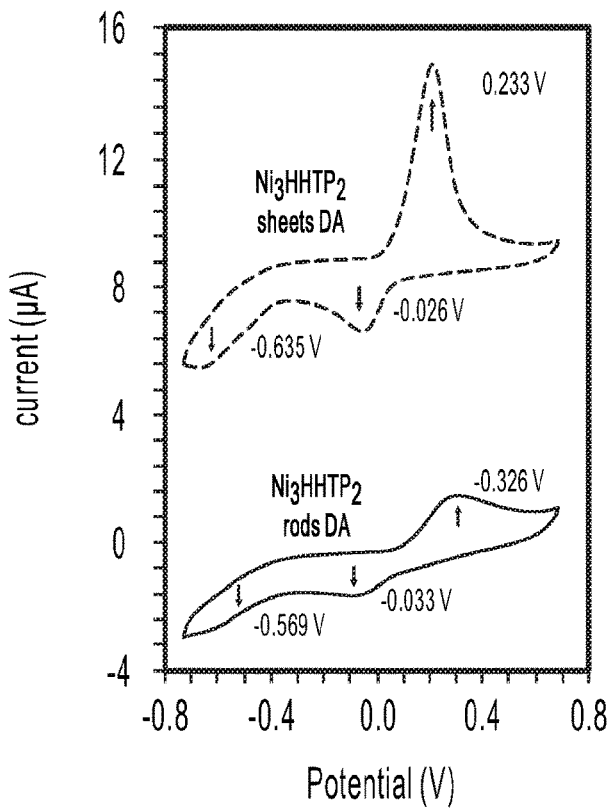
FIGS. 34A-C illustrate the electrochemical response of catecholamines is dominated by a strong oxidation event corresponding to the $2e^-/2H^+$ oxidation of catechol core to quinone. The potential at which the maximum current occurs can vary depending on the identity of the catecholamine dopamine (FIG. 34A), norepinephrine (FIG. 34B), and epinephrine (FIG. 34C), and on the chemistry of the electrochemical surface (nanosheets—green traces, nanorods— blue traces).
Figure 34B:
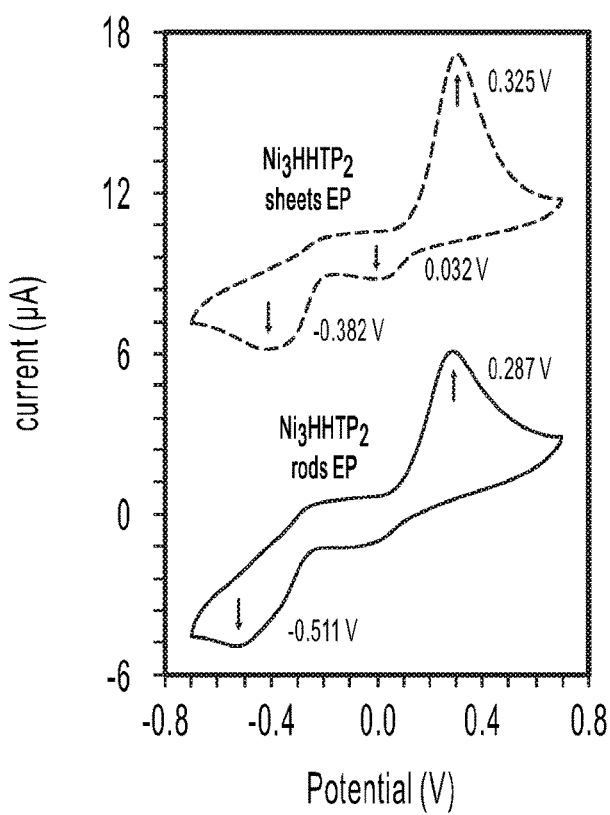
Figure 34C:
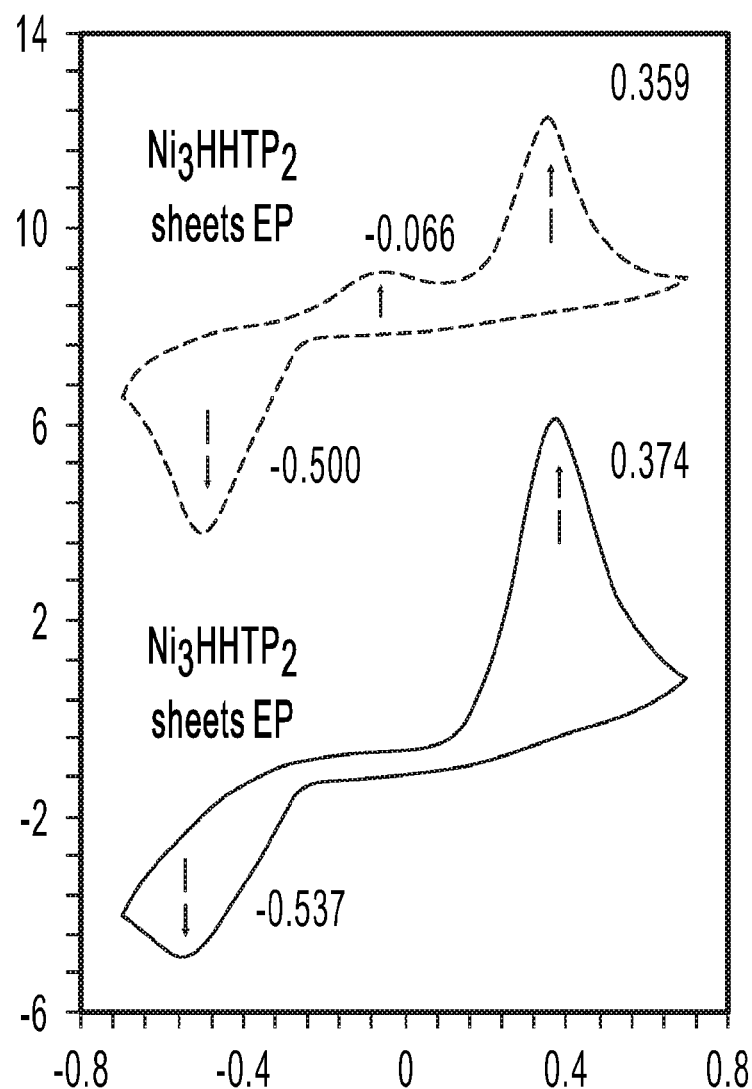

FIGS. 34A-C illustrate the electrochemical response of catecholamines.

Example 3.20. Conclusion

The experimental evidence Applicants present in the Example demonstrates that the confluence of morphological control and anisotropic crystallinity can yield self-assembly of tunable reactive surfaces for electrochemical detection. This Example provides a fundamental advancement in understanding the behavior of 2D conductive MOFs in different morphologies and against different classes of analytes. Applicants help to elucidate the importance of different factors of surface chemistry and surface area on the electrochemical response and demonstrate that these materials hold a great deal of potential for resolving complex mixtures of catecholamines.

Example 3.21. General Methods

Chemicals were purchased from Sigma Aldrich or TCI and used as received. Electrochemical experiments were run on an EmStat3MUX16 purchased from PalmSens. Electrodes and electrochemical cells were purchased from CH Instruments.

Example 3.22. General Synthesis of MOF Nanorods

Figure 35:
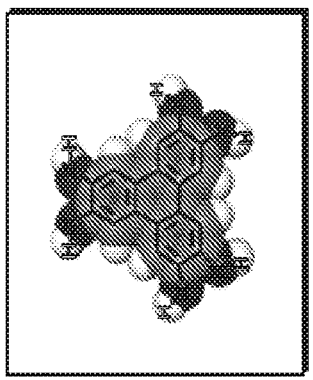
FIG. 35 illustrates a reaction scheme showing general synthetic conditions for the generation of $Ni_3HHTP_2$ materials.
Figure 35:
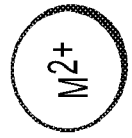
Figure 36A:
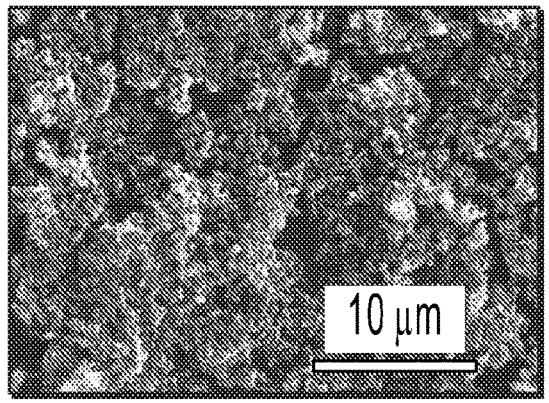
FIGS. 36A-D illustrate scanning electron microscopy characterization of metal-organic framework morphologies placed directly onto silicon wafers. The method of deposition of nanorods and nanosheets for scanning electron microscopy characterization was the same used for deposition on glassy carbon electrode for electrochemical experiments. This allowed the scanning electron microscope images to closely match the distribution, orientation, and coverage of materials on the surface of glassy carbon electrode.
Figure 36B:
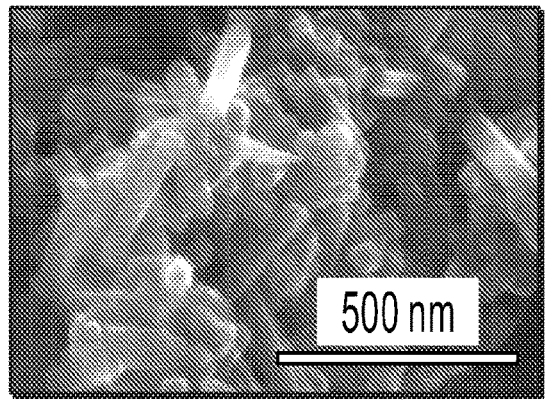
Figure 36C:
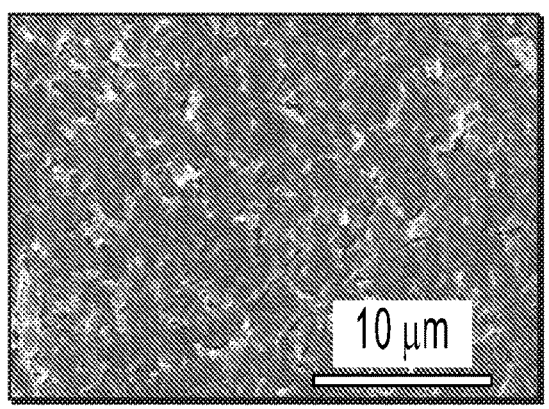
Figure 36D:
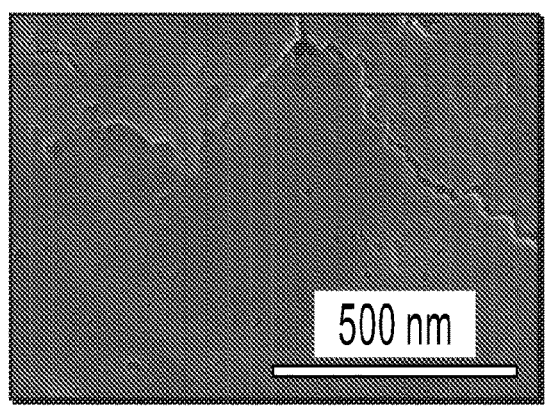

FIG. 35 illustrates a reaction scheme showing general synthetic conditions for the generation of four distinct MOFs in the form of nanorods.

General synthesis of $Ni_3HHTP_2$ Nanorods: To prepare MOFs, 0.088 mmol hexahydroxytriphenylene (5 mg) and 0.176 mmol nickel (II) acetate (43.8 mg) were added to a 20 mL scintillation vial. Deionized water (4 mL, 0.022M with respect to HHTP) was added and the vial capped. The reaction mixture was subjected to sonication (5 min), and then heated without stirring (85° C.) overnight (18-24 h). The resulting solution was stored at 7° C.

General synthesis of $Ni_3HHTP_2$ Nanosheets: Into a recrystallizing dish (0=cm) was added $Ni(OAc)_2$ (56.5 mg, 0.227 mmol, 2 eq.) and 100 mL of DI water. This solution was then heated to 85 C in an oven. Into a vial was added HHTP (36.8 mg, 0.113 mmol, 1 eq.) and 20 mL of DI water. The vial was then sonicated for 10 min until a pink/purple suspension was formed. This suspension was poured into the recrystallizing dish containing the $Ni(OAc)_2$ solution at 85 C. The reaction was held at 85 C for 4 h then cooled to room temperature and allowed to stand for an additional 3 h. Finished sheets were mounted onto GCE using the Langmuir-Blodgett method.

Example 3.23. Scanning Electron Microscopy of MOF Nanorods

FIGS. 36A-D illustrate SEM characterization of MOF nanorods.

Example 3.24. Electrochemical Behavior of $K_3Fe(CN)_6$ on Nanorods and Nanosheets FIG. 33 illustrates electrochemical Behavior of $K_3Fe(CN)_6$ on nanorods and nanosheets.

Figure 37:
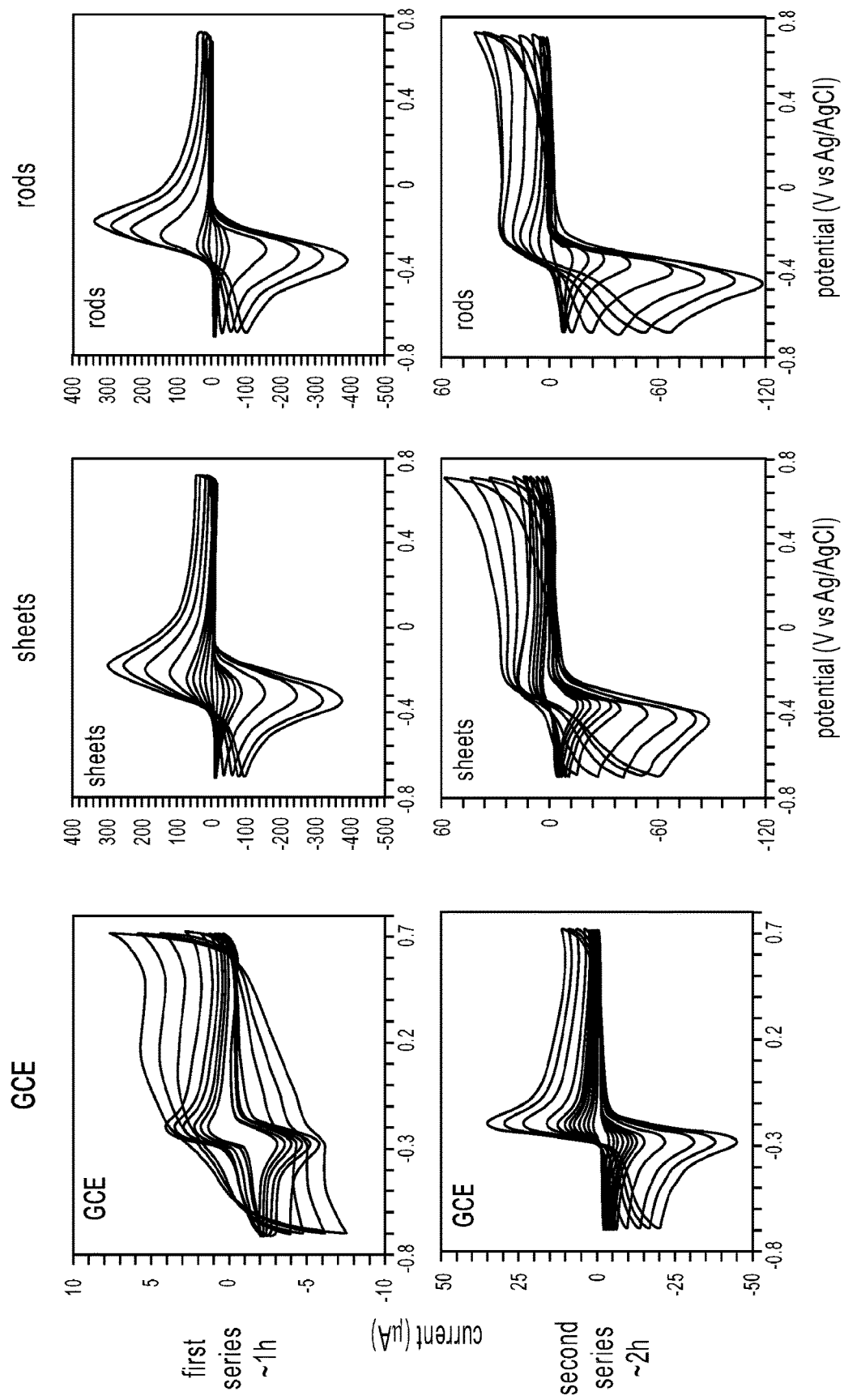
FIG. 37 illustrates time and morphology-dependent behavior of $Ru(NH_3)_6Cl_3$ by cyclic voltammetry.
Figure 38A:
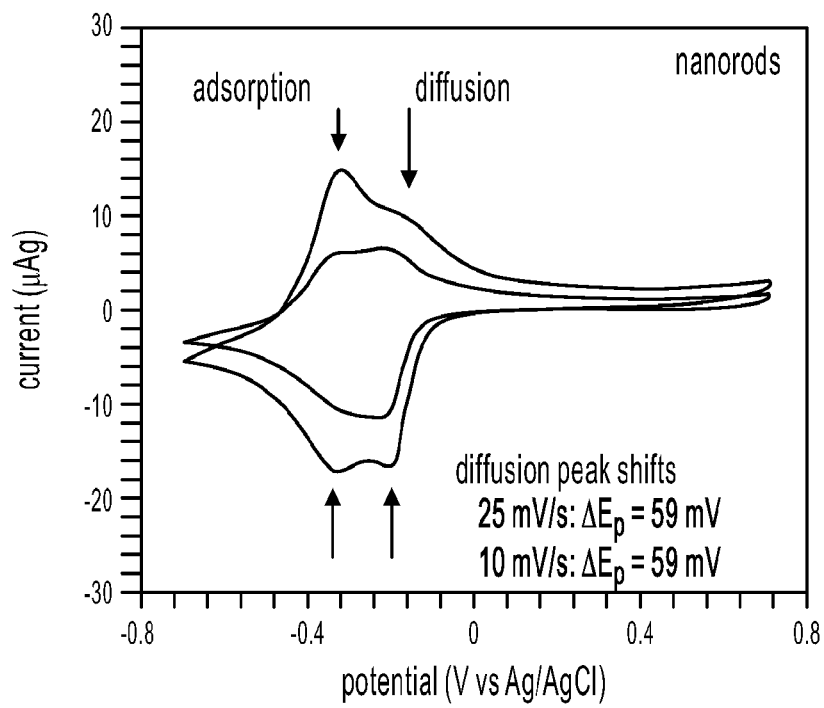
FIGS. 38A-B illustrate observation of diffusion and adsorption controlled contributions to cyclic voltammetry signal for $Ru(NH_3)_6Cl_3$ on nanorods (FIG. 38A) and nanosheets (FIG. 38B).
Figure 38B:
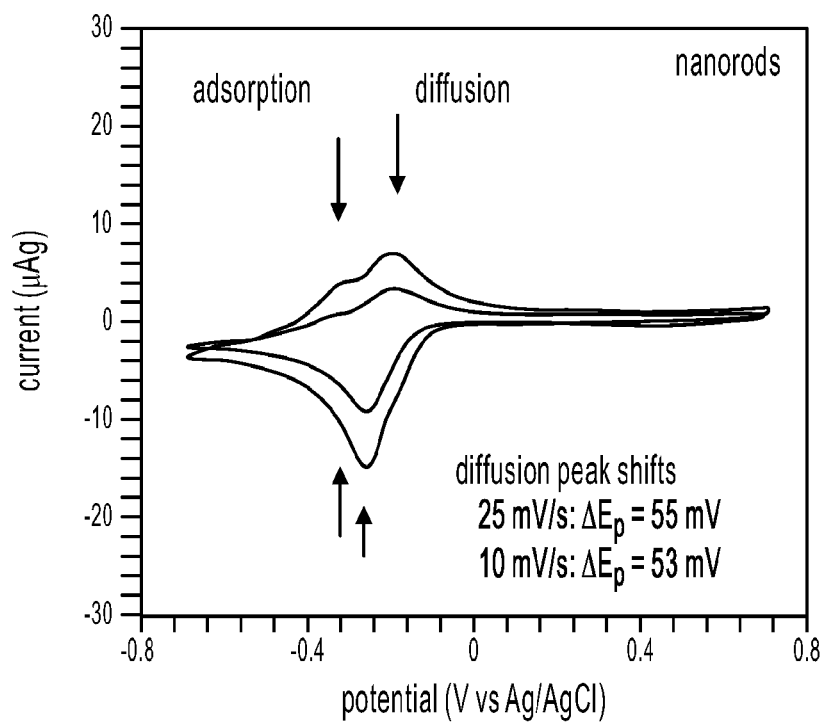

Example 3.25. Electrochemical Behavior of $Ru(NH_3)_6Cl_3$ on Nanorods and Nanosheets FIG. 37 illustrates Time and morphology-dependent behavior of $Ru(NH_3)_6Cl_3$ by CV, while FIGS. 38A-B illustrate observation of diffusion and adsorption controlled contributions to CV signal for $Ru(NH_3)_6Cl_3$ on nanorods (FIG. 38A) and nanosheets (FIG. 38B).

Figure 39:
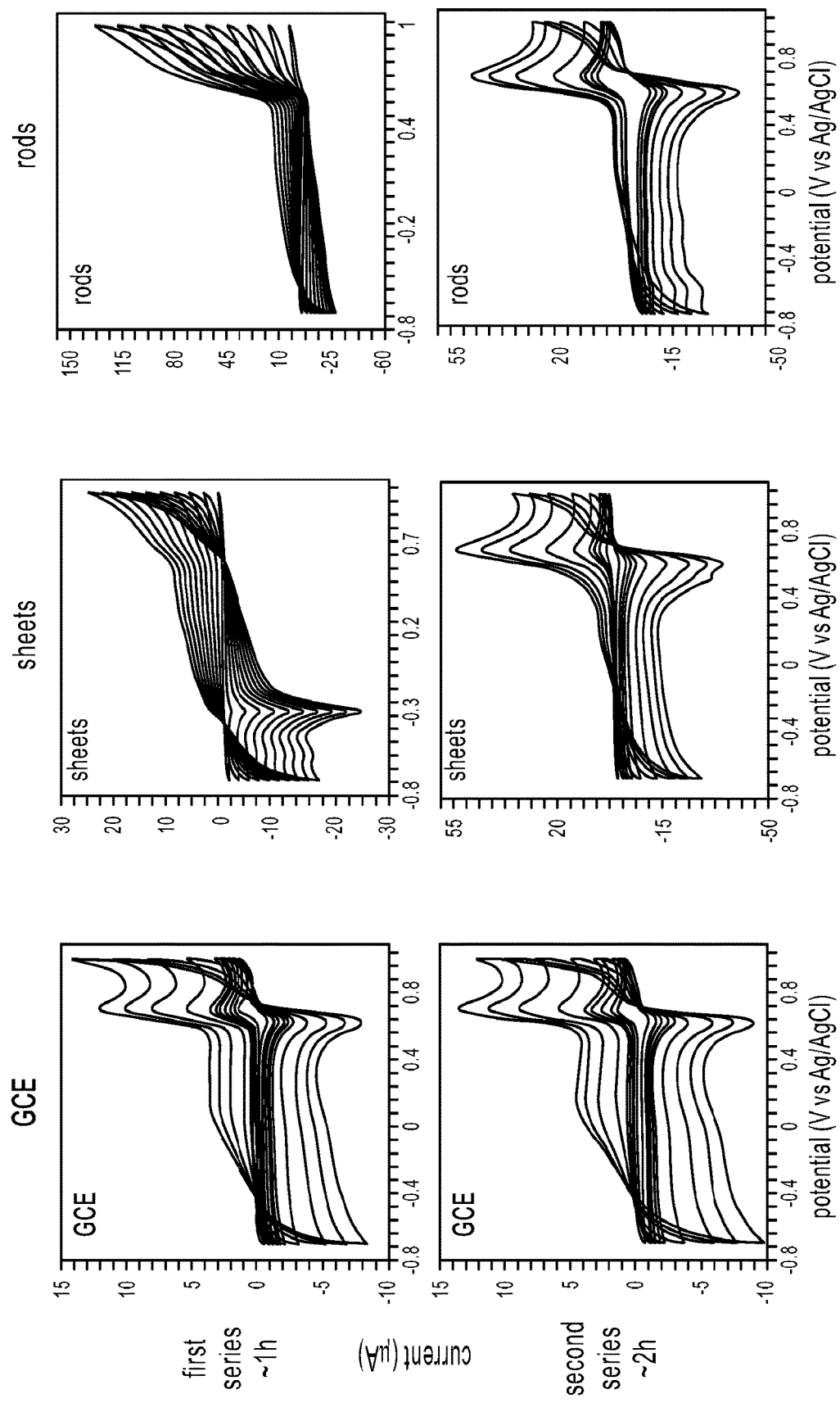
FIG. 39 illustrates time and morphology-dependent behavior of $K_4IrCl_6$ by cyclic voltammetry.

Example 3.26. Electrochemical Behavior of $K_4IrCl_6$ on Nanorods and Nanosheets FIG. 39 illustrates electrochemical behavior of $K_4IrCl_6$ on nanorods and nanosheets.

Without further elaboration, it is believed that one skilled in the art can, using the description herein, utilize the present disclosure to its fullest extent. The embodiments described herein are to be construed as illustrative and not as constraining the remainder of the disclosure in any way whatsoever. While the embodiments have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

What is claimed is:

1. A method of detecting an analyte in a sample, said method comprising:
    associating the sample with an electrode,
        wherein the electrode comprises a metal-organic framework, wherein the metal-organic framework comprises one or more metals and one or more ligands coordinated with the one or more metals, wherein the one or more ligands comprise triphenylene-based ligands, wherein the triphenylene-based ligands are selected from the group consisting of 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof; and evaluating the redox properties of the electrode,
wherein the redox properties are selected from the group consisting of oxidation, reduction, redox potential, and combinations thereof; and correlating the redox properties of the electrode to the presence or absence of the analyte in the sample.

2. The method of claim 1, wherein the redox properties of the electrode comprise at least one of oxidation of chemical species, reduction of chemical species, or combinations thereof.

3. The method of claim 1, wherein the evaluating occurs by obtaining a voltammetric response of the electrode, wherein the voltammetric response is obtained by obtaining a voltammogram of the electrode through cyclic voltammetry (CV), differential pulse voltammetry (DPV), or combinations thereof, and wherein the redox properties are evaluated by evaluating peaks on the voltammogram.

4. The method of claim 1, wherein the correlating comprises at least one of comparing the redox properties of the electrode to redox properties of known analytes, comparing the redox properties of the electrode to a database comprising redox properties of electrodes associated with known analytes, comparing a voltammetric response of the electrode to the voltammetric responses of electrodes associated with known analytes, or combinations thereof.

5. The method of claim 1, wherein the analyte is detectable at concentrations that range from about 10 nM to about 100 μM, or from about 10 nM to about 100 nM.

6. The method of claim 1, wherein the method is utilized for the simultaneous detection of a plurality of different analytes, for quantifying the concentration of the analyte, for the selective detection of analytes in the presence of interfering agents, or combinations thereof.

7. The method of claim 1, wherein the method is utilized for the selective detection of analytes in the presence of interfering agents, and wherein the interfering agents are selected from the group consisting of ascorbic acid, uric acid, proteins, ions, and combinations thereof.

8. The method of claim 1, wherein the analyte is selected from the group consisting of neurochemicals, metabolites, drugs, vitamins, redox active neurochemicals, dopamine, serotonin, norepinephrine, epinephrine, neurotransmitters, catecholamines, dopamine, norepinephrine, epinephrine, and combinations thereof.

9. The method of claim 1, wherein the metal-organic framework serves as a membrane for capturing the analyte.

10. The method of claim 1, wherein the metal-organic framework is in the form of a two-dimensional conductive network, a crystalline, a Kagome lattice, or combinations thereof.

11. The method of claim 1, wherein the metal-organic framework is in the form of a layer, a powder, a compressed powder, a pellet, a pencil-lead, a free-standing or substrate-supported wire, a free-standing or substrate-supported array of wires, a free-standing film, a substrate-supported film, nanosheets, nanorods, or combinations thereof.

12. The method of claim 1, wherein the metal-organic framework is associated with a polymer, wherein the polymer is selected from the group consisting of fluoropolymers, polytetrafluoroethylene, Nafion, polymer composites, and combinations thereof.

13. The method of claim 1, wherein the one or more metals are selected from the group consisting of nickel, copper, cobalt, palladium and combinations thereof.

14. The method of claim 1, wherein the metal-organic framework comprises the following formula:
$M_3(HXTP)_2$,
wherein M is selected from the group consisting of cobalt, copper, nickel, palladium, and combinations thereof,
wherein X is O or NH, and
wherein HXTP represents a triphenylene-based ligand selected from the group consisting of 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof.

15. The method of claim 1, wherein the metal-organic framework is selected from the group consisting of $Co_3HTTP_2$, $Ni_3HTTP_2$, $Ni_3HITP_2$, $Cu_3HTTP_2$, $Co_3HHTP_2$, $Ni_3HHTP_2$, $Cu_3HHTP_2$, $Pd_3HHTP_2$, $Pd_3HITP_2$, and combinations thereof.

16. The method of claim 1, wherein the associating comprises associating the sample with a basal plane of the metal-organic framework, associating the sample with an edge of the metal-organic framework, associating the sample with a Miller index [100] surface of the metal-organic framework, associating the sample with a Miller index [004] surface of the metal-organic framework, or combinations thereof.

17. The method of claim 1, wherein the associating results in the reversible association of any analyte in the sample with the metal-organic framework, the selective association of a specific analyte in the sample with the metal-organic framework, catalysis of the redox processes of the analyte by the metal-organic framework, or combinations thereof.

18. The method of claim 1, wherein the metal-organic framework is associated with an electrode surface, and wherein the electrode surface is selected from the group consisting of a conductive substrate, a carbon-based substrate, glassy carbon, and combinations thereof.

19. The method of claim 1, wherein the metal-organic framework serves as an electrode surface, and wherein the electrode lacks an additional electrode surface.

20. A method of detecting an analyte in a sample, said method comprising:
associating the sample with an electrode, wherein the electrode comprises a metal-organic framework, wherein the metal-organic framework comprises the following formula: $M_3(HXTP)_2$,
wherein M is selected from the group consisting of cobalt, copper, nickel, palladium, and combinations thereof,
wherein X is O or NH, and
wherein HXTP represents a triphenylene-based ligand selected from the group consisting of 2,3,5,6,10,11-hexahydroxytriphenylene (HHTP), 2,3,5,6,10,11-hexaiminotriphenylene (HITP), 2,3,5,6,10,11-hexathiotriphenylene (HTTP), and combinations thereof;
evaluating the redox properties of the electrode,
wherein the redox properties are selected from the group consisting of oxidation, reduction, redox potential, and combinations thereof; and correlating the redox properties of the electrode to the presence or absence of the analyte in the sample.

21. A method of detecting an analyte in a sample, said method comprising:
associating the sample with an electrode, wherein the electrode comprises a metal-organic framework, wherein the metal-organic framework is selected from the group consisting of $Co_3HTTP_2$, $Ni_3HTTP_2$, $Ni_3HITP_2$, $Cu_3HTTP_2$, $Co_3HHTP_2$, $Ni_3HHTP_2$, $Cu_3HHTP_2$, $Pd_3HHTP_2$, $Pd_3HITP_2$, and combinations thereof;
evaluating the redox properties of the electrode,
wherein the redox properties are selected from the group consisting of oxidation, reduction, redox potential, and combinations thereof; and
correlating the redox properties of the electrode to the presence or absence of the analyte in the sample.

* * * * *